US012649677B2

(12) United States Patent
Robles et al.

(10) Patent No.: US 12,649,677 B2
(45) Date of Patent: Jun. 9, 2026

(54) MICROBIAL REMEDIATION OF HALOGENATED COMPOUNDS VIA CHAIN ELONGATION AND DEHALOGENATION

(71) Applicants: Arizona Board of Regents on behalf of Arizona State University, Scottsdale, AZ (US); Haley & Aldrich, Inc., Burlington, MA (US)

(72) Inventors: Aide Robles, Mesa, AZ (US); Anca Delgado, Tempe, AZ (US); Maxwell Silverman, Tempe, AZ (US); Peter Bennett, Rochester, NY (US); Jacob Chu, Phoenix, AZ (US)

(73) Assignees: Arizona Board of Regents on behalf of Arizona State University, Scottsdale, AZ (US); Haley & Aldrich, Inc., Burlington, MA (US)

( * ) Notice: Subject to any disclaimer, the term of this patent is extended or adjusted under 35 U.S.C. 154(b) by 407 days.

(21) Appl. No.: 18/321,326

(22) Filed: May 22, 2023

(65) Prior Publication Data

US 2023/0373832 A1    Nov. 23, 2023

Related U.S. Application Data

(60) Provisional application No. 63/344,765, filed on May 23, 2022.

(51) Int. Cl.
*C02F 3/34*       (2023.01)
*C02F 1/68*       (2023.01)
(Continued)

(52) U.S. Cl.
CPC .............. *C02F 3/341* (2013.01); *C02F 1/68* (2013.01); *C02F 2101/12* (2013.01); *C02F 2101/36* (2013.01); *C02F 2103/06* (2013.01)

(58) Field of Classification Search
CPC ........ C02F 3/341; C02F 1/68; C02F 2101/12; C02F 2101/36; C02F 2103/06
(Continued)

(56) References Cited

U.S. PATENT DOCUMENTS

| | | | | |
|---|---|---|---|---|
| 6,472,198 B1 * | 10/2002 | Semprini | .................. | B09C 1/10 |
| | | | | 210/601 |
| 2021/0260566 A1 * | 8/2021 | Birk | ......................... | B01J 23/04 |

FOREIGN PATENT DOCUMENTS

| | | | | | |
|---|---|---|---|---|---|
| CN | 108435785 A | * | 8/2018 | ............. | C09K 17/40 |
| FR | 3051802 A1 | * | 12/2017 | ............. | B09C 1/002 |

OTHER PUBLICATIONS

Robles, et al., Microbial Chain Elongation and Subsequent Fermentation of Elongated Carboxylates as H2-Producing Processes for Sustained Reductive Dechlorination of Chlorinated Ethenes, Environ. Sci. Technol. (2021), 55, 10398-10410.*

(Continued)

*Primary Examiner* — Fred Prince
(74) *Attorney, Agent, or Firm* — Riverside Law LLP

(57)        ABSTRACT

A system for environmental remediation of halogenated compounds such as chlorinated solvents is presented, the system comprising at least one bacterial strain capable of microbial chain elongation; at least one bacterial strain capable of reductive dehalogenation; and an alcohol. Also presented is a method remediating an environmental sample, the method comprising the steps of: providing a remediation composition; and treating an environmental sample comprising at least one chlorinated pollutant with the remediation composition; wherein the remediation composition comprises at least one bacterial strain capable of microbial chain elongation; at least one bacterial strain capable of reductive dehalogenation; and at least one bacterial strain capable of fermentation.

20 Claims, 24 Drawing Sheets

(51) Int. Cl.
  *C02F 101/12* (2006.01)
  *C02F 101/36* (2006.01)
  *C02F 103/06* (2006.01)
(58) Field of Classification Search
  USPC .......................... 210/601, 631, 908, 909, 915
  See application file for complete search history.

(56) References Cited

OTHER PUBLICATIONS

Joshi et al., The occurrence and ecology of microbial chain elongation of carboxylates in soils, The ISME Journal (2021) 15:1907-1918.*

Men et al., Characterization of four TCE-dechlorinating microbial enrichments grown with different cobalamin stress and methanogenic conditions, Appl Microbiol Biotechnol. Jul. 2013 ; 97(14): 6439-6450.*

Machine-generated English translation of CN 108435785, generated on Sep. 18, 2025.*

Machine-generated English translation of FR 3051802, generated on Sep. 18, 2025.*

Agler, M. T.; Wrenn, B. A.; Zinder, S. H.; Angenent, L. T., Waste to bioproduct conversion with undefined mixed cultures: the carboxylate platform. Trends in Biotechnology 2011, 29 (2), 70-78.

Angenent, L. T.; Richter, H.; Buckel, W.; Spirito, C. M.; Steinbusch, K. J. J.; Plugge, C. M.; Strik, D. P. B. T. B.; Grootscholten, T. I. M.; Buisman, C. J. N.; Hamelers, H. V. M., Chain elongation with reactor microbiomes: open-culture biotechnology to produce biochemicals. Environ. Sci. Technol. 2016, 50, 2796-2810.

Aulenta, F., Pera, A., Rossetti, S., Petrangeli Papini, M. and Majone, M. (2007) 'Relevance of side reactions in anaerobic reductive dechlorination microcosms amended with different electron donors', Water Research, 41(1), pp. 27-38.

Aulenta, F.; Beccari, M.; Majone, M.; Papini, M. P.; Tandoi, V., Competition for H2 between sulfate reduction and dechlorination in butyrate-fed anaerobic cultures. Process Biochemistry 2008, 43 (2), 161-168.

Aulenta, F.; Canosa, A.; Reale, P.; Rossetti, S.; Panero, S.; Majone, M., Microbial reductive dechlorination of trichloroethene to ethene with electrodes serving as electron donors without the external addition of redox mediators. Biotechnol. Bioeng. 2009, 103, (1), 85-91.

Aulenta, F.; Gossett, J.; Rossetti, S.; Majone, M., Comparative study of methanol, butyrate, and hydrogen as electron donors for long-term dechlorination of tetrachloroethene in mixed anerobic cultures. Biotechnol. Bioeng. 2005, 743-753.

Aullo, T.; Ranchou-Peyruse, A.; Ollivier, B.; Magot, M., Desulfotomaculum spp. and related gram-positive sulfate-reducing bacteria in deep subsurface environments. Front. Microbiol. 2013, 4, 362-362.

Azizian, M. F.; Behrens, S.; Sabalowsky, A.; Dolan, M. E.; Spormann, A. M.; Semprini, L., Continuous-flow column study of reductive dehalogenation of PCE upon bioaugmentation with the Evanite enrichment culture. J. Contam. Hydrol. 2008, 100, (1-2), 11-21.

Bao, S., Wang, Q., Zhang, P., Zhang, Q., Wu, Y., Li, F., Tao, X., Wang, S., Nabi, M. and Zhou, Y. (2019) 'Effect of acid/ethanol ratio on medium chain carboxylate production with different VFAs as the electron acceptor: Insight into carbon balance and microbial community', Energies, 12(19), pp. 3720.

Barker, H. A., The production of caproic and butyric acids by the methane fermentation of ethyl alcohol. Arch. Microbiol. 1937, 8, 415-421.

Barker, H. A.; Taha, S. M., Clostridium kluyverii, an organism concerned in the formation of caproic acid from ethyl alcohol. J. Bacteriol. 1942, 43, (3), 347.

Bennett, P.; Gandhi, D.; Warner, S.; Bussey, J., In situ reductive dechlorination of chlorinated ethenes in high nitrate groundwater. J. Hazard. Mater. 2007, 149, (3), 568-573.

Bokulich, N. A., Kaehler, B. D., Rideout, J. R., Dillon, M., Bolyen, E., Knight, R., Huttley, G. A. and Gregory Caporaso, J. (2018) 'Optimizing taxonomic classification of marker-gene amplicon sequences with QIIME 2's q2-feature-classifier plugin', Microbiome, 6(1), pp. 90-90.

Borden, R. C., Concurrent bioremediation of perchlorate and 1,1,1-trichloroethane in an emulsified oil barrier. Journal of Contaminant Hydrology 20074, 94 (1), 1333.

Borden, R. C.; Beckwith, W. J.; Lieberman, M. T.; Akladiss, N.; Hill, S. R., Enhanced anaerobic bioremediation of a TCE source at the Tarheel Army Missile Plant using EOS. Remediation 2007, 17, (3), 5-19.

Borden, R. C.; Richardson, S. D.; Bodour, A. A., Enhanced reductive dechlorination of trichloroethene in an acidic DNAPL impacted aquifer. J. Environ. Manage. 2019, 237, 617-628.

Borden, R. Protocol for enhanced in situ bioremediation using emulsified edible oil; Environmental Security Technology Certification Program: 2006 (pp. 1-100).

Bradley, P. M., Microbial degradation of chloroethenes in groundwater systems. Hydrogeology Journal 2000, 8 (1), 104-111.

Calvo, D. C.; Ontiveros-Valencia, A.; Krajmalnik-Brown, R.; Torres, C. I.; Rittmann, B. E., Carboxylates and alcohols production in an autotrophic hydrogen-based membrane biofilm reactor. Biotechnol. Bioeng. 2021, 118, (6), 2338-2347.

Camacho, C.; Coulouris, G.; Avagyan, V.; Ma, N.; Papadopoulos, J.; Bealer, K.; Madden, T. L., Blast+: architecture and applications. BMC Bioinformatics 2009, 10, (1), 421.

Candry, P.; Ganigué, R., Chain elongators, friends, and foes. Curr. Opin. Biotechnol. 2021, 67, 99-110.

Candry, P.; Huang, S.; Carvajal-Arroyo, J. M.; Rabaey, K.; Ganigue, R., Enrichment and characterisation of ethanol chain elongating communities from natural and engineered environments. Sci. Rep. 2020, 10, (1), 3682-10.

Candry, P.; Ulcar, B.; Petrognani, C.; Rabaey, K.; Ganigué, R., Ethanol: propionate ratio drives product selectivity in odd-chain elongation with Clostridium kluyveri and mixed communities. Bioresour. Technol. 2020, 313 (pp. 1-5).

Candry, P.; Van Daele, T.; Denis, K.; Amerlinck, Y.; Andersen, S. J.; Ganigue, R.; Arends, J. B. A.; Nopens, I.; Rabaey, K., A novel high-throughput method for kinetic characterisation of anaerobic bioproduction strains, applied to Clostridium kluyveri. Sci. Rep. 2018, 8, (1), 9724-9724.

Caporaso, G. J.; Lauber, C. L.; Walters, W. A.; Berg-Lyons, D.; Huntley, J.; Fierer, N.; Owens, S. M.; Betley, J.; Fraser, L.; Bauer, M.; Gormley, N.; Gilbert, J. A.; Smith, G.; Knight, R., Ultra-high-throughput microbial community analysis on the Illumina HiSeq and MiSeq platforms. ISME J. 2012, 6, (8), 1621.

Cavalcante, W.; Leitão, R.; Gehring, T.; Angenent, L.; Santaella, S., Anaerobic fermentation for n-caproic acid production: A review. Process Biochemistry 2017, 54, 106 (pp. 1-14).

Chen, W. S.; Strik, D. P. B. T. B.; Buisman, C. J. N.; Kroeze, C., Production of Caproic Acid from Mixed Organic Waste : An Environmental Life Cycle Perspective. Environmental Science and Technology 2017, 51 (12), 7159-7168.

Coma, M., Vilchez-Vargas, R., Roume, H., Jauregui, R., Pieper, D. H. and Rabaey, K. (2016) 'Product diversity linked to substrate usage in chain elongation by mixed-culture fermentation', Environmental Science & Technology, 50(12), pp. 6467-6476.

Conrad, R. and Klose, M. (1999) 'Anaerobic conversion of carbon dioxide to methane, acetate and propionate on washed rice roots', FEMS Microbiology Ecology, 30(2), pp. 147-155.

Contreras-Dávila, C. A., Esveld, J., Buisman, C. J. N. and Strik, D. P. B. T. (2021) 'nZVI Impacts Substrate Conversion and Microbiome Composition in Chain Elongation From D- and L-Lactate Substrates', Front Bioeng Biotechnol, 9, pp. 666582.

Cord-Ruwisch, R.; Seitz, H.- J.; Conrad, R., The capacity of hydrogenotrophic anaerobic bacteria to compete for traces of hydrogen depends on the redox potential of the terminal electron acceptor. Arch. Microbiol. 1988, 149, (4), 350-357.

Cupples, A. M.; Spormann, A. M.; McCarty, P. L., Vinyl chloride and cis-dichloroethene dechlorination kinetics and microorganism growth under substrate limiting conditions. Environ. Sci. Technol. 2004, 38, (4), 1102.

(56) References Cited

OTHER PUBLICATIONS

Cuzin, N., Ouattara, A. S., Labat, M. and Garcia, J. L. (2001) '*Methanobacterium congolense* sp. nov., from a methanogenic fermentation of cassava peel', International Journal of Systematic and Evolutionary Microbiology, 51(2), pp. 489-493.

De Bok, F. A. M., Stams, A. J. M., Dijkema, C. and Boone, D. R. (2001) 'Pathway of Propionate Oxidation by a Syntrophic Culture of Smithella propionica and Methanospirillum hungatei', Applied and Environmental Microbiology, 67(4), pp. 1800-1804.

De Groof, V.; Coma, M.; Arnot, T.; Leak, D. J.; Lanham, A. B., Medium chain carboxylic acids from complex organic feedstocks by mixed culture fermentation. Molecules 2019, 24, (3).

Delgado, A. G., Parameswaran, P., Fajardo-Williams, D., Halden, R. U. and Krajmalnik-Brown, R. (2012) 'Role of bicarbonate as a pH buffer and electron sink in microbial dechlorination of chloroethenes', Microbial Cell Factories, 11, pp. 128.

Delgado, A. G.; Fajardo-Williams, D.; Bondank, E.; Esquivel-Elizondo, S.; Krajmalnik-Brown, R., Coupling bioflocculation of Dehalococcoides mccartyi to high-rate reductive dehalogenation of chlorinated ethenes. Environ. Sci. Technol. 2017, 51, (19), 11297-11307.

Delgado, A. G.; Fajardo-Williams, D.; Kegerreis, K.; Krajmalnik-Brown, R., Impact of ammonium on syntrophic organohalide-respiring and fermenting microbial communities. mSphere 2016, 1, (2) (pp. 1-10).

Delgado, A. G.; Fajardo-Williams, D.; Popat, S.; Torres, C.; Krajmalnik-Brown, R., Successful operation of continuous reactors at short retention times results in high-density, fast-rate Dehalococcoides dechlorinating cultures. Appl. Microbiol. Biotechnol. 2014, 98, (6), 2729-2737.

Delgado, A. G.; Parameswaran, P.; Fajardo-Williams, D.; Halden, R. U.; Krajmalnik-Brown, R., Role of bicarbonate as a pH buffer and electron sink in microbial dechlorination of chloroethenes. Microb. Cell Fact. 2012, 11, 128 (pp. 1-11).

Delgado, A., G.; Kang, D.- W.; Nelson, K. G.; Fajardo-Williams, D.; Miceli, J. F.; Done, H. Y.; Popat, S. C.; Krajmalnik-Brown, R., Selective enrichment yields robust ethene-producing dechlorinating cultures from microcosms stalled at cis- dichloroethene. PLoS ONE 2014, 9, (6), e100654.

Desantis, T. Z.; Hugenholtz, P.; Larsen, N.; Rojas, M.; Brodie, E. L.; Keller, K.; Huber, T.; Dalevi, D.; Hu, P.; Andersen, G. L., Greengenes, a chimera-checked 16S rRNA gene database and workbench compatible with ARB. Appl. Environ. Microbiol. 2006, 72, (7), 5069.

Doesburg, W.; Eekert, M. H. A.; Middeldorp, P. J. M.; Balk, M.; Schraa, G.; Stams, A. J. M., Reductive dechlorination of β-hexachlorocyclohexane (β-HCH) by a *Dehalobacter* species in coculture with a *Sedimentibacter* sp. FEMS Microbiology Ecology 2005, 54 (1), 87-95.

Dolinová, I .; Štrojsová, M.; Němeček, J.; Macháčková, J.; Ševců, A., Microbial degradation of chloroethenes: a review. Environ. Sci. Pollut. Res. Int. 2017, 24, (15), 13262-13283.

Dowideit, K.; Scholz-Muramatsu, H.; Miethling-Graff, R.; Vigelahn, L.; Freygang, M.; Dohrmann, A. B.; Tebbe, C. C., Spatial heterogeneity of dechlorinating bacteria and limiting factors for in situ trichloroethene dechlorination revealed by analyses of sediment cores from a polluted field site. FEMS Microbiol. Ecol. 2010, 71, (3), 444-459.

Drzyzga, O.; Gottschal, J. C., Tetrachloroethene dehalorespiration and growth of Desulfitobacterium frappieri TCE1 in strict dependence on the activity of Desulfovibrio fructosivorans. Appl. Environ. Microbiol. 2002, 68, (2), 642-649.

Duhamel, M.; Wehr, S. D.; Yu, L.; Rizvi, H.; Seepersad, D.; Dworatzek, S.; Cox, E. E.; Edwards, E. A., Comparison of anaerobic dechlorinating enrichment cultures maintained on tetrachloroethene, trichloroethene, cis-dichloroethene and vinyl chloride. Water Res. 2002, 36, (17), 4193-4202.

Ellis, D. E.; Lutz, E. J.; Odom, J. M.; Buchanan, R. J.; Bartlett, C. L.; Lee, M. D.; Harkness, M. R.; DeWeerd, K. A., Bioaugmentation for accelerated in situ anaerobic bioremediation. Environ. Sci. Technol. 2000, 34, (11), 2254-2260.

EPA (2013) Introduction to in-situ bioremediation of groundwater, USA: U.S. Environmental Protection Agency Office of Superfund Remediation and Technology Innovation. Available at: https://www.epa.gov/sites/production/files/2015-04/documents/introductiontoinsitubioremediationofgroundwater_dec2013.pdf (pp. 1-86).

Zhu, X. Y.; Zhou, Y.; Wang, Y.; Wu, T. T.; Li, X. Z.; Li, D. P.; Tao, Y., Production of high-concentration n-caproic acid from lactate through fermentation using a newly isolated Ruminococcaceae bacterium CPB6. Biotechnol. Biofuels 2017, 10 (pp. 1-12).

Zhu, X., Tao, Y., Liang, C., Li, X., Wei, N., Zhang, W., . . . & Bo, T. (2015). The synthesis of n-caproate from lactate: a new efficient process for medium-chain carboxylates production. Scientific reports, 5(1), 14360 (pp. 1-9).

Ziv-El, M.; Delgado, A. G.; Yao, Y.; Kang, D. W.; Nelson, K. G.; Halden, R. U.; Krajmalnik-Brown, R., Development and characterization of DehaloR2, a novel anaerobic microbial consortium performing rapid dechlorination of TCE to ethene. Appl. Microbiol. Biotechnol. 2011, 92, (5), 1063-1071.

Ziv-El, M.; Popat, S. C.; Parameswaran, P.; Kang, D. W.; Polasko, A.; Halden, R. U.; Rittmann, B. E.; Krajmalnik-Brown, R., Using electron balances and molecular techniques, to assess trichoroethene-induced shifts to a dechlorinating microbial community. Biotechnol. Bioeng. 2012, 109, (9), 2230-2239.

Ziv-El, M.; Popat, S. C.; Cai, K.; Halden, R. U.; Krajmalnik-Brown, R.; Rittmann, B. E., Managing methanogens and homoacetogens to promote reductive dechlorination of trichloroethene with direct delivery of H2 in a membrane biofilm reactor. Biotechnol. Bioeng. 2012, 109, (9), 2200-2210.

Esquivel-Elizondo, S.; Ilhan, Z. E.; Garcia-Pena, E. I.; Krajmalnik-Brown, R., Insights into Butyrate Production in a Controlled Fermentation System via Gene Predictions. mSystems 2017, 2 (4) 13 pages.

Esquivel-Elizondo, S.; Miceli, J.; Torres, C. I.; Krajmalnik-Brown, R., Impact of carbon monoxide partial pressures on methanogenesis and medium chain fatty acids production during ethanol fermentation. Biotechnology and Bioengineering 2018, 115 (2), 341-350.

Fennell, D. and Gossett, J. (1998) 'Modeling the production of and competition for hydrogen in a dechlorinating culture', Environmental Science & Technology, 32(16), pp. 2450-2460.

Fennell, D. E.; Gossett, J. M.; Zinder, S. H., Comparison of butyric acid, ethanol, lactic acid, and propionic acid as hydrogen donors for the reductive dechlorination of tetrachloroethene. Environ. Sci. Technol. 1997, 31, (3), 918-926.

Genthner, B. R.; Davis, C. L.; Bryant, M. P., Features of rumen and sewage sludge strains of Eubacterium limosum, a methanol- and H2-CO2-utilizing species. Appl. Environ. Microbiol. 1981, 42, (1), 12-19.

Gibson, S. A.; Sewell, G. W., Stimulation of reductive dechlorination of tetrachloroethene in anaerobic aquifer microcosms by addition of short-chain organic acids or alcohols. Appl. Environ. Microbiol. 1992, 58, (4), 1392.

Gonzalez-Cabaleiro, R.; Lema, J.; Rodriguez, J.; Kleerebezem, R., Linking thermodynamics and kinetics to assess pathway reversibility in anaerobic bioprocesses. Energy Environ. Sci. 2013, 6, (12), 3780-3789.

Hageman, K. J.; Istok, J. D.; Field, J. A.; Buscheck, T. E.; Semprini, L., In situ anaerobic transformation of trichlorofluoroethene in trichloroethene-contaminated groundwater. Environ. Sci. Technol. 2001, 35, (9), 1729-1735.

Han, W., He, P., Shao, L. and Lü, F. (2018) 'Metabolic interactions of a chain elongation microbiome', Applied and Environmental Microbiology, 84(22) pp. 1-16.

Han, W., He, P., Shao, L. and Lü, F. (2019) 'Road to full bioconversion of biowaste to biochemicals centering on chain elongation: A mini review', Journal of Environmental Sciences, 86, pp. 50-64.

Heimann, A. C.; Friis, A. K.; Jakobsen, R., Effects of sulfate on anaerobic chloroethene degradation by an enriched culture under transient and steady-state hydrogen supply. Water Res. 2005, 39, (15), 3579-3586.

Hendrickson, E. R.; Payne, J. A.; Young, R. M.; Starr, M. G.; Perry, M. P.; Fahnestock, S.; Ellis, D. E.; Ebersole, R. C., Molecular Analysis of Dehalococcoides 16S Ribosomal DNA from Chloroethene-

(56) References Cited

OTHER PUBLICATIONS

Contaminated Sites throughout North America and Europe. Applied and Environmental Microbiology 2002, 68 (2), 485.

Henning, S.; Fricke, W. F.; Birgit, V.; Holger, B.; Heiko, L.; Axel, S.; Marcus, M.; Wolfgang, B.; Julia, H.; Fuli, L.; Christoph, H.; Rudolf, K. T.; Gerhard, G., The genome of Clostridium kluyveri, a strict anaerobe with unique metabolic features. Proc. Natl. Acad. Sci. USA 2008, 105, (6), 2128.

Henry, B. Loading rates and impacts of substrate delivery for enhanced anaerobic bioremediation; Environmental Security Technology Certificaiton Program: 2010, 476 pages.

Hiortdahl, K. M.; Borden, R. C., Enhanced reductive dechlorination of tetrachloroethene dense nonaqueous phase liquid with EVO and Mg(OH)2. Environ. Sci. Technol. 2014, 48, (1), 624-631.

Hoelen, T. P., Cunningham, J. A., Hopkins, G. D., Lebron, C. A. and Reinhard, M. (2006) 'Bioremediation of cis-DCE at a Sulfidogenic Site by Amendment with Propionate', Groundwater Monitoring & Remediation, 26(3), pp. 82-91.

Holliger, C.; Hahn, D.; Harmsen, H.; Ludwig, W.; Schumacher, W.; Tindall, B.; Vazquez, F.; Weiss, N.; Zehnder, A. J. B., *Dehalobacter restrictus* gen. nov. and sp. nov., a strictly anaerobic bacterium that reductively dechlorinates tetra- and trichloroethene in an anaerobic respiration. Arch. Microbiol. 1998, 169, (4), 313-321.

Hood, E. D.; Major, D. W.; Quinn, J. W.; Yoon, W. S.; Gavaskar, A.; Edwards, E. A., Demonstration of enhanced bioremediation in a TCE source area at Launch Complex 34, Cape Canaveral Air Force Station. Ground Water Monit. R. 2008, 28, (2), 98-107.

Hug, L. A., Maphosa, F., Leys, D., Löffler, F. E., Smidt, H., Edwards, E. A. and Adrian, L. (2013) 'Overview of organohalide-respiring bacteria and a proposal for a classification system for reductive dehalogenases', Philosophical Transactions of the Royal Society B: Biological Sciences, 368(1616), pp. 20120322.

Jankowski, M. D.; Henry, C. S.; Broadbelt, L. J.; Hatzimanikatis, V., Group contribution method for thermodynamic analysis of complex metabolic networks. Biophys. J. 2008, 95, (3), 1487-1499.

Jeon, B. S.; Kim, B.-C.; Um, Y.; Sang, B.-I., Production of hexanoic acid from d-galactitol by a newly isolated *Clostridium* sp. BS-1. Appl. Microbiol. Biotechnol. 2010, 88, (5), 1161-1167.

Joshi, S., Exploring microbial chain elongation for production of organics and hydrogen in soils. Tempe, Arizona : Arizona State University: 2018 (pp. 1-46).

Joshi, S.; Robles, A.; Aguiar, S.; Delgado, A. G., The occurrence and ecology of microbial chain elongation of carboxylates in soils. ISME J. 2021; https://doi.org/10.1038/s41396-021-00893-2 (pp. 1-12).

Junghare, M. and Schink, B. (2015) '*Desulfoprunum benzoelyticum* gen. nov., sp. nov., a Gram-stain-negative, benzoate-degrading, sulfate-reducing bacterium isolated from a wastewater treatment plant', International Journal of Systematic and Evolutionary Microbiology, 65(Pt_1), pp. 77-84.

Kabir, S. F.; Zheng, R.; Delgado, A. G.; Fini, E. H., Use of microbially desulfurized rubber to produce sustainable rubberized bitumen. Resour. Conserv. Recy. 2021, 164 (pp. 1-10).

Kassenga, G. R.; Pardue, J. H., Effect of competitive terminal electron acceptor processes on dechlorination of cis-1,2-dichloroethene and 1,2-dichloroethane in constructed wetland soils. FEMS Microbiology Ecology 2006, 57 (2), 311-323.

Krumholz, L. R., Desulfuromonas chloroethenica sp. nov. Uses tetrachloroethylene and trichloroethylene as electron acceptors. Int. J. Syst. Evol. Microbiol. 1997, 47, (4), 1262-1263.

Lee R. Krumholz *Desulfuromonas chloroethenica* sp. nov. Uses Tetrachloroethylene and Trichloroethylene as Electron Acceptors; International Journal of Systematic Bacteriology, Oct. 1997, p. 1262-1263.

Leeson, A.; Beevar, E.; Henry, B.; Fortenberry, J.; Coyle, C. Principles and practices of enhanced anaerobic bioremediation of chlorinated solvents; Environmental Security Technology Certificaiton Program: 2004, 457 pages.

Lendvay, L.; Loffler, F.; Dollhope, M.; Aiello, M., Bioreactive barriers: A comparison of bioaugmentation and biostimulation for chlorinated solvent remediation. Environmental Science & Technology 2003, 37 (7), 1422-1431.

Liu, Y., Balkwill, D. L., Aldrich, H. C., Drake, G. R. and Boone, D. R. (1999) 'Characterization of the anaerobic propionate-degrading syntrophs Smithella propionica gen. nov., sp. nov. and Syntrophobacter wolinii', International Journal of Systematic and Evolutionary Microbiology, 49(2), pp. 545-556.

Liu, Y., Lü, F., Shao, L. and He, P. (2016) 'Alcohol-to-acid ratio and substrate concentration affect product structure in chain elongation reactions initiated by unacclimatized inoculum', Bioresource Technology, 218, pp. 1140-1150.

Loeffler, F. E.; Sun, Q.; Li, J.; Tiedje, J. M., 16S rRNA gene-based detection of tetrachloroethene-dechlorinating *Desulfuromonas* and *Dehalococcoides* species. Applied and Environmental Microbiology 2000, 66 (4) 6 pages.

Loffler, F. E.; Sanford, R. A.; Ritalahti, K. M., Enrichment, cultivation, and detection of reductively dechlorinating bacteria. Methods Enzymol. 2005; 397, 77-111.

Löffler, F. E.; Tiedje, J. M.; Sanford, R. A., Fraction of electrons consumed in electron acceptor reduction and hydrogen thresholds as indicators of halorespiratory physiology. Appl. Environ. Microbiol. 1999, 65, (9), 4049-4056.

Löffler, F. E.; Yan, J.; Ritalahti, K. M.; Adrian, L.; Edwards, E. A.; Konstantinidis, K. T.; Müller, J. A.; Fullerton, H.; Zinder, S. H.; Spormann, A. M., *Dehalococcoides mccartyi* gen. nov., sp nov., obligately organohalide-respiring anaerobic bacteria relevant to halogen cycling and bioremediation, belong to a novel bacterial class, Dehalococcoidia classis nov., order Dehalococcoidales ord. nov and family Dehalococcoidaceae fam. nov., within the phylum Chloroflexi. Int. J. Syst. Evol. Microbiol. 2013, 63, 625-635.

Loffler, F.; Yan, J.; Ritalahti, K.; Adrian, L.; Edwards, E.; Konstantinidis, K.; Muller, J.; Fullerton, H.; Zinder, S.; Spormann, A., *Dehalococcoides mccartyi* gen. nov., sp nov., obligately organohalide-respiring anaerobic bacteria relevant to halogen cycling and bioremediation, belong to a novel bacterial class, Dehalococcoidia classis nov., order Dehalococcoidales ord. nov and family Dehalococcoidaceae fam. nov., within the phylum Chloroflexi. Int. J. Syst. Evol. Microbiol. 2013, 63, 625-635.

Lonkar, S., Fu, Z. and Holtzapple, M. (2016) 'Optimum alcohol concentration for chain elongation in mixed-culture fermentation of cellulosic substrate', Biotechnology and Bioengineering, 113(12), pp. 2597-2604.

Luijten, M. L. G. C.; de Weert, J.; Smidt, H.; Boschker, H. T. S.; de Vos, W. M.; Schraa, G.; Stams, A. J. M., Description of *Sulfurospirillum halorespirans* sp. nov., an anaerobic, tetrachloroethene-respiring bacterium, and transfer of Dehalospirillum multivorans to the genus Sulfurospirillum as Sulfurospirillum multivorans comb. nov. Int. J. Syst. Evol. Microbiol. 2003, 53, (3), 787-793.

Mao, X., Alexandra, P. and Lisa, A.-C. (2017) 'Effects of sulfate reduction on trichloroethene dechlorination by Dehalococcoides-containing microbial communities', Applied and Environmental Microbiology, 83(8), pp. e03384-e0338416.

Masella, A. P.; Bartram, A. K.; Truszkowski, J. M.; Brown, D. G.; Neufeld, J. D., PANDAseq: paired-end assembler for illumina sequences. BMC Bioinformatics 2012, 13, (1), 31.

Maymo-Gatell, X.; Chien, Y. T.; Gossett, J. M.; Zinder, S. H., Isolation of a bacterium that reductively dechlorinates tetrachloroethene to ethene. Science 1997, 276, (5318), 1568-1571.

McCarty, P. L.; Criddle, C. S.; Vogel, T. M., Retrospective on microbial transformations of halogenated organics. Environ. Sci. Process. Impacts. 2020, 22, (3), 512-517.

Men, Y.; Seth, E. C.; Yi, S.; Allen, R. H.; Taga, M. E.; Alvarez-Cohen, L., Sustainable Growth of Dehalococcoides mccartyi 195 by Corrinoid Salvaging and Remodeling in Defined Lactate-Fermenting Consortia. Applied and Environmental Microbiology 2014, 80 (7), 2133.

Mohana Rangan, S.; Mouti, A.; LaPat-Polasko, L.; Lowry, G. V.; Krajmalnik-Brown, R.; Delgado, A. G., Synergistic zerovalent iron (Fe0) and microbiological trichloroethene and perchlorate reductions are determined by the concentration and speciation of Fe. Environ. Sci. Technol. 2020, 54, (22), 14422-14431.

(56) References Cited

OTHER PUBLICATIONS

Mohana Rangan, S., Trade-offs in Utilizing of Zero-Valent Iron for Synergistic Biotic and Abiotic Reduction of Trichloroethene and Perchlorate in Soil and Groundwater. Krajmalnik-Brown, R.; Delgado, A.; Lowry, G., Eds. ProQuest Dissertations Publishing: 2017 (pp. 1-30).

Nanninga, H. J.; Gottschal, J. C., Properties of *Desulfovibrio carbinolicus* sp. nov. and other sulfate-reducing bacteria isolated from an anaerobic-purification plant. Appl. Environ. Microbiol. 1987, 53, (4), 802-809.

Pagani, I., Lapidus, A., Nolan, M., Lucas, S., Hammon, N., Deshpande, S., Cheng, J.-F., Chertkov, O., Davenport, K., Tapia, R., Han, C., Goodwin, L., Pitluck, S., Liolios, K., Mavromatis, K., Ivanova, N., Mikhailova, N., Pati, A., Chen, A., Palaniappan, K., Land, M., Hauser, L., Chang, Y.-J., Jeffries, C. D., Detter, J. C., Brambilla, E., Kannan, K. P., Djao, O. D. N., Rohde, M., Pukall, R., Spring, S., Goker, M., Sikorski, J., Woyke, T., Bristow, J., Eisen, J. A., Markowitz, V., Hugenholtz, P., Kyrpides, N. C. and Klenk, H.-P. (2011) 'Complete genome sequence of Desulfobulbus propionicus type strain (1pr3T)'.

Pant, P.; Pant, S., A review: Advances in microbial remediation of trichloroethylene (TCE). J. Environ. Sci. (China). 2010, 22, (1), 116-126.

Pavlostathis, S. G.; Zhuang, P., Reductive dechlorination of chloroalkenes in microcosms developed with a field contaminated soil. Chemosphere 1993, 27, (4), 585-595.

Puentes Jacome, L. A.; Wang, P. H.; Molenda, O.; Li, Y. X.; Islam, M. A.; Edwards, E. A., Sustained dechlorination of vinyl chloride to ethene in Dehalococcoides-enriched cultures grown without addition of exogenous vitamins and at low ph. Environ. Sci. Technol. 2019, 53, (19).

Quast, C.; Pruesse, E.; Yilmaz, P.; Gerken, J.; Schweer, T.; Yarza, P.; Peplies, J.; Glöckner, F. O., The SILVA ribosomal RNA gene database project: improved data processing and web-based tools. Nucleic Acids Res. 2012, 41, (D1), D590-D596.

Reichardt, N., Duncan, S. H., Young, P., Belenguer, A., McWilliam Leitch, C., Scott, K. P., Flint, H. J. and Louis, P. (2014) 'Phylogenetic distribution of three pathways for propionate production within the human gut microbiota', The ISME Journal, 8(6), pp. 1323-1335.

Richard Villemur, Martin Lanthier, Réjean Beaudet, François Lépine the *Desulfitobacterium* genus FEMS Microbiology Reviews, vol. 30, Issue 5, Sep. 2006, pp. 706-733.

Robertson, W.; Bowman, J.; Franzmann, P.; Mee, B., *Desulfosporosinus meridiei* sp. nov., a spore-forming sulfate-reducing bacterium isolated from gasoline-contaminated groundwater. Int. J. Syst. Evol. Microbiol. 2001, 51, (1), 133-140.

Robeson, M. S., II, O'Rourke, D. R., Kaehler, B. D., Ziemski, M., Dillon, M. R., Foster, J. T. and Bokulich, N. A. (2021) 'RESCRIPt: Reproducible sequence taxonomy reference database management', PLOS Computational Biology, 17 (11), pp. e1009581.

Robeson, M. S.; O'Rourke, D. R.; Kaehler, B. D.; Ziemski, M.; Dillon, M. R.; Foster, J. T.; Bokulich, N. A., RESCRIPt: reproducible sequence taxonomy reference database management for the masses. bioRxiv 2020, 2020.10.05.326504 (pp. 1-56).

Robinson, C.; Barry, D. A., Design tool for estimation of buffer requirement for enhanced reductive dechlorination of chlorinated solvents in groundwater. Environ. Model. Softw. 2009, 24, (11), 1332-1338.

Robinson, C.; Barry, D. A.; McCarty, P. L.; Gerhard, J. I.; Kouznetsova, I., pH control for enhanced reductive bioremediation of chlorinated solvent source zones. Sci. Total Environ. 2009, 407, (16), 4560-4573.

Robles, A., Yellowman, T. L., Joshi, S., Mohana Rangan, S. and Delgado, A. G. (2021) 'Microbial chain elongation and subsequent fermentation of elongated carboxylates as H2-producing processes for sustained reductive dechlorination of chlorinated ethenes', Environmental Science & Technology, 55(15), pp. 10398-10410.

Roghair, M., Hoogstad, T., Strik, D. P. B. T. B., Plugge, C. M., Timmers, P. H. A., Weusthuis, R. A., Bruins, M. E. and Buisman, C.

J. N. (2018) 'Controlling ethanol use in chain elongation by CO loading rate', Environmental Science & Technology, 52(3), pp. 1496.

Roghair, M.; Liu, Y. C.; Strik, D.; Weusthuis, R. A.; Bruins, M. E.; Buisman, C. J. N., Development of an effective chain elongation process from acidified food waste and ethanol into n-caproate. Front. Bioeng. Biotechnol. 2018, 6 (pp. 1-11).

Rozanova, E., Nazina, T. and Galushko, A. (1988) 'Isolation of a new genus of sulfate-reducing bacteria and description of a new species of this genus, *Desulfomicrobium apsheronum* gen. nov., sp. nov', Microbiology (Mikrobiologiya), 57(5), pp. 514-520.

Sander R., Compilation of Henry's law constants (Version 4.0 Nov. 2014) for water as solvent, 907 pages.

Schaefer, C. E.; Towne, R. M.; Vainberg, S.; McCray, J.; Steffan, R., Bioaugmentation for Treatment of Dense Non-Aqueous Phase Liquid in Fractured Sandstone Blocks. Environ. Sci. Technol. 2010b, 44 (13), 4958-4964.

Schaefer, C. E.; Lippincott, D. R.; Steffan, R. J., Field-scale evaluation of bioaugmentation dosage for treating chlorinated ethenes. Ground Water Monit. R. 2010, 30, (3), 113-124.

Schink, B., Energetics of syntrophic cooperation in methanogenic degradation. Microbiol. Mol. Biol. Rev. 1997, 61, (2), 262-280.

Schink, B., Kremer, D. R. and Hansen, T. A. (1987) 'Pathway of propionate formation from ethanol in Pelobacter propionicus', Archives of Microbiology, 147(4), pp. 321-327.

Sieber, J. R.; Sims, D. R.; Han, C.; Kim, E.; Lykidis, A.; Lapidus, A. L.; McDonnald, E.; Rohlin, L.; Culley, D. E.; Gunsalus, R.; McInerney, M. J., The genome of Syntrophomonas wolfei: new insights into syntrophic metabolism and biohydrogen production. Environ. Microbiol. 2010, 12, (8), 2289-2301.

Singh, A., Schnürer, A. and Westerholm, M. (2021) 'Enrichment and description of novel bacteria performing syntrophic propionate oxidation at high ammonia level', Environmental Microbiology, 23(3), pp. 1620-1637.

Sousa, D. Z.; Smidt, H.; Alves, M. M.; Stams, A. J. M., Ecophysiology of syntrophic communities that degrade saturated and unsaturated long-chain fatty acids. FEMS Microbiol. Ecol. 2009, 68, (3), 257-272.

Spirito, C. M.; Marzilli, A. M.; Angenent, L. T., Higher substrate ratios of ethanol to acetate steered chain elongation toward n-caprylate in a bioreactor with product extraction. Environ. Sci. Technol. 2018, 52, (22), 13438-13447.

Spirito, C. M.; Richter, H.; Rabaey, K.; Stams, A. J.; Angenent, L. T., Chain elongation in anaerobic reactor microbiomes to recover resources from waste. Curr. Opin. Biotechnol. 2014, 27, 115-122.

Stams, A. J. M., Kremer, D. R., Nicolay, K., Weenk, G. H. and Hansen, T. A. (1984) 'Pathway of propionate formation in Desulfobulbus propionicus', Archives of Microbiology, 139(2), pp. 167-173.

Steinbusch, K. J. J., Hamelers, H. V. M., Plugge, C. M. and Buisman, C. J. N. (2010) 'Biological formation of caproate and caprylate from acetate: fuel and chemical production from low grade biomass', Energy & Environmental Science, 4 (1), pp. 216-224.

Steinbusch, K. J. J.; Hamelers, H. V. M.; Plugge, C. M.; Buisman, C. J. N., Biological formation of caproate and caprylate from acetate: fuel and chemical production from low grade biomass. Energy Environ. Sci. 2010, 4 (1), 216-224.

Steinbusch, K. J. J.; Hamelers, H. V. M.; Buisman, C. J. N., Alcohol production through volatile fatty acids reduction with hydrogen as electron donor by mixed cultures. Water Res. (Oxford) 2008, 42, (15), 4059-4066.

Stroo, H. F.; Lesson, A.; Ward, C. H., Bioaugmentation considerations. In Bioaugmentation for Groundwater Remediation; Springer: New York, NY, 2013; pp. 141-170.

Stroo, H. F.; Major, D. W.; Steffan, R. J.; Koenisgsberg, S. S.; Ward, C. H., Bioaugmentation with Dehalococcoides: a decision guide. In Bioaugmentation for Groundwater Remediation, Stroo, H. F.; Leeson, A.; Ward, C. H., Eds. Springer: New York, 2013; pp. 117-140.

Sung, Y.; Fletcher, K. E.; Ritalahti, K. M.; Apkarian, R. P.; Ramos-Hernandez, N.; Sanford, R. A.; Mesbah, N. M.; Löffler, F. E., *Geobacter lovleyi* sp. nov. strain sz, a novel metal-reducing and tetrachloroethene-dechlorinating bacterium. Appl. Environ. Microbiol. 2006, 72, (4), 2775.

(56) References Cited

OTHER PUBLICATIONS

Tasaki, M., Kamagata, Y., Nakamura, K. and Mikami, E. (1992) 'Propionate formation from alcohols or aldehydes by Desulfobulbus propionicus in the absence of sulfate', Journal of Fermentation and Bioengineering, 73(4), pp. 329-331.

Thauer, R. K.; Jungermann, K.; Decker, K., Energy conservation in chemotrophic anaerobic bacteria. Bacteriol. Rev. 1977, 41, (1), 100-180.

Trainer, F. W.; Heath, R. C., Bicarbonate content of groundwater in carbonate rock in eastern North America. J. Hydrol. 1976, 31, (1), 37-55.

U.S. EPA Introduction to in situ bioremediation of groundwater; U.S. Environmental Protection Agency Office of Superfund Remediation and Technology Innovation: 2013 (pp. 1-86).

U.S. ESTCP Bioaugmentation for remediation of chlorinated solvents: technology development, status, and research needs; Environmental Security Technology Certification Program: 2005 (pp. 1-111).

U.S. ITRC In situ bioremediation of chlorinated ethene: DNAPL source zones; Interstate Technology & Regaularoty Countil: 2008 (pp. 1-138).

USEPA Advanced Micro Device, Inc. Sunnyvale, CA. Cleanup Activities: United States Environmental Protection Agency. 4 pages. Available at: https://cumulis.epa.gov/supercpad/SiteProfiles/index. cfm?fuseaction=second.Cleanup&id=0901389#Done (Accessed: Jan. 5, 2023 2023).

Vainberg, S.; Condee, C. W.; Steffan, R. J., Large-scale production of bacterial consortia for remediation of chlorinated solvent-contaminated groundwater. J. Ind. Microbiol. Biotechnol. 2009, 36, (9), 1189-1197.

Villemur, R.; Lanthier, M.; Beaudet, R.; Lépine, F., The *Desulfitobacterium* genus. FEMS Microbiol. Rev. 2006, 30, (5), 706-733.

Wagner, D. D.; Hug, L. A.; Hatt, J. K.; Spitzmiller, M. R.; Padilla-Crespo, E.; Ritalahti, K. M.; Edwards, E. A.; Konstantinidis, K. T.; Löffler, F. E., Genomic determinants of organohalide-respiration in Geobacter lovleyi, an unusual member of the Geobacteraceae. BMC Genomics 2012, 13, (1), 200-200.

Wang, J. and Yin, Y. (2022) 'Biological production of medium-chain carboxylates through chain elongation: An overview', Biotechnology Advances, 55, pp. 107882.

Wilkin, R. T.; Digiulio, D. C., Geochemical impacts to groundwater from geologic carbon sequestration: Controls on pH and inorganic carbon concentrations from reaction path and kinetic modeling. Environ. Sci. Technol. 2010, 44, (12), 4821-4827.

Wu, Z.; Man, Q.; Niu, H.; Lyu, H.; Song, H.; Li, R.; Ren, G.; Zhu, F.; Peng, C.; Li, B. and Ma, X. (2022) 'Recent advances and trends of trichloroethylene biodegradation: A critical review', Frontiers in Microbiology, 13 (pp. 1-24).

Xiaoyu, Z.; Yong, T.; Cheng, L.; Xiangzhen, L.; Na, W.; Wenjie, Z.; Yan, Z.; Yanfei, Y.; Tao, B., The synthesis of n-caproate from lactate: a new efficient process for medium-chain carboxylates production. Sci. Rep. 2015, 5 (pp. 1-9).

Yang, Y.; Higgins, S. A.; Yan, J.; Şimşir, B.; Chourey, K.; Iyer, R.; Hettich, R. L.; Baldwin, B.; Ogles, D. M.; Löffler, F. E., Grape pomace compost harbors organohalide-respiring *Dehalogenimonas* species with novel reductive dehalogenase genes. ISME J. 2017, 11, (12), 2767-2780.

Yang, Y.; McCarty, P. L., Competition for hydrogen within a chlorinated solvent dehalogenating anaerobic mixed culture. Environ. Sci. Technol. 1998, 32, (22), 3591-3597.

Yang, Y.; Yan, J.; Li, X.; Lv, Y.; Cui, Y.; Kara-Murdoch, F.; Chen, G.; Löffler, F. E., Genome sequence of "Candidatus Dehalogenimonas etheniformans" strain GP, a vinyl chloride-respiring anaerobe. Microbiol. Resour. Announc. 2020, 9, (50) (pp. 1-3).

Yin, Y.; Zhang, Y.; Karakashev, D. B.; Wang, J.; Angelidaki, I., Biological caproate production by Clostridium kluyveri from ethanol and acetate as carbon sources. Bioresour. Technol. 2017, 241, 638-644.

Yong, T.; Xiang, W.; Xiangzhen, L.; Na, W.; Hong, J.; Zhancheng, X.; Qinglan, T.; Xiaoyu, Z., The functional potential and active populations of the pit mud microbiome for the production of Chinese strong-flavour liquor. Microb. Biotechnol. 2017, 10, (6), 1603-1615.

Youlboong Sung, Kelly E. Fletcher, Kirsti M. Ritalahti, Robert P. Apkarian, Natalia Ramos-Hernández, Robert A. Sanford, Noha M. Mesbah, Frank E. Löffler Geobacter lovleyi sp. nov. Strain SZ, a Novel Metal-Reducing and Tetrachloroethene-Dechlorinating Bacterium. Applied and Environmental Microbiology Apr. 2006, vol. 72, p. 2775-2782.

* cited by examiner

| Reaction | Type | Stoichiometry | $\Delta G^{0'}$ (kJ mol$^{-1}$) |
|---|---|---|---|
| 1 | Fermentation (H$_2$-producing) | $CH_3CH(OH)COO^- + H_2O \rightarrow CH_3COO^- + CO_2 + 2\,H_2$<br>Lactate → Acetate | -8.78 |
| 2 | Fermentation (H$_2$-neutral) | $CH_3CH(OH)COO^- \rightarrow \frac{1}{3}CH_3COO^- + \frac{2}{3}CH_3CH_2COO^- + \frac{1}{3}CO_2 + \frac{1}{3}H_2O$<br>Lactate → Acetate    Propionate | -56.56 |
| 3 | Fermentation (H$_2$-producing) | $H(CO)(CHOH)_5H + 2\,H_2O \rightarrow 2\,CH_3COO^- + 2\,CO_2 + 4\,H_2 + 2\,H^+$<br>Glucose → Acetate | -215.70 |
| 4 | Fermentation (H$_2$-neutral) | $H(CO)(CHOH)_5H \rightarrow 2\,C_2H_5OH + 2\,CO_2$<br>Glucose → Ethanol | -235.00 |
| 5 | Fermentation (H$_2$-producing) | $CH_3(CH_2)_2COO^- + 2\,H_2O \rightarrow 2\,CH_3COO^- + 2\,H_2 + H^+$<br>Butyrate → Acetate | +48.30 |
| 6 | Fermentation (H$_2$-producing) | $CH_3OH \rightarrow \frac{1}{2}CH_3COO^- + H_2 + \frac{1}{2}H^+$<br>Methanol    Acetate | -29.25 |
| 7 | Fermentation (H$_2$-producing) | $CH_3(CH_2)_7(CH)_2(CH_2)_7COO^- + 2\,H_2O \rightarrow CH_3COO^- + CH_3(CH_2)_{14}COO^- + H_2 + H^+$<br>Oleate    Acetate    Palmitate | +1011.47 |
| 8 | Oxidation (H$_2$-producing) | $CH_3CH_2OH + H_2O \rightarrow CH_3COO^- + 2\,H_2 + H^+$<br>Ethanol → Acetate | +9.65 |
| 9 | Oxidation (H$_2$-producing) | $CH_3(CH_2)_3OH + H_2O \rightarrow CH_3(CH_2)_2COO^- + 2\,H_2 + H^+$<br>Butanol → Butyrate | +16.52 |
| 10 | Oxidation (H$_2$-producing) | $CH_3COO^- + 3\,H_2O \rightarrow HCO_3^- + CO_2 + 4\,H_2$<br>Acetate | +99.74 |
| 11 | Chain elongation (H$_2$-producing) | $CH_3CH_2OH + \frac{3}{5}CH_3COO^- \rightarrow \frac{4}{5}CH_3(CH_2)_2COO^- + \frac{2}{5}H_2 + \frac{1}{5}H^+ + \frac{3}{5}H_2O$<br>Ethanol    Acetate → Butyrate | -28.99 |
| 12 | Chain elongation (H$_2$-producing) | $CH_3CH_2OH + \frac{3}{6}CH_3(CH_2)_2COO^- \rightarrow \frac{4}{6}CH_3(CH_2)_4COO^- + \frac{2}{6}H_2 + \frac{1}{6}H^+ + \frac{4}{6}H_2O$<br>Ethanol    Butyrate → Caproate | -30.67 |
| 13 | Reductive dehalogenation (H$_2$-consuming) | $CCl_2CHCl + 3\,H_2 \rightarrow CH_2CH_2 + 3\,H^+ + 3\,Cl^-$<br>TCE → Ethene | -470.44 |

FIG. 2

| Label | Total C from substrates (mM) | Acetate (mM) | Ethanol (mM) | Butyrate (mM) | Caproate (mM) |
|---|---|---|---|---|---|
| 9:1 E:A (1-3)[a] | 72 | 3.27 | 32.73 | - | - |
| 3:1 E:A (1-3)[a] | 72 | 9 | 27 | - | - |
| Butyrate (1-3)[a] | 72 | - | - | 18 | - |
| Caproate (1-3)[a] | 72 | - | - | - | 12 |
| No Substrate (1-3) | - | - | - | - | - |
| Native (1-3)[b] | 72 | 3.27 | 32.73 | - | - |

[a]3.5 mL of native groundwater containing *Dehalococcoides mccartyi*, 3 mL chain elongating culture (MAT T1), and 1 mL of ZARA-10

[b]3.5 mL of native groundwater containing *Dehalococcoides mccartyi*, 4 mL of native top soil

FIG. 13

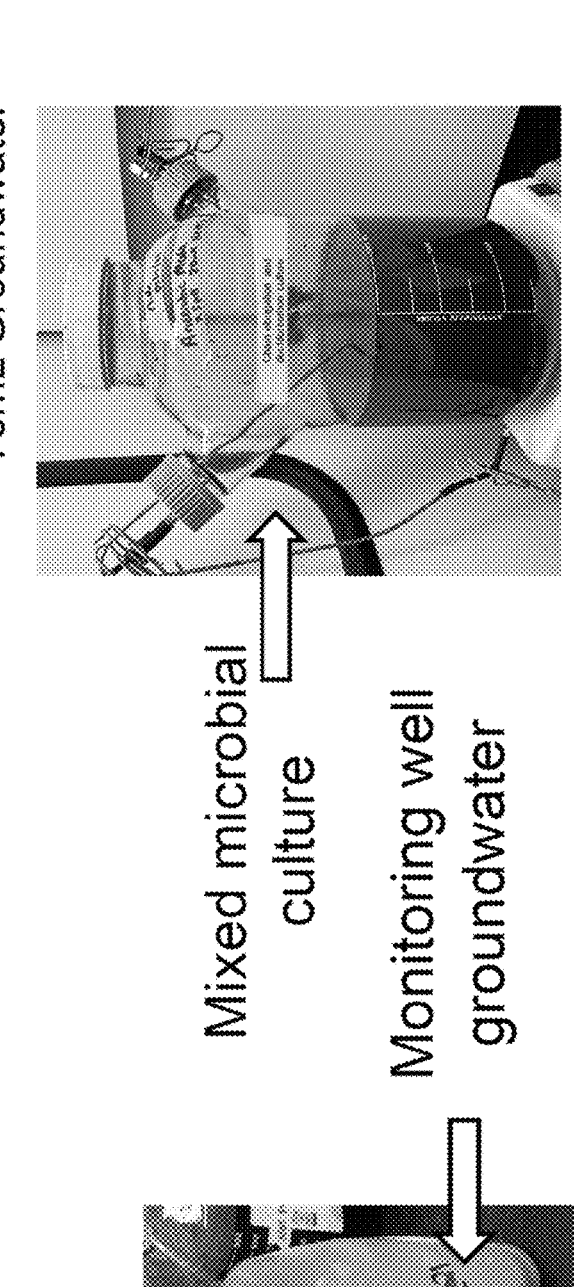
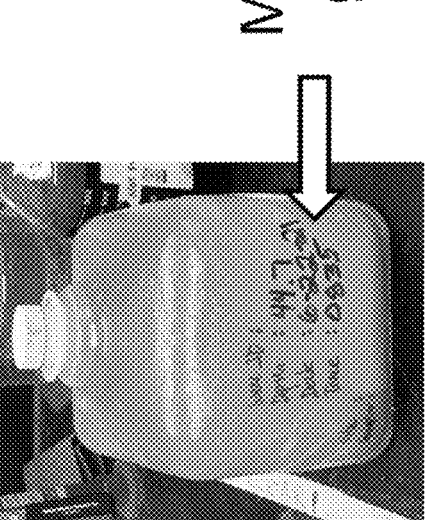
45 mL headspace (N2)
75mL Groundwater
Groundwater (GW) containing native *D. mccartyi*
Mixed microbial culture
Monitoring well groundwater
FIG. 14

MICROBIAL REMEDIATION OF HALOGENATED COMPOUNDS VIA CHAIN ELONGATION AND DEHALOGENATION

CROSS-REFERENCE TO RELATED APPLICATIONS

The present application claims priority to U.S. Provisional Application No. 63/344,765, filed May 23, 2022, which is incorporated by reference herein in its entirety.

STATEMENT REGARDING FEDERALLY SPONSORED RESEARCH OR DEVELOPMENT

This invention was made with government support under 1449501 awarded by the National Science Foundation. The government has certain rights in the invention.

BACKGROUND OF THE INVENTION

Hydrogen ($H_2$) is a universal electron donor for a variety of terminal electron accepting processes under anoxic conditions (Cord-Ruwisch, R. et al., Arch. Microbiol. 1988, 149, (4), 350-357; Löffler, F. E. et al., Appl. Environ. Microbiol. 1999, 65, (9), 4049-4056). It is also the key substrate in bioremediation technologies for many oxidized contaminants including the halogenated solvents tetrachloroethene (PCE) and trichloroethene (TCE) (McCarty, P. L. et al., Environ. Sci. Process. Impacts. 2020, 22, (3), 512-517). In the realm of PCE and TCE bioremediation, the most common groundwater treatment is in-situ anaerobic reductive dehalogenation mediated by organohalide-respiring bacteria (Pant, P. and Pant, S., J. Environ. Sci. (China). 2010, 22, (1), 116-126). Species of *Dehalobacter, Desulfitobacterium, Desulfuromonas, Geobacter,* and *Sulfurospirillum* reductively convert PCE and TCE to cis-1,2-dichloroethene (cis-DCE) using $H_2$ or organic electron donors such as acetate, pyruvate, and lactate (Holliger, C. et al., Arch. Microbiol. 1998, 169, (4), 313-321; Villemur, et al., FEMS Microbiol. Rev. 2006, 30, (5), 706-733; Krumholz, L. R., Int. J. Syst. Evol. Microbiol. 1997, 47, (4), 1262-1263; Sung, Y. et al., Appl. Environ. Microbiol. 2006, 72, (4), 2775; Luijten, M. L. G. C. et al., Int. J. Syst. Evol. Microbiol. 2003, 53, (3), 787-793; Stroo, H. F. et al., In Bioaugmentation for Groundwater Remediation; Springer: New York, NY, 2013; pp 141-170). Complete reductive dehalogenation of PCE and TCE, through cis-DCE and vinyl chloride (VC), has only been demonstrated by species of *Dehalococcoides* and *Dehalogenimonas* (Loffler, F. E. et al., Int. J. Syst. Evol. Microbiol. 2013, 63, 625-635; Yang, Y. et al., ISME J. 2017, 11, (12), 2767-2780). *Dehalococcoides mccartyi* are intrinsically dependent on $H_2$ as the sole electron donor (Loffler, F. E. et al., Int. J. Syst. Evol. Microbiol. 2013, 63, 625-635; Maymo-Gatell, X.; et al., Science 1997, 276, (5318), 1568-1571), whereas *Dehalogenimonas* can use $H_2$ or formate (Yang, Y. et al., Microbiol. Resour. Announc. 2020, 9, (50)). In-situ chlorinated ethene bioremediation is typically achieved through the addition of a mixed culture containing *D. mccartyi* and one or a combination of organic substrates, requiring fermenting bacteria to convert substrates to $H_2$ (FIG. 2). Lactate (Ellis, D. E. et al., Environ. Sci. Technol. 2000, 34, (11), 2254-2260), glucose/molasses (Suthersan, S. S., Natural and Enhanced Remediation Systems. Arcadis/Lewis Publishers: Boca Raton, Fla. ;, 2002), and emulsified vegetable oil (Borden, R. C. et al., Remediation 2007, 17, (3), 5-19) are among the most common organic substrates used with documented successes at contaminated sites (Stroo, H. F. et al., In Bioaugmentation for Groundwater Remediation, Stroo, H. F.; Leeson, A.; Ward, C. H., Eds. Springer: New York, 2013; pp 117-140). Ethanol and formate have also been occasionally used as biostimulants (Hageman, K. J. et al., Environ. Sci. Technol. 2001, 35, (9), 1729-1735; Hood, E. D. et al., Ground Water Monit. R. 2008, 28, (2), 98-107). In the laboratory, commercially available and widely utilized *D. mccartyi* mixed cultures are grown on PCE or TCE as electron acceptors and organic substrates (i.e., SDC-9/BAC9 with lactate (Vainberg, S. et al., J. Ind. Microbiol. Biotechnol. 2009, 36, (9), 1189-1197; Borden, R. C. et al., J. Environ. Manage. 2019, 237, 617-628) or KB1 with methanol (Puentes Jácome, L. A. et al., Environ. Sci. Technol. 2019, 53, (19); Duhamel, M. et al., Water Res. 2002, 36, (17), 4193-4202)) as precursors for $H_2$ and acetate (carbon source for *D. mccartyi*).

The net flux of $H_2$, a balance between $H_2$ production from fermentation and consumption from hydrogenotrophic processes, is a crucial controlling parameter for the rate and extent of reductive dehalogenation. A $H_2$ limitation incurs when $H_2$ is consumed by co-occurring and competing microorganisms. Furthermore, some fermentation pathways do not produce $H_2$ (e.g., lactate to propionate (FIG. 2, Reaction 2) and glucose to ethanol (Reaction 4)) or having $H_2$ as a product is not always thermodynamically favorable under environmental conditions. In laboratory studies, a $H_2$ limitation has been consistently linked to slow rates of dehalogenation (Delgado, A. G. et al., mSphere 2016, 1, (2); Yang, Y. and McCarty, P. L., Environ. Sci. Technol. 1998, 32, (22), 3591-3597; Heimann, A. C. et al., Water Res. 2005, 39, (15), 3579-3586; Delgado, A. G. et al., Microb. Cell Fact. 2012, 11, 128; Cupples, A. M. et al., Environ. Sci. Technol. 2004, 38, (4), 1102; Fennell, D. E. et al., Environ. Sci. Technol. 1997, 31, (3), 918-926; Aulenta, F. et al., Biotechnol. Bioeng. 2005, 743-753). During in-situ groundwater bioremediation at contaminated sites, $H_2$ limitation has been discussed as likely responsible for the slow rates or the stall of dehalogenation at cis-DCE and VC (Bennett, P. et al., J. Hazard. Mater. 2007, 149, (3), 568-573; Dowideit, K. et al., FEMS Microbiol. Ecol. 2010, 71, (3), 444-459). Yet, $H_2$ limitation is often dismissed on the ground that such issue could be solved by adding more fermentable substrates. Bioremediation practitioners regularly add organic substrates in excess at concentrations higher than ten times the amount needed to provide enough $H_2$ for reductive dehalogenation (Henry, B. Loading rates and impacts of substrate delivery for enhanced anaerobic bioremediation; Environmental Security Technology Certificaiton Program: 2010; Schaefer, C. E. et al., Ground Water Monit. R. 2010, 30, (3), 113-124; U.S. ESTCP Bioaugmentation for remediation of chlorinated solvents: technology development, status, and research needs; Environmental Security Technology Certification Program: 2005; U.S. ITRC In situ bioremediation of chlorinated ethene: DNAPL source zones; Interstate Technology & Regaularoty Countil: 2008). In certain instances, adding more fermentable substrate (e.g., lactate, molasses) brings additional complications. Fermentation can decrease the groundwater pH through generation of protons, organic acids, and $CO_2$ (Robinson, C. and Barry, D. A., Environ. Model. Softw. 2009, 24, (11), 1332-1338; Robinson, C. et al., Sci. Total Environ. 2009, 407, (16), 4560-4573). The buffering capacity of groundwater depends on the concentration of $HCO_3^-$, the main carbonate species at neutral pH and the largest contributor to alkalinity in groundwater. In US groundwater sources, $HCO_3^-$ concentrations range from 40-500 mg $L^{-1}$ (0.7-8.0 mM) (Trainer, F. W. & Heath, R. C., J. Hydrol. 1976, 31, (1), 37-55; Wilkin, R. T. & Digiulio, D.

C., Environ. Sci. Technol. 2010, 44, (12), 4821-4827). To buffer the protons produced from fermentation (and dehalogenation) or to raise the aquifer's pH, a common biostimulation/bioaugmentation scheme is to add NaHCO$_3$ (Robinson, C. et al., Sci. Total Environ. 2009, 407, (16), 4560-4573). HCO$_3^-$/CO$_2$ is the electron acceptor for H$_2$-dependent methanogenesis and homoacetogenesis (Ziv-El, M. et al., Biotechnol. Bioeng. 2012, 109, (9), 2200-2210). Thus, these bioremediation schemes provide methanogens and homoacetogens both donor and acceptor in excess, potentially diverting H$_2$ from reductive dehalogenation.

Fermentation remains the predominant H$_2$-delivery approach for in-situ bioremediation of chlorinated ethenes. Direct supply of H$_2$ gas for reductive dehalogenation is plausible only in controlled laboratory bioreactors and in certain small-scale pilot studies (Newell, C. J. et al., In In Situ and On-Site Bioremediation: The Sixth International Symposium, Battelle Press: Columbus, Ohio, 2001; pp 19-26; Leeson, A. et al., Principles and practices of enhanced anaerobic bioremediation of chlorinated solvents; Environmental Security Technology Certification Program: 2004).

There is a need in the art for efficient and continuous supply of H$_2$ for environmental bioremediation of halogenated compounds. The present invention addresses this unmet need.

SUMMARY OF THE INVENTION

In one aspect, the present invention relates to a system for remediation of halogenated compounds, comprising: at least one bacterial strain capable of microbial chain elongation; at least one bacterial strain capable of reductive dehalogenation; and an alcohol. In one embodiment, the system further comprises a carboxylate selected from the group consisting of an organic acid and an alkyl ester. In one embodiment, the carboxylate comprises ethyl acetate. In one embodiment, the alcohol and the carboxylate together form a solution; and wherein the molar concentration of alcohol is at least twice that of the carboxylate.

In one embodiment, the at least one bacterial strain capable of microbial chain elongation comprises *Clostridium kluyveri*. In one embodiment, the system comprises reductive dehalogenating cultures. In one embodiment, the at least one bacterial strain capable of reductive dehalogenation comprises a strain of *Dehalococcoides mccartyi*. In one embodiment, the at least one bacterial strain capable of microbial chain elongation is capable of converting ethanol to hydrogen and a carboxylate or a longer-chain alcohol. In one embodiment, the system further comprises at least one bacterial strain capable of fermentation of chain-elongation organic compounds; wherein the at least one bacterial strain capable of fermentation of chain-elongated organic compounds is capable of converting a long-chain carboxylate or alcohol selected from the group consisting of butyrate caproate, and butanol to acetate and hydrogen. In one embodiment, the at least one bacterial strain capable of reductive dehalogenation is capable of reducing at least one chloroethene selected from the group consisting of vinyl chloride, cis-1,2-dichloroethene, trichloroethene, and perchloroethene to ethene.

In one aspect, the present invention relates to a method of remediating an environmental sample, the method comprising the steps of providing a remediation composition; and treating an environmental sample comprising at least one chlorinated pollutant with the remediation composition;

wherein the remediation composition comprises: at least one bacterial strain capable of microbial chain elongation; at least one bacterial strain capable of reductive dehalogenation; and at least one bacterial strain capable of fermentation of chain-elongation organic compounds. In one embodiment, the method further comprises the step of adding *Dehalococcoides mccartyi* to the remediation composition. In one embodiment, the method further comprises the step of replacing at least one chlorine atom with a hydrogen atom on the chlorinated pollutant. In one embodiment, the remediation composition further comprises an alcohol and a carboxylate. In one embodiment, the remediation composition comprises an alcohol and a carboxylate in a ratio of about 3:1 or about 9:1. In one embodiment, the chlorinated pollutant is selected from the group consisting of vinyl chloride, cis-1,2-dichloroethene, trichloroethene, and perchloroethene.

In one aspect, the present invention relates to a kit for bioremediation of chlorinated pollutants, the kit comprising a remediation composition; and instructions for using the remediation composition; wherein the remediation composition comprises: at least one bacterial strain capable of microbial chain elongation; at least one bacterial strain capable of reductive dehalogenation; and at least one bacterial strain capable of fermentation of chain-elongation organic compounds. In one embodiment, the remediation composition comprises microbial chain elongation strain *Clostridium kluyveri* and reductive dehalogenation strain *Dehalococcoides mccartyi*. In one embodiment, the remediation composition further comprises an alcohol. In one embodiment, the remediation composition further comprises a carboxylate.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 2 is a table of stoichiometries of reactions under fermentative conditions and their free-energy yields ($\Delta$G$^{0'}$, kJ mol$^{-1}$) at standard conditions, pH 7, and 25° C. The calculations assumed 1 M concentration of solutes and 1 atm partial pressure of gases. Free energy of formation (G$_f^0$, kJ mol$^{-1}$) values were obtained from Rittmann and McCarty (Rittmann, B. E. and McCarty, P. L., Environmental Biotechnology: Principles and Applications. 2 ed.; McGraw Hill Education: Boston, 2020) for all compounds except oleate. G$_f^0$ for oleate was calculated as described in Alberty (Alberty, R. A., Thermodynamics of Bochemical Reactions. Wiley-Interscience: Hoboken, N.J, 2003) and Jankowski et al. (Jankowski, M. D. et al., Biophys. J. 2008, 95, (3), 1487-1499).

FIG. 13 is a table of exemplary batch microcosms in triplicates containing groundwater from a monitoring well and 0.20 mM cis-DCE in 120 mL bottles for 38-day incubation.

FIG. 14 is a series of images of various exemplary laboratory setups.

DETAILED DESCRIPTION

Figure 1:
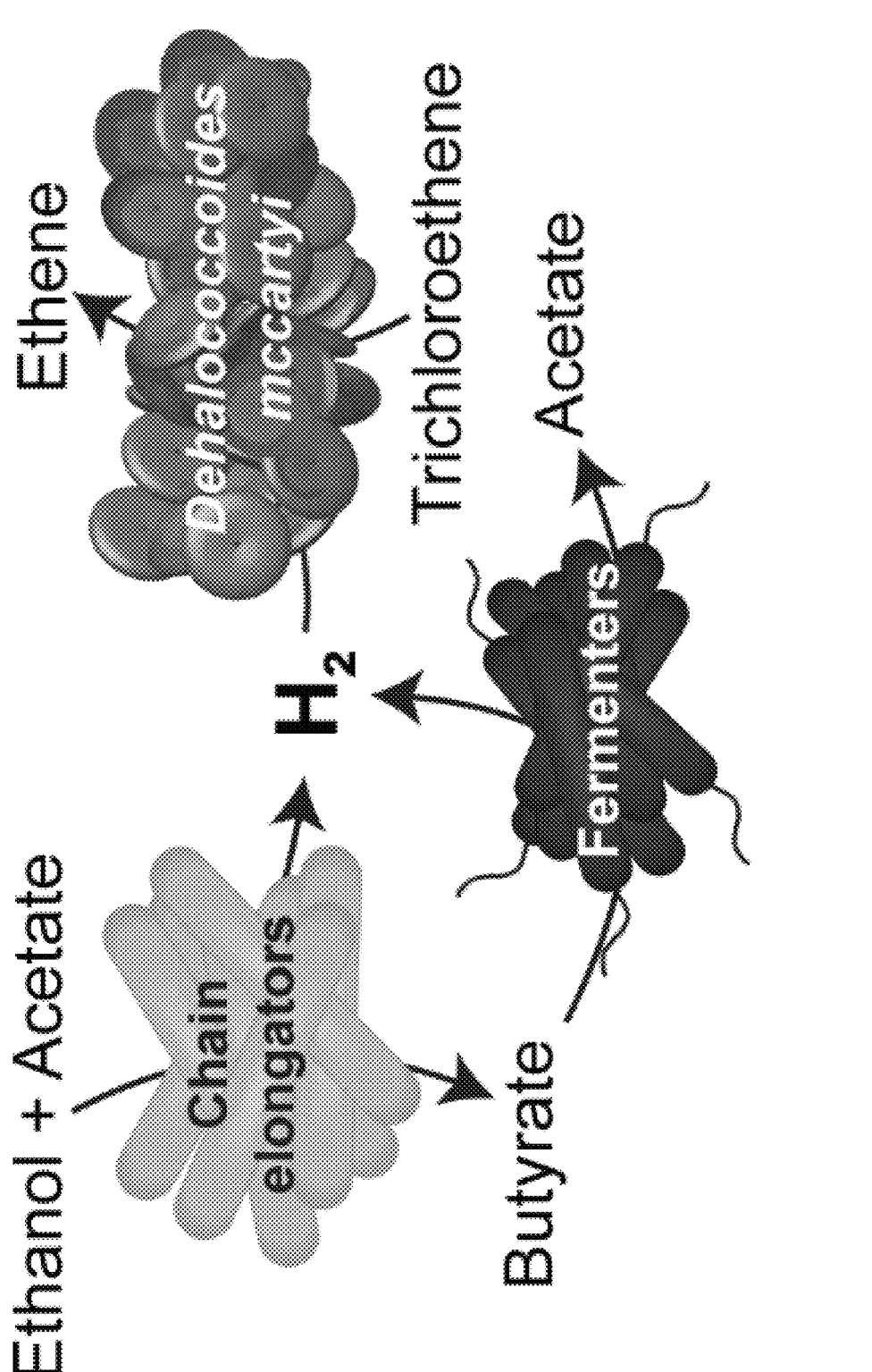
FIG. 1 is a graphic demonstrating the conversion of ethanol and acetate to H$_2$ and butyrate, the conversion of butyrate to H$_2$ and acetate, and the consumption of H$_2$ to convert chloroethenes to ethene.

The present invention relates to the unexpected discovery that microbial chain elongation can be coupled with fermentation to produce $H_2$ for microbial reductive dehalogenation, which can efficiently remediate halogenated compounds.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

As used herein, the term "alkyl," by itself or as part of another substituent means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. Other examples include ($C_1$-$C_6$) alkyl, such as, but not limited to, ethyl, methyl, isopropyl, isobutyl, n-pentyl, n-hexyl and cyclopropylmethyl.

As used herein, the term "alkenyl," employed alone or in combination with other terms, means, unless otherwise stated, a stable mono-unsaturated or di-unsaturated straight chain or branched chain hydrocarbon group having the stated number of carbon atoms. Examples include vinyl, propenyl (or allyl), crotyl, isopentenyl, butadienyl, 1,3-pentadienyl, 1,4-pentadienyl, and the higher homologs and isomers. A functional group representing an alkene is exemplified by $—CH_2—CH=CH_2$.

As used herein, the term "substituted alkyl," "substituted cycloalkyl," "substituted alkenyl" or "substituted alkynyl" means alkyl, cycloalkyl, alkenyl or alkynyl, as defined above, substituted by one, two or three substituents. In one embodiment, the substituents are selected from the group consisting of halogen, —OH, alkoxy, tetrahydro-2-H-pyranyl, —NH₂, —N(CH₃)₂, (1-methyl-imidazol-2-yl), pyridin-2-yl, pyridin-3-yl, pyridin-4-yl, —C(=O)OH, trifluoromethyl, —C≡N, —C(=O)O($C_1$-$C_4$)alkyl, —C(=O)NH₂, —C(=O)NH($C_1$-$C_4$)alkyl, —C(=O)N(($C_1$-$C_4$)alkyl)₂, —SO₂NH₂, —C(=NH)NH₂, and —NO₂, In one embodiment, one or two substituents are present and include halogen, —OH, alkoxy, —NH₂, trifluoromethyl, —N(CH₃)₂, and —C(=O)OH. In one embodiment, the substituents include halogen, alkoxy and —OH. Examples of substituted alkyls include, but are not limited to, 2,2-difluoropropyl, 2-carboxycyclopentyl and 3-chloropropyl.

As used herein, the term "halo" or "halogen" alone or as part of another substituent means, unless otherwise stated, a fluorine, chlorine, bromine, or iodine atom. In one embodiment, halo includes fluorine, chlorine, or bromine. In one embodiment, halo includes fluorine or chlorine.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

In one aspect, the present invention relates to a system for environmental bioremediation of chlorinated solvents, comprising at least one bacterial strain capable of microbial chain elongation; and at least one bacterial strain capable of reductive dehalogenation. In one embodiment, the system further comprises an alcohol. In one embodiment, the system further comprises a carboxylate.

In one embodiment, the bacterial strain capable of microbial chain elongation is part of a culture comprising organohalide-respiring bacteria. Exemplary cultures include but are not limited to MAT-1. In one embodiment, the at least one bacterial strain capable of microbial chain elongation comprises *Clostridium kluyveri*. In one embodiment, the chain elongation culture comprises a high abundance of *Firmicutes*. In one embodiment, the chain elongation culture comprises one or more of the following bacterial species: *Clostridium kluyveri, Megasphaera elsdenii, Megasphaera indica, Megasphaera hexanoica, Eubacterium limosurn, Caproiciproducens* sp., and *Eubacterium pyruvativorans*.

In one embodiment, the chain elongating culture is a mixture of cultures previously shown to be capable of chain elongation. In one embodiment, the chain elongating culture is provided as a soil sample that has previously been shown to effect chain elongation. In one embodiment, the chain elongating culture has been shown to convert ethanol and acetate to longer-chain carboxylates such as, but not limited to, butyrate and caproate. In one embodiment, the chain elongating culture has been shown to produce H₂ as a by-product of chain elongation.

In one embodiment, the system comprises reductive dehalogenating mixed cultures. In one embodiment, the reductive dehalogation comprises reductive dechlorination. In one embodiment, the reductive dehalogenation comprises replacing one or more halogen atoms in a compound with a hydrogen atom. In one embodiment, the halogen atom is selected from the group consisting of fluorine, chlorine, bromine, and iodine.

In one embodiment, the at least one bacterial strain capable of reductive dehalogenation is part of a culture such as but not limited to ZARA-10, BAC-9, SCD-9, Donna II, KB-1, ANAS, and BTF08. In one embodiment, the at least one bacterial strain capable of reductive dehalogenation comprises *Dehalococcoides mccartyi*. Exemplary strains capable of complete dehalogenation to ethene include, but are not limited to, *Dehalococcoides mccartyi* strain BAV1, *Dehalococcoides mccartyi* strain VS, *Dehalococcoides mccartyi* strain GT, *Dehalococcoides mccartyi* strain ANAS1, *Dehalococcoides mccartyi* strain ANAS2, *Dehalococcoides mccartyi* strain 11a, and *Dehalogenimonas etheniformans*. Exemplary strains capable of completing intermediate steps of the reduction to ethene include, but are not limited to, *Dehalococcoides mccartyi* strain 195, *Dehalococcoides mccartyi* strain CBDB1, *Dehalococcoides mccartyi* strain MB, *Dehalococcoides mccartyi* strain 11a5, *Dehalococcoides mccartyi* strain FL2, *Dehalococcoides mccartyi* strain CG1, *Dehalococcoides mccartyi* strain CG4, *Dehalococcoides mccartyi* strain CG5, *Dehalogenimonas* sp., *Dehalobacter restrictus, Geobacter lovleyi, Desulfitobacterium* sp., *Desulfitobacterium hafniense, Desulfuromonas chloroethenica, Sulfurospirillum (Dehalospirillum dehalogenans)*, and *Deltaproteobacteria* sp.

In one embodiment, the at least one bacterial strain capable of reductive dehalogenation comprises ethene-producing *D. mccartyi* strains, other organohalide-respiring bacteria performing PCE or TCE to cis-DCE dehalogenation, fermenters, and methanogens. In one embodiment, the system comprises methanogenic *Archaea* stains. In one embodiment, the at least one bacterial strain capable of reductive dehalogenation is capable of converting $H_2$ and at least one chloroethene selected from the group consisting of vinyl chloride, cis-1,2-dichloroethene, trichloroethene, and perchloroethene to ethene. In one embodiment, the at least one bacterial strain capable of reductive dehalogenation comprises a strain capable of hydrogenotrophic reductive dehalogenation.

In one embodiment, the system comprises a bacterial strain from a phyla selected from the group consisting of *Lysobacter, Sulfuricurvum, Thiobacillus, Bacillus, Streptomyces, Desulfoprunum, Desulfomicrobium, Sedimentibacter, Proteobacteria, Firmicutes, Desulfobacteria, Campilobacterota, Chloroflexi, Bacteriodota, Actinobacteria*, or *Acidobacteriota*.

In one embodiment, the system comprises a bacterial strain selected from the group consisting of *Methanobacterium congolense, Sulfospirillum, Anaeromyobacter, Geotalea, Geobacter, Desulfobulbus*, such as *Desulfovibrio alcoholivorans* or *Desulfovibrio oxamicus, Dehalococcoides, Actinobacteriota, Psuedomonas, Aquabacterium, Azospira, Lysobacter, Streptococcus, Desulfitobacterium*, and *Clostridium kluyveri*.

In one embodiment, the system further comprises at least one bacterial strain capable of fermentation of chain-elongation organic compounds. In one embodiment, the at least one bacterial strain capable of fermentation of chain-elongated organic compounds comprises any strain which is capable of converting longer-chain carboxylates to shorter chain carboxylates with concommitant generation of $H_2$. In one embodiment, the at least one bacterial strain capable of fermentation of chain-elongation organic compounds is capable of converting a longer-chain carboxylate selected from the group consisting of butyrate and caproate to acetate and $H_2$. Fermentation strains may include, but are not limited to *Clostridium, Syntrophomonas, Desulfovibrio desulfuricans, Desulfotomaculum*, and *Desulfosporosinus*. In one embodiment, the fermentation strain is added to the system. In one embodiment, the formation strain may be a component of any other culture described herein. In one embodiment, the fermentation strain is found naturally in the environment.

In one embodiment, the alcohol is selected from the group consisting of methanol, ethanol, propanol, butanol, and the like. For alcohols having more than 2 carbon atoms, both the straight-chain and branched isomers are contemplated.

As contemplated herein, "carboxylate" includes both organic acids and organic esters. In one embodiment, the carboxylate comprises an alkyl ester. In one embodiment, the carboxylate comprises an acetate ester. In one embodiment, the carboxylate comprises an alkyl acetate ester. In one embodiment, the carboxylate comprises methyl acetate. In one embodiment, the carboxylate comprises ethyl acetate. In one embodiment, the carboxylate is an organic acid such as acetate ($CH_3CO_2^-$), propionate, butyrate, or caproate. Also contemplated are inorganic salts or the respective acid (i.e., protonated form) of the carboxylate.

In one embodiment, the alcohol and carboxylate are present in a molar ratio between 10:1 and 1:10 alcohol:carboxylate. In one embodiment, the alcohol and carboxylate are present in a molar ratio between 9:1 and 1:9 alcohol:carboxylate. In one embodiment, the alcohol and carboxylate are present in a molar ratio between 8:1 and 1:8 alcohol:carboxylate. In one embodiment, the alcohol and carboxylate are present in a molar ratio between 7:1 and 1:7 alcohol:carboxylate. In one embodiment, the alcohol and carboxylate are present in a molar ratio between 6:1 and 1:6 alcohol:carboxylate. In one embodiment, the alcohol and carboxylate are present in a molar ratio between 5:1 and 1:5 alcohol:carboxylate. In one embodiment, the alcohol and carboxylate are present in a molar ratio between 4:1 and 1:4 alcohol:carboxylate. In one embodiment, the alcohol and carboxylate are present in a molar ratio between 3:1 and 1:3 alcohol:carboxylate. In one embodiment, the alcohol and carboxylate are present in a molar ratio between 2:1 and 1:2 alcohol:carboxylate.

In one embodiment, the molar concentration of alcohol in the alcohol/carboxylate solution is at least 10 times that of the carboxylate. In one embodiment, the molar concentration of alcohol in the alcohol/carboxylate solution is at least 9 times that of the carboxylate. In one embodiment, the molar concentration of alcohol in the alcohol/carboxylate solution is at least 8 times that of the carboxylate. In one embodiment, the molar concentration of alcohol in the alcohol/carboxylate solution is at least 7 times that of the carboxylate. In one embodiment, the molar concentration of alcohol in the alcohol/carboxylate solution is at least 6 times that of the carboxylate. In one embodiment, the molar concentration of alcohol in the alcohol/carboxylate solution is at least 5 times that of the carboxylate. In one embodiment, the molar concentration of alcohol in the alcohol/carboxylate solution is at least 4 times that of the carboxylate. In one embodiment, the molar concentration of alcohol in the alcohol/carboxylate solution is at least 3 times that of the carboxylate. In one embodiment, the molar concentration of alcohol in the alcohol/carboxylate solution is at least double that of the carboxylate. In one embodiment, the molar concentration of alcohol in the alcohol/carboxylate solution is at least equal to that of the carboxylate.

In one embodiment, the solution further comprises nutrients and/or vitamins that promote activity of the bacterial strains. In one embodiment, the solution comprises one or more of the following additives: trace element A (copper, zinc, iron, and selenium), trace element B (. Additional additives include inorganic salts such as $NH_4VO_3$, $NH_4Cl$, $CaCl_2$, $CuSO_4$, $FeSO_4$, $FeCl_2$, $CoCl_2$, $MnCl_2$, $ZnCl_2$, $H_3BO_3$, $Na_2MoO_3$, $NiCl_2$, $CuCl_2$, $Na_2WO_4$, $MgCl_2$, $MgSO_4$, $MnSO_4$, $(NH_4)_2MoO_4$, $NiCl_2$, $KCl$, $KH_2PO_4$, $NaOAc$, $NaCl$, $NaSiO_3$, $Na_2HPO_4$, $Na_2SeO_3$, $SnCl_2$, $ZnSO_4$, $AlCl_3$, $AgNO_3$, $BaOAc_2$, $KBr$, $CdCl_2$, $CrCl_3$, $NaF$, $GeO_2$, $KI$, $RbCl$, $ZrOCl_2$, and hydrates thereof; amino acids such as L-Alanine, L-Arginine•HCl, L-Asparagine•H2O, L-Aspartic Acid, L-Cysteine•HCl•H2O, L-Glutamic Acid, L-Glutamine, Glycine, L-Histidine•HCl•H2O, L-Isoleucine, L-Leucine, L-Lysine•HCl, L-Methionine, L-Phenylalanine, L-Proline, L-Serine, L-Threonine, L-Tryptophan, L-Tyrosine•2Na•2H2O, and L-Valine; vitamins such as D-Biotin, Choline Chloride, Folic Acid, Folinic Acid•Ca, myo-Inositol, Niacinamide, Calcium Pantothenate, Pyridoxine•HCl, p-Aminobenzoic acid, Riboflavin, Thiamine•HCl, and Vitamin B-12; or other additive such as Adenine•HCl, D-Glucose, HEPES, Hypoxanthine, Linoleic Acid, Phenol Red•Na, Putrescine•2HCl, Pyruvic Acid•Na, Thioctic Acid, and Thymidine.

In one embodiment, the system reduces a chlorinated pollutant through a process that replaces a chloride substituent with a hydrogen atom. In one embodiment, the chlorinated pollutant is selected from the group consisting of vinyl chloride, dichloroethene, trichloroethene, perchloroethene, chlorinated ethanes, polychlorinated biphenyls (PCBs), and polychlorinated benzenes Methods of the Invention In one aspect, the present invention relates to a method of remediating an environmental sample, the method comprising the steps of treating an environmental sample comprising at least one chlorinated pollutant with the remediation composition; wherein the remediation composition comprises: at least one bacterial strain capable of microbial chain elongation; and at least one bacterial strain capable of reductive dehalogenation.

In one embodiment, the at least one bacterial strain capable of microbial chain elongation comprises any bacterial strain discussed herein. In one embodiment, the at least one bacterial strain capable of reductive dehalogenation comprises any bacterial strain discussed herein.

In one embodiment, the method further comprises the step of adding *Dehalococcoides mccartyi* to the remediation composition. In one embodiment, the remediation composition further comprises *Dehalococcoides mccartyi*.

In one embodiment, the remediation composition further comprises an alcohol and a carboxylate. In one embodiment, the alcohol and carboxylate are present in a molar ratio between 10:1 and 1:10 alcohol:carboxylate. In one embodiment, the alcohol and carboxylate are present in a molar ratio between 9:1 and 1:9 alcohol:carboxylate. In one embodiment, the alcohol and carboxylate are present in a molar ratio between 8:1 and 1:8 alcohol:carboxylate. In one embodiment, the alcohol and carboxylate are present in a molar ratio between 7:1 and 1:7 alcohol:carboxylate. In one embodiment, the alcohol and carboxylate are present in a molar ratio between 6:1 and 1:6 alcohol:carboxylate. In one embodiment, the alcohol and carboxylate are present in a molar ratio between 5:1 and 1:5 alcohol:carboxylate. In one embodiment, the alcohol and carboxylate are present in a molar ratio between 4:1 and 1:4 alcohol:carboxylate. In one embodiment, the alcohol and carboxylate are present in a molar ratio between 3:1 and 1:3 alcohol:carboxylate. In one embodiment, the alcohol and carboxylate are present in a molar ratio between 2:1 and 1:2 alcohol:carboxylate.

In one embodiment, the molar concentration of alcohol in the alcohol/carboxylate solution is at least 10 times that of the carboxylate. In one embodiment, the molar concentration of alcohol in the alcohol/carboxylate solution is at least 9 times that of the carboxylate. In one embodiment, the molar concentration of alcohol in the alcohol/carboxylate solution is at least 8 times that of the carboxylate. In one embodiment, the molar concentration of alcohol in the alcohol/carboxylate solution is at least 7 times that of the carboxylate. In one embodiment, the molar concentration of alcohol in the alcohol/carboxylate solution is at least 6 times that of the carboxylate. In one embodiment, the molar concentration of alcohol in the alcohol/carboxylate solution is at least 5 times that of the carboxylate. In one embodiment, the molar concentration of alcohol in the alcohol/carboxylate solution is at least 4 times that of the carboxylate. In one embodiment, the molar concentration of alcohol in the alcohol/carboxylate solution is at least 3 times that of the carboxylate.

In one embodiment, the chlorinated pollutant is selected from the group consisting of vinyl chloride, dichloroethene, trichloroethene, perchloroethene, chlorinated ethanes, polychlorinated biphenyls (PCBs), and polychlorinated benzenes Kits of the Invention In one aspect, the present invention relates to a kit for remediation of halogenated compounds such as chloroethenes, the kit comprising a remediation composition and instructions for using the remediation composition; wherein the remediation composition comprises at least one bacterial strain capable of microbial chain elongation; at least one bacterial strain capable of fermentation of chain-elongated organic compounds; and at least one bacterial strain capable of reductive dehalogenation. In one embodiment, the kit further comprises ethanol. In one embodiment, the kit further comprises a carboxylate. In one embodiment, the kit comprises microbial chain elongation strain *Clostridium kluyveri* and reductive dehalogenation strain *Dehalococcoides mccartyi*.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the systems practice the claimed methods of the present invention. The following working examples therefore, specifically point out the preferred embodiments of the present invention, and are not to be construed as limiting in any way the remainder of the disclosure.

Example 1: Microbial Chain Elongation and Subsequent Fermentation of Elongated Carboxylates as $H_2$-Producing Processes for Sustained Reductive Dehalogenation of Chlorinated Ethenes In-situ anaerobic groundwater bioremediation of trichloroethene (TCE) to non-toxic ethene is contingent on organohalide-respiring *Dehalococcoidia*, most commonly the strictly hydrogenotrophic *D. mccartyi*. The $H_2$ requirement for *D. mccartyi* is fulfilled by adding various organic substrates (e.g., lactate, emulsified vegetable oil, glucose/molasses), which require fermenting microorganisms to convert them to $H_2$. The net flux of $H_2$ is a crucial controlling parameter in the efficacy of bioremediation. $H_2$ consumption by competing microorganisms (e.g., methanogens, homoacetogens) can diminish rates of reductive dehalogenation or stall the process altogether. Furthermore, some fermentation pathways do not produce $H_2$ or having $H_2$ as a product is not always thermodynamically favorable under environmental conditions. Here, we report on a novel application of microbial chain elongation as a $H_2$-producing process for reductive dehalogenation (FIG. 1). In soil microcosms bioaugmented with dehalogenating and chain-elongating enrichment cultures, near stoichiometric conversion of TCE ($0.07\pm0.01$, $0.60\pm0.03$, and $1.5\pm0.20$ mmol $L^{-1}$ added sequentially) to ethene was achieved when initially stimulated by chain elongation of acetate and ethanol. Chain elongation initiated reductive dehalogenation by liberating $H_2$ in the conversion of acetate and ethanol to butyrate and caproate. Syntrophic fermentation of butyrate, a chain-elongation product, to $H_2$ and acetate further sustained reductive dehalogenation activity Methanogenesis was limited during TCE dehalogenation in soil microcosms and absent in transfer cultures fed with chain elongation substrates. This study provides critical fundamental knowledge towards the feasibility of chlorinated solvent bioremediation based on microbial chain elongation.

While obscure to the field of bioremediation, one reliable $H_2$-producing microbial process is chain elongation of carboxylates, commonly referred to as microbial chain elongation. In microbial chain elongation, anaerobic microorganisms obtain energy for growth by combining simple short-chain carboxylates, such as acetate (C2), with more reduced compounds, such as ethanol (C2), producing butyrate (C4) and/or caproate (C6) and $H_2$ (FIG. 2, Reactions 11 and 12). Microorganisms capable of carboxylate chain elongation have been enriched from anaerobic natural and engineered environments including soils, sediments, intestinal tracts of animals, wastewater sludges, and open-culture bioreactors fed with acetate and ethanol or complex organic substrates.

Chain elongation through reverse β-oxidation by *Clostridium kluyveri*, the model microorganism for this process, is largely known for its niche in biotechnologies focused on conversion of various organic carbon-rich feedstocks into medium-chain carboxylates (C6-C8). Reverse β-oxidation is driven by energy-rich, reduced compounds (i.e., ethanol) and a $H_2$ partial pressure greater than $10^{-1}$ kPa. Chain elongation is initiated by the oxidation of a portion of ethanol via acetaldehyde to acetate (FIG. 2, Reaction 8) generating the initial energy in the form of ATP. The remaining ethanol is converted to acetyl-CoA, promoting chain elongation of acetate to butyrate via acetoacetyl-CoA, 3-hydroxybutyryl-CoA, crotonyl-CoA, and butyryl-CoA as intermediates, increasing the carbon (C) chain length by two C atoms per cycle. Microbial chain elongation of acetate and ethanol does not produce $HCO_3^-/CO_2$ (FIG. 2, Reactions 11-12). $H_2$ is generated via ferredoxin-dependent hydrogenases. Elongation of carboxylates is always coupled to $H_2$ production and was first observed in the pioneering studies with *C. kluyveri* from the 1930s and 1940s.

In this study, complete TCE reductive dehalogenation to ethene by *D. mccartyi* is effected through $H_2$ production from chain elongation of acetate and ethanol to butyrate and/or caproate and through subsequent syntrophic fermentation of chain elongation products. Data from this work support the feasibility of chlorinated ethenes groundwater bioremediation schemes based on microbial chain elongation.

Materials and Methods

Laboratory Medium, Aquifer Materials, and Microbial Inocula $HCO_3^-$-free anaerobic mineral medium was prepared using the Hungate technique according to the protocol described and bottled under a stream of ultra-high purity $N_2$ gas. The following solutions were added per liter medium: 10 mL salts, 1 mL trace element A, 1 mL trace element B, and 1 mL vitamins. The composition of these solutions was as described in Löffler et al., except the concentrations of NaCl and $MgCl_2 \times 6H_2O$ were decreased ten times and $CaCl_2 \times 2H_2O$ concentration was decreased three times. The composition of the medium solutions used in this study are tabulated in Table 1, Table 2, Table 3, and Table 4. Vitamin $B_{12}$ (0.5 mg per liter medium) was supplemented from a 1 g $L^{-1}$ solution. 0.2 mM $Na_2S$ and 0.4 mM L-cysteine were added as reductants. Potassium phosphate, a common laboratory buffer for reductive dehalogenation studies was initially added at 10 mM and the medium pH was adjusted to 7.5 with a 10 N NaOH solution.

TABLE 1

Composition of 1 L of salt stock solution used for medium preparation.

| Compound | Amount (g) |
| --- | --- |
| NaCl | 10 |
| $MgCl_2 \times 6H_2O$ | 5 |
| $KH_2PO_4$ | 20 |
| $NH_4Cl$ | 30 |
| KCl | 30 |
| $CaCl_2 \times 2H_2O$ | 0.5 |

TABLE 2

Composition of 1 L of trace element solution A used for medium preparation.

| Compound | Amount |
| --- | --- |
| HCl (25% solution) | 10 mL |
| $FeCl_2 \times 4H_2O$ | 1.5 g |
| $CoCl_2 \times 6H_2O$ | 0.19 g |
| $MnCl_2 \times 4H_2O$ | 0.1 g |
| $ZnCl_2$ | 70 mg |
| $H_3BO_3$ | 6 mg |
| $Na_2MoO_3 \times 2H_2O$ | 36 mg |
| $NiCl_2 \times 6H_2O$ | 24 mg |
| $CuCl_2 \times 2H_2O$ | 2 mg |

TABLE 3

Composition of 1 L of trace element solution B used for medium preparation.

| Compound | Amount (mg) |
| --- | --- |
| $Na_2SeO_3 \times 5H_2O$ | 6 |
| $Na_2WO_4 \times 2H_2O$ | 8 |
| NaOH | 500 |

TABLE 4

Composition of 1 L of vitamin solution.

| Compound | Amount (mg) |
| --- | --- |
| Folic acid | 20 |
| Pyridoxine hydrochloride | 100 |
| Riboflavin | 50 |
| Biotin | 20 |
| Thiamine | 50 |
| Nicotinic acid | 50 |
| Calcium Pantothenate | 50 |
| Vitamin B12 | 1 |
| p-Aminobenzoic acid | 50 |
| Thioctic acid | 50 |

Aquifer materials (soil and groundwater) were retrieved from the Phoenix Goodyear Airport-North (PGAN) Superfund site, Goodyear, AZ, USA, as described. The soil was collected from a 25-52 m depth and contained silty sand, clayey sand, well graded sand, and poorly graded sand. The groundwater was collected from a 34-46 m depth (upper aquifer), had a pH of 7.78±0.10, and an oxidation-reduction potential of 150±30 mV. Potassium phosphate (10 mM) was added when groundwater was used in experiments but salts solution, trace element solutions, vitamins, $Na_2S$, and L-cysteine were not supplemented.

Figure 3:
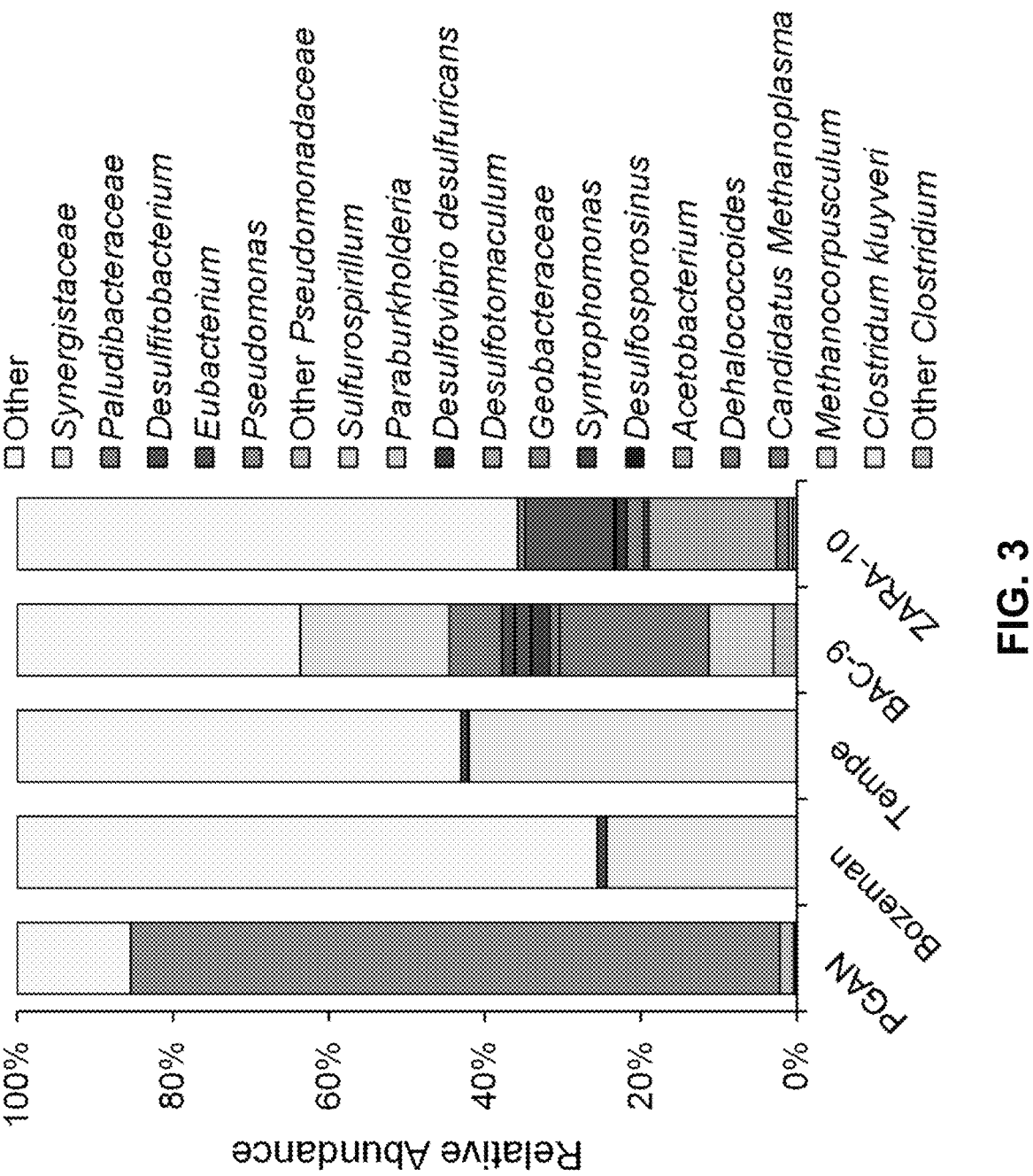
FIG. 3 is a plot showing microbial community composition of aquifer materials from Phoenix-Goodyear Airport-North (PGAN) Superfund site and inocula cultures before using in microcosms experiments. Data for Bozeman and Tempe chain-elongating enrichment cultures were published in Joshi et al. The ISME Journal, 15, 1907-1918, 2021 and PGAN materials in Mohana Rangan, S. et al., Environ. Sci. Technol. 2020, 54, (22), 14422-14431. BAC-9 and ZARA-10 used as inocula in these experiments are average sequences from triplicate cultures.

Microbial inocula consisted of two reductively-dehalogenating and two chain-elongating enrichment cultures; these were combined to capture a range of microorganisms and increase microbial diversity. The reductively-dehalogenating inoculum was a 50:50 (v v$^{-1}$) mixture of cultures ZARA-10 (Arizona State University) and BAC-9 (EOS Remediation LLC, Research Triangle Park, NC, USA). ZARA-10 and BAC-9 contain microorganisms with similar functions (e.g., ethene-producing *D. mccartyi* strains, other organohalide-respiring bacteria performing PCE or TCE to cis-DCE dehalogenation, fermenters, and methanogens). However, they have distinct microbial community compositions (FIG. 3). Methanogenic *Archaea* are more active in BAC-9, as determined in a previous study where these cultures were incubated under the same conditions. Before using in the experiments from this study, ZARA-10 and BAC-9 were fed with TCE, lactate, and methanol in serum batch bottles as previously performed to ensure active reductively-dehalogenating populations. The chain-elongating inoculum was a 50:50 (v v$^{-1}$) mixture of cultures enriched from soils from Tempe, AZ and Bozeman, MT. The chain-elongating soil enrichments were grown in serum receive TCE, and W/out MCE were biostimulated and bioaugmented only with the reductively-dehalogenating inocula. W/out inocula were not bioaugmented. Approximately 2×10$^6$ *D. mccartyi* cells were introduced in the bioaugmented microcosms (inferred from quantitative real-time PCR measurements targeting the 16S rRNA gene of *D. mccartyi*). The initial concentration of TCE in soil microcosms was ~0.07 mmol L$^{-1}$ (nominal). TCE was re-added two more times at increasing concentrations in TCE+MCE and TCE+MCE-GW microcosms: ~0.6 mmol L$^{-1}$ on day 18 and ~1.5 mmol L$^{-1}$ on day 72 (Table 5). Each re-addition of TCE was performed when the previous dose was completely dehalogenated. Groundwater and soil used in the microcosms (Table 5) had an initial concentration of 2.7±0.1 mM HCO$_3^-$ and 2.0±0.0 mM HCO$_3^-$, respectively. All microcosms, except W/out MCE, were incubated in the dark at 30° C. and shaken on a platform shaker at 150 rpm for 115 days (end of experiment). W/out MCE microcosms were incubated only for 18 days (end of experiment).

TABLE 5

Experimental conditions established in this study. All microcosms and transfers cultures were tested in triplicate. TCE = trichloroethene; MCE = microbial chain elongation; GW = groundwater; T = transfer.

| Label | Soil (g) | Medium (mL) | TCE (mmol L$^{-1}$) | Ethanol (mM) | Acetate (mM) | Inoculum (mL) |
|---|---|---|---|---|---|---|
| TCE + MCE | 10 | 80 | 0.06 ± 0.00; 0.55 ± 0.03$^a$; 1.36 ± 0.11$^b$ | 53 ± 11 | 57 ± 8 | 10$^{c, d, e}$ |
| TCE + MCE-GW | 10 | 80$^f$ | 0.07 ± 0.01; 0.59 ± 0.01$^a$; 1.63 ± 0.02$^b$ | 50 ± 10 | 50 ± 0 | 10$^{c, d, e}$ |
| MCE | 10 | 80 | 0.00 | 55 ± 4 | 53 ± 1 | 10$^{c, d, e}$ |
| W/out inocula | 10 | 90 | 0.07 ± 0.01 | 52 ± 8 | 54 ± 1 | 0 |
| W/out MCE | 10 | 95 | 0.07 ± 0.00 | 59 ± 1 | 55 ± 1 | 5$^c$ |
| T-Acetate + Ethanol | 0 | 97.5 | 0.55 ± 0.04 | 46 ± 5 | 54 ± 1 | 2.5$^g$ |
| T-Ethanol | 0 | 97.5 | 0.51 ± 0.02 | 101 ± 1 | 0 | 2.5$^g$ |
| T-Acetate | 0 | 97.5 | 0.51 ± 0.01 | 0 | 101 ± 1 | 2.5$^g$ |

Readded on $^a$day 18 and $^b$day 72.
$^c$2.5 mL each of cultures ZARA-10 and BAC-9.
$^d$2.5 mL each of cultures Tempe and Bozeman.
$^e$1.39 ± 0.41 mM butyrate, 0.83 ± 0.63 mM butanol, and 0.58 ± 0.20 mM caproate introduced in microcosms from Tempe and Bozeman chain-elongating inocula.
$^f$Site groundwater.
$^g$Supernatant from TCE + MCE soil microcosms.

bottles with 100 mM acetate and 100 mM ethanol in semi-batch cycles. Tempe and Bozeman chain-elongating cultures contain a high abundance of *Firmicutes*, including putative *C. kluyveri* sp., as surveyed by high throughput sequencing of the 16S rRNA gene.

Reductive Dehalogenation and Chain Elongation in Soil Microcosms

Microcosms in triplicate were established in 120 mL glass serum bottles according to Table 5. Each microcosm contained 10 g soil and reduced anaerobic mineral medium (or groundwater, as noted in Table 5). All soil microcosms were amended with acetate (avg. 54±4 mM initial concentration) and ethanol (avg. 54±7 mM initial concentration). The acetate and ethanol concentrations provided were in the range used in microbial chain elongation studies focused on conversion of substrates to C4-C6 carboxylates and alcohols. Conditions TCE+MCE (MCE=microbial chain elongation) and TCE+MCE-GW (GW=groundwater) consisted of biostimulated and bioaugmented soil microcosms with mineral medium and groundwater, respectively (Table 5). MCE were biostimulated and bioaugmented but did not Gas and Liquid Chemical Analyses Gas samples (200 µL) were extracted from the headspace of the bottles. Chlorinated ethenes, ethene, and methane were measured using a gas chromatograph (GC, Shimadzu GC-2010, Columbia, MD, USA) with a flame ionization detector (FID), a Rt-QS-BOND capillary column (Restek; Bellefonte, PA), and H$_2$ as carrier gas. The calibration range for chlorinated ethenes and ethene was 5-250 µmol L$^{-1}$ gas. The detection limit for chlorinated ethenes and ethene was 0.2-0.6 µmol L$^{-1}$ gas. The calibration range for methane was 33-1300 µmol L$^{-1}$ gas and the detection limit was 12 µmol L$^{-1}$ gas. H$_2$ was measured using a Shimadzu GC-2010 with a thermal conductivity detector (TCD), a fused silica capillary column (Carboxen 1010 PLOT column, Supelco, Bellefonte, PA), and Ar as carrier gas. The H$_2$ calibration range was 0.051-5.1 mmol L$^{-1}$ gas and H$_2$ detection limit for the GC-TCD was 0.02 mmol L$^{-1}$ gas. The total gas volume in bottles was measured using Perfektum matched numbered hypodermic syringes (Sigma-Aldrich, St. Louis, MO, USA) during every gas sampling event. Gas concentrations (mmol $L^{-1}$) of chlorinated ethenes, ethene, methane, and $H_2$ were converted to nominal concentrations in the bottles (mmol $L^{-1}$).

Acetate, ethanol, butyrate, butanol, and caproate were measured using a high performance liquid chromatograph (HPLC) equipped with an Aminex HPX-87H column (Bio-Rad Laboratories, Hercules, CA, USA) as detailed previously. Samples for HPLC consisted of 1.5 mL microcosm slurry or transfer culture (described in a following section) filtered through a 0.2 µm PDVF filter (MDI Membrane Technologies, Harrisburg, PA, USA). The detection limit of carboxylates and alcohols was 0.02-0.05 mM (aqueous concentrations). Microbial chain elongation substrates and products in Figures are shown as mM C to aid the reader in following the carbon balance. Sulfate was measured using an ion chromatograph (IC, Metrohm 930 Compact IC Flex, Riverview, FL, USA) equipped with suppressed conductivity detector, a Metrosep A Supp 5 Guard/4.0 column (Metrohm), and a Metrosep A Supp 5-150/4.0 anion analytical column (Metrohm). The method employed an eluent containing 1 mM $NaHCO_3$ and 3.2 mM $Na_2CO_3$ (from Metrosep A Supp 5 eluent concentrate), a flow rate of 0.7 mL $min^{-1}$, and a temperature of 30° C. The calibration range was 0.001-1 mM and sulfate detection limit was 0.3 µM.

Alkalinity was used to estimate $HCO_3^-$ concentrations in the soil and groundwater used in this study. Soil alkalinity was measured by creating microcosms (10 g soil and 90 mL deionized water) and using 0.5 mL slurry (in triplicate) for analysis. Groundwater (0.5 mL samples in triplicate) was used directly for measurements. Alkalinity (in mg $CaCO_3$) was determined using a TNTplus 180 Vial Test (Hach, Loveland, CO, USA) and a Hach DR 2800 spectrophotometer according to the kit's protocol. The detection range of the test was 25-400 mg $L^{-1}$ $CaCO_3$. Alkalinity concentrations were converted to $HCO_3^-$ concentrations as described in Analysis and Calculations section in the Supporting Information. pH was measured from 0.5 mL samples using an Orion 2-star benchtop pH meter (Thermo Scientific, Waltham, MA) equipped with an Orion economy series pH electrode and calibrated with Orion pH 4.01, 7.00 and 10.01 standard solutions.

Microbial Community DNA-Amplicon Sequencing and Quantitative Real-Time PCR

Samples of 1 mL slurry were collected from all soil microcosms for microbial community analyses at day 0, day 46 or 56 (when the second TCE dose was converted to mostly ethene in TCE+MCE and TCE+MCE-GW) and day 115 (end of experiment). Each 1 mL sample was thoroughly mixed with 2.5 mL of RNAprotect Cell Reagent (Qiagen, Germantown, MD, USA) and stored at −80° C. until DNA extraction. Pellets for DNA extraction were made from 0.5 mL of microcosm slurry sample stored in RNAprotect reagent. Pellets were also made from 0.5 mL ZARA-10 and 0.5 mL BAC-9 inocula (*D. mccartyi*-containing cultures added to microcosms on day 0). Pellets were pre-treated with enzyme lysis buffer containing 20 mM Tris•HCl, 2 mM EDTA, 250 µg $mL^{-1}$ achromopeptidase, and 20 mg $mL^{-1}$ lysozyme. Genomic DNA was extracted using the Qiagen DNeasy Blood & Tissue Kit (MO BIO Laboratories Inc., Carlsbad, CA, USA) following the protocol for Gram-positive bacteria. The DNA concentration and purity were determined by measuring absorbance at wavelengths of 260 nm and 280 nm with a spectrophotometer (NanoDrop Technology, Rockland, DE, USA).

Microbial community amplicon sequencing was performed using an Illumina Miseq sequencer (San Diego, CA, USA). The universal bacterial primers were 515F and 806R for the V4 hyper-variable region of the 16S rRNA gene of *Bacteria* and *Archaea*. PANDASeq was used to pair forward and reverse reads and processed using Quantitative Insights into Microbial Ecology (QIIME 2,0 v. 2020.8) pipeline. DADA2 was used for quality control and for truncating each sequence at 250 bps, maintaining a quality score of 25 or better to produce amplicon sequence variants. A pre-trained Naïve Bayes classifier referencing SILVA database (v.138) and the q2-feature-classifier plug in was used to assign taxonomy to amplicon sequence variants (DeSantis, T. Z. et al., Appl. Environ. Microbiol. 2006, 72, (7), 5069). BLAST+ consensus taxonomy classifier plug in was used to compare study sequences against the National Center for Biotechnology (NCBI) database. The raw sequences were submitted to the National Center for Biotechnology (NCBI) Sequence Read Archive (SRA) and are available under the project number PRJNA551687 with accession numbers 5RX6379508-5RX6379570 and 5RX9606091-5RX9606096.

The concentrations of 16S rRNA gene of *D. mccartyi* and *Archaea* were quantified at day 0, day 46 or 56, and day 115 in all soil microcosms by quantitative real-time PCR (qPCR) using a QuantStudio 3 Real-Time PCR System (Applied Biosystems, Foster City, CA, USA). The qPCR assays contained the following per 10 µL reaction: 5 µL Takara Premix Ex Taq (Mountain View, CA, USA), 0.3 µL F' and 0.3 µL R' primers (Integrated DNA Technology, Coralville, IA, USA), 0.03 µL 5' 6-FAM/3' BHQ-1 probe (Integrated DNA Technology), 1.37 µL PCR water, and 4 µL DNA template. The DNA from experimental samples was diluted 1:10. No-template controls (using PCR water) were included in each run. Triplicate TaqMan reactions were set up for experimental samples, controls, and calibration (seven-point for *D. mccartyi* and six-point for *Archaea*). An automated epMotion 5070 liquid handling system (Eppendorf, Hauppauge, NY, USA) was used to perform serial dilutions for the calibration and set up the 96-well PCR plate.

Reductive Dehalogenation and Chain Elongation in Transfer Cultures

Transfer cultures in triplicate were created from TCE+ MCE microcosms at the end of incubation (Table 5). The transfer cultures consisted of 2.5% (v $v^{-1}$) microcosm supernatant in a final volume of 100 mL reduced mineral medium in 160 mL glass serum bottles. The cultures were amended with ~0.5 mM TCE and with either (i) 50 mM acetate and 50 mM ethanol (T-Acetate+Ethanol), or (ii) 100 mM ethanol (T-Ethanol), or (iii) 100 mM acetate (T-Acetate) (Table 5). The transfer cultures were incubated in the dark at 30° C. and shaken on a platform shaker at 150 rpm for 99 days (end of the experiment).

Calculations

Average and maximum rates ($\Delta C \ \Delta t^{-1}$) of reductive dehalogenation (mmol $Cl^-$ released $L^{-1} \ d^{-1}$), ethanol consumption (mmol C $L^{-1} \ d^{-1}$), and butyrate production (mmol C $L^{-1} \ d^{-1}$) were determined in soil microcosms and transfer cultures. An electron balance (distribution of electrons from substrates to end-products) was performed on day 115 for soil microcosms. Free-energy yields (kJ $mol^-$) at standard conditions, pH 7, and 25° C. (FIG. 2) and experimental conditions were calculated. Statistical significance of chemical and microbiological data was evaluated using a student's t-test with a 95% confidence interval ($p<0.05$ was considered statistically significant). An unpaired t-test was employed to compare chemical data across different conditions at the same time point and a paired t-test was used to compare microbiological data of a condition at different time points.

Analyses and Calculations

Concentrations of TCE, cis-DCE, VC, ethene, methane, and $H_2$ in the microcosms and transfer cultures are nominal concentration in the bottle ($C_n$, in units of mmol $L^{-1}$). Concentrations of mmol $L^{-1}$ gas TCE, cis-DCE, VC, ethene, methane, and $H_2$, measured from headspace gas samples via gas chromatography, were converted to nominal concentration using Equation 1:

$$C_n = \frac{V_g \times C_g + V_1 \times \frac{C_g}{H}}{V_1} \qquad \text{(Eq. 1)}$$

in which $V_g$ is the headspace volume (L), $C_g$ is the gas concentration in the headspace (mmol $L^{-1}$), $V_1$ is the liquid volume (L), $C_1$ is the aqueous concentration (mM aqueous), and H is Henry's constant (dimensionless). Values for H were obtained from Amos and Löffler (Amos, B. K.; Löffler, F. E., Chlorinated solvent partitioning calculator (Version 1.0 July 2008).

The bicarbonate concentration [$HCO_3^-$] in units of mM in the soil and groundwater from this study was estimated from the alkalinity (Alk) concentration according to Equation 2:

$$Alk = [HCO_3^-] + [OH^-] - [H^+] \qquad \text{(Eq. 2)}$$

in which the species in brackets are concentrations in M. Given the pH of soil and groundwater was near neutral, $CO_3^{-2}$ was assumed to be negligible.

Rates of reductive dehalogenation, ethanol consumption, and butyrate production ($\Delta C \, \Delta t^{-1}$) were calculated between sampling events in soil microcosms and/or transfer cultures according to Equation 3:

$$\frac{\Delta C}{\Delta t} = \frac{(C_{t2}) - (C_{t1})}{t_2 - t_1} \qquad \text{(Eq. 3)}$$

in which $C_t$ is the concentration of the compound and t is the sampling time in days. For reductive dehalogenation, $\Delta C$ $\Delta t^{-1}$ was calculated in units of mmol $Cl^-$ released $L^{-1}$ $d^{-1}$ by multiplying the nominal concentration (mmol $L^{-1}$) by the number of Cl atoms in each compound: cis-DCE, 1: VC, 2; and ethene, 3. For ethanol consumption and butyrate production, $\Delta C$ $\Delta t^{-1}$ was calculated in units of mmol C $L^{-1}$ $d^{-1}$ by multiplying the aqueous concentration (mM) by the number of C atoms in each compound: ethanol, 2; butyrate, 4.

An electron balance showing the distribution of electrons from acetate and ethanol to end-products was calculated as previously done on day 115 in soil microcosms (end of incubation). The concentrations of substrates and end-products were converted to millielectron equivalents. The millielectron equivalents per mol values used in the calculations were as follows: $H_2$, 2; cis-DCE, 2; VC, 4; ethene, 6; acetate, 8; methane, 8; sulfate, 8; ethanol, 12; butyrate, 20; butanol, 26; and caproate, 32.

Free-energy yields ($\Delta G^{0'}$, kJ $mol^{-1}$) of reactions at standard conditions, pH 7, and 25° C. presented in FIG. 2 were calculated assuming 1 M concentrations of solutes and 1 atm partial pressure of gasses and using Equation 4:

$$\Delta G^{0'} = \sum G_f^0 (\text{Products}) - \sum G_f^0 (\text{Reactants}) \qquad \text{(Eq. 4)}$$

where $G_f^0$ is the energy of formation (kJ $mol^{-1}$) of reactants and products. Free energy of formation values were obtained from Rittmann and McCarty for all compounds except oleate.

Free-energy yields ($\Delta G$, in units of kJ $mol^{-1}$) for butyrate fermentation (Reaction 5, FIG. 2), chain elongation of acetate and ethanol (Reaction 11, FIG. 2), and chain elongation of butyrate and ethanol (Reaction 12, FIG. 2) at experimental conditions in soil microcosms were determined using Equation 5:

$$\Delta G = \Delta G^0 + RT\ln(Q) \qquad \text{(Eq. 5)}$$

where $\Delta G^0$ is the free-energy yield at standard pressure and temperature (kJ $mol^-$), R is the gas constant (J $mol^-$ $K^-$) is the temperature (K), and Q is the reaction quotient for individual reactions. The following experimental gas pressures and solute concentrations were utilized to calculate free-energy yields: Reaction 5, $1.8 \times 10^{-4}$ atm $H_2$, $4.9 - 10^{-2}$ M butyrate, and $2.2 \times 10^{-2}$ M acetate; Reaction 11, $1.4 \times 10^{-2}$ atm $H_2$, $1.6 \times 10^{-3}$ M butyrate, $5.3 \times 10^{-2}$ M ethanol, and $5.7 \times 10^{-2}$ M acetate; Reaction 12, $3.2 \times 10^{-2}$ atm $H_2$, $5.8 \times 10^{-3}$ M butyrate, $7.9 \times 10^{-2}$ M ethanol, and $1.4 \times 10^{-4}$ M caproate.

Results and Discussion

Figure 4:
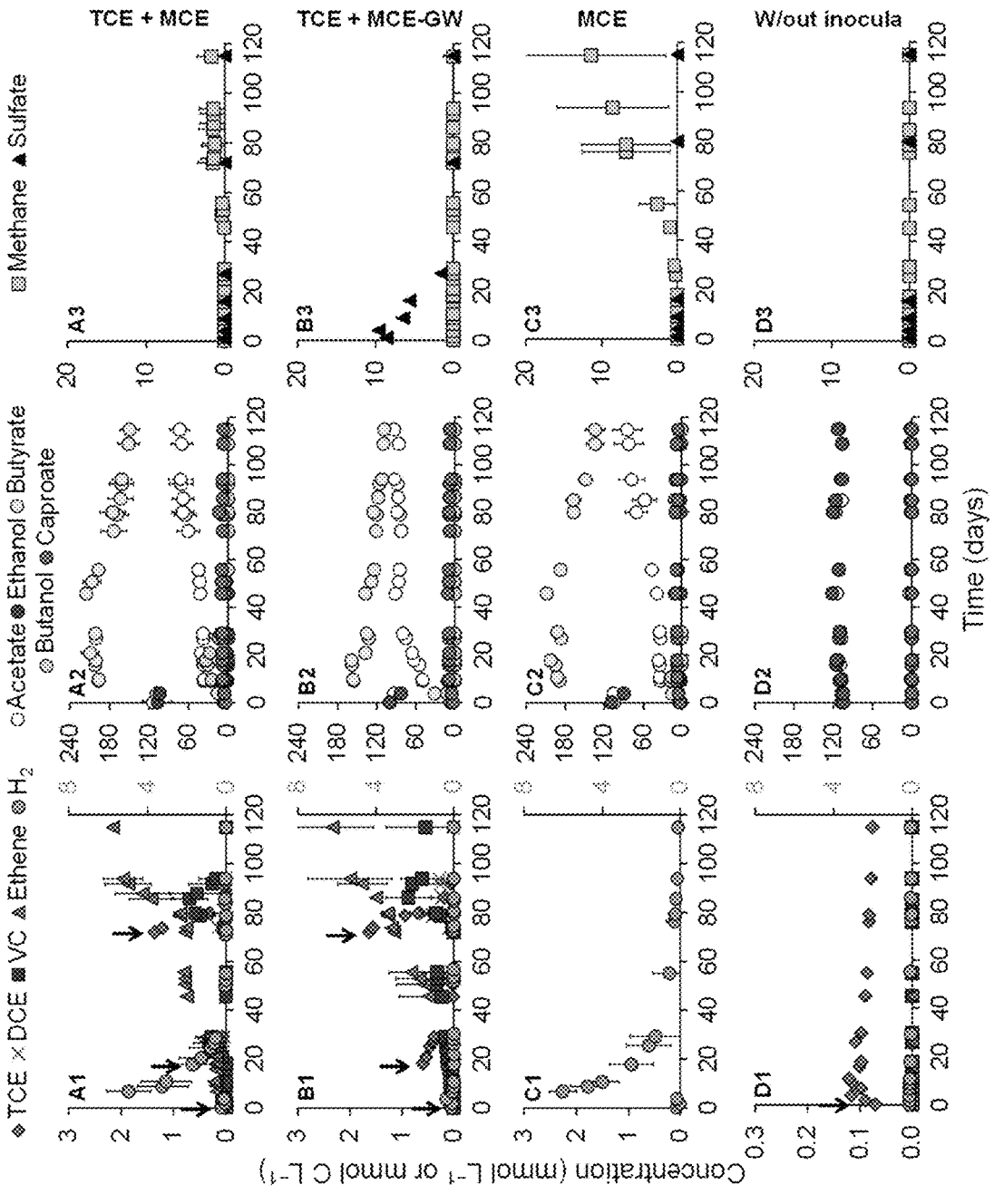
FIG. 4 is a series of graphs showing reductive dehalogenation of TCE stimulated by microbial chain elongation of acetate and ethanol in soil microcosms (panels A1 to B3); microbial chain elongation in the absence of TCE (panels C1 to C3); and soil microcosms without bioaugmentation (panels D1 to D3). The black arrows denote TCE additions at increasing concentrations. Reductive dehalogenation on days 0 through 18 in panels A1 and B1 is shown in FIG. 5 at a different y axis to enhance visibility. $H_2$ is plotted on the secondary y axis. The concentrations of chain elongation substrates and products in panels A2-D2 are in units of mM carbon (C). The data are averages with standard deviation of triplicate microcosms.

Reductive Dehalogenation was Initiated by $H_2$ Released from Microbial Chain Elongation and Sustained by $H_2$ Produced from Fermentation of Chain Elongation Products Chain-elongating microorganisms couple the oxidation of ethanol to $H_2$ and acetate to the elongation of acetate or butyrate, yielding thermodynamically favorable combined reactions (FIG. 2, Reactions 11 and 12). We first used soil microcosms to elucidate whether $H_2$ generated from microbial chain elongation could effectively support TCE reductive dehalogenation by D. mccartyi (FIG. 4). As shown in FIGS. 4 (A2, B2, and C2), ethanol and acetate consumption led to production of butyrate (the most abundant product), butanol, caproate, and $H_2$, which occurred in all bioaugmented microcosms. In TCE+MCE, TCE+MCE-GW, and MCE microcosms, an average of 62±9% of the added acetate was consumed by day 9. Ethanol, the electron donor for chain elongation, was consumed below detection levels in the same incubation time (FIGS. 4, A2, B2, and C2, day 9). The average ethanol consumption rates ($\Delta C$ $\Delta t^{-1}$) were similar between microcosm conditions, ranging from 9.7±14 to 11±8.1 mmol C $L^{-1}$ $d^{-1}$ (Table 6). The free-energy yield of ethanol and acetate chain elongation at experimental conditions (on day 0) in TCE+MCE was −35.65 kJ $mol^{-1}$, which is more thermodynamically favorable than the value at standard conditions (FIG. 2, Reaction 11). Chain elongation produced approximately 4 mmol of butyrate per 5 mmol of ethanol and 3 mmol of acetate in TCE+MCE-GW and MCE microcosms (FIGS. 4, B2 and C2, day 9), as previously reported in stoichiometries from chain elongation studies. In TCE+MCE microcosms, the cumulative carbon concentration from products was higher by 10% than the carbon concentration from acetate and ethanol provided initially; thus, this discrepancy yielded a stoichiometry where ~5 mmol butyrate was produced per 5 mmol of ethanol and 4 mmol of acetate consumed (FIG. 4, A1, day 9).

TABLE 6

Average and maximum (values in italics) observed ethanol consumption rates and butyrate production rates in soil microcosms and transfer cultures. The average rates show the mean with standard deviation of individual rates calculated between consecutive sampling events, while the maximum rates are the highest observed rates during one sampling event.

| | $(\Delta C\ \Delta t^{-1})$ mmol C $L^{-1}$ $d^{-1}$ | |
| Condition | Ethanol consumption | Butyrate production |
| --- | --- | --- |
| TCE + | 9.7 ± 14 | 5.3 ± 11 |
| MCE | *19 ± 0.36* | *34 ± 2.8* |
| TCE + | 11 ± 6.0 | 7.9 ± 11 |
| MCE-GW | *16 ± 2.3* | *23 ± 3.3* |
| MCE | 11 ± 8.1 | 6.0 ± 11 |
| | *17 ± 2.1* | *32 ± 0.20* |
| T-Acetate + | 0.95 ± 1.1 | 3.1 ± 4.2 |
| Ethanol | *4.0 ± 5.1* | *12 ± 4.8* |
| T-Ethanol | 1.2 ± 1.5 | 0.53 ± 1.0; 2.2 ± 1.1 (caproate) |
| | *4.6 ± 2.1* | *3.6 ± 1.0; 3.4 ± 1.8 (caproate)* |

$H_2$ accumulated in the microcosms reaching similar levels (5.0±1.1-6.0±0.68 mmol $L^{-1}$; p≥0.253) on day 7 in MCE+TCE and MCE microcosms (FIGS. 4, A1 and C1). In TCE+MCE-GW microcosms, $H_2$ accumulation was less prominent (≤0.38±0.06 mmol $L^{-1}$, FIG. 4, B1), implicating a more dynamic production and consumption trend in microcosms with groundwater and its associated chemistry (e.g., presence of sulfate). TCE+MCE and TCE+MCE-GW microcosms initially stimulated by chain elongation yielded the first (0.07±0.01 mmol $L^{-1}$, also see FIG. 5), second (0.60±0.03 mmol $L^{-1}$), and third (1.5±0.2 mmol $L^{-1}$) added TCE concentration to be reductively dehalogenated to mostly ethene (FIGS. 4, A1 and B1). Reductive dehalogenation consumed 1.1±0.1–1.6±0.2% of total electron equivalents initially fed as acetate and ethanol (Table 3, day 115). Most electron equivalents (50.4±7.0-61.0±5.4%) went to butyrate production (Table 3, day 115). A 1-10% distribution of electrons to reductive dehalogenation is typical in studies where organic substrates are added in excess of the $H_2$ stoichiometric requirement for the chlorinated ethene. Dehalogenation rates $(\Delta C\ \Delta t^{-1})$ increased as the TCE concentration was also increased (Table 7). TCE+MCE and TCE+MCE-GW microcosms reached an average rate of 0.12±0.11-0.15±0.10 mmol $Cl^-$ released $L^{-1}$ day$^{-1}$, while the maximum observed rate was between 0.29±0.09 and 0.33±0.38 mmol $Cl^-$ released $L^{-1}$ day$^{-11}$ (Table 7). Ziv-El et al. compiled rates of reductive dehalogenation from several soil-free batch cultures containing *D. mccartyi* grown on fermentation of organic substrates including lactate, methanol, and yeast extract. Neither reductively-dehalogenating inocula (ZARA-10 and BAC-9) were previously grown under chain elongating conditions. Even so, the dehalogenation rates achieved in soil microcosms are within the range previously reported (0.006-2.9 mmol $Cl^-$ released $d^{-1}$).

TABLE 7

Average and maximum observed (values in italics) dehalogenation rates $(\Delta C\ \Delta t^{-1})$ in soil microcosms and transfer cultures for each TCE addition event. The average rates show the mean with standard deviation of individual rates calculated between consecutive sampling events, while the maximum rates are the highest observed rates during one sampling event.

| | $(\Delta C\ \Delta t^{-1})$ mmol $Cl^-$ released $L^{-1}$ $d^{-1}$ TCE added (mmol $L^-$) | | |
| Condition | 0.07 ± 0.01 | 0.54 ± 0.03 | 1.33 ± 0.09 |
| --- | --- | --- | --- |
| TCE + | 0.04 ± 0.05 | 0.05 ± 0.06 | 0.12 ± 0.11 |
| MCE | *0.16 ± 0.01* | *0.15 ± 0.18* | *0.29 ± 0.09* |
| TCE + | 0.02 ± 0.01 | 0.10 ± 0.11 | 0.15 ± 0.10 |
| MCE-GW | *0.03 ± 0.01* | *0.34 ± 0.15* | *0.33 ± 0.38* |
| T-Acetate + | — | 0.01 ± 0.02 | — |
| Ethanol | | *0.09 ± 0.08* | |
| T-Ethanol | — | 0.02 ± 0.02 | — |
| | | *0.08 ± 0.04* | |
| T-Acetate | — | 0.01 ± 0.01 | — |
| | | *0.03 ± 0.01* | |

Reductive dehalogenation of the first and/or second TCE dose to ethene by *D. mccartyi* was likely sustained by direct $H_2$ production from chain elongation (FIGS. 4, A1 and B1). The $H_2$ concentration became non-detectable from days 20 and 50 in TCE+MCE-GW and TCE+MCE microcosms, respectively (FIGS. 4, A1 and B1). Nonetheless, TCE reductive dehalogenation activity did not stall. We attribute this outcome to generation of $H_2$ by two reactions involving the products of chain elongation: butanol oxidation (FIG. 2, Reaction 9) and butyrate fermentation (Reaction 5). Butanol transiently accumulated in TCE+MCE microcosms and was depleted by day 56 (FIG. 4, A2). Butyrate fermentation was evident after day 18, yielding an average of 2.0±2.8 mmol acetate per 1 mmol butyrate consumed during incubation (FIGS. 4, A2 and B2). Fermentation of butyrate to acetate and $H_2$ is an endergonic reaction under standard conditions (+48.30 kJ mol$^{-1}$, Reaction 5, FIG. 2). Thermodynamic favorability for butyrate fermentation can be achieved at a very low $H_2$ partial pressure (e.g., below $10^{-3.5}$ atm), which can be driven by $H_2$-consuming processes. Indeed, under experimental conditions (on day 56) the free-energy yield for butyrate fermentation according to Reaction 5 in TCE+MCE was −4.78 kJ mol$^{-1}$. A number of studies have shown that fermentation of butyrate to acetate and $H_2$ can sustain reductive dehalogenation of PCE to ethene. Nonetheless, butyrate is not a typical substrate used to grow *D. mccartyi* bioaugmentation cultures. While direct addition of butyrate in-situ has rarely been reported (U.S. EPA Introduction to in situ bioremediation of groundwater; U.S. Environmental Protection Agency Office of Superfund Remediation and Technology Innovation: 2013), butyrate is a major fermentation product when glucose/molasses or emulsified vegetable oil are amended as groundwater biostimulation reagents. Overall, microcosms stimulated by chain elongation initially propelled TCE to ethene reduction using $H_2$ produced during elongation of acetate and ethanol. Chain elongation also banked electrons into butanol and butyrate, which subsequently served as $H_2$ sources maintaining reductive dehalogenation activity.

Figure 6:
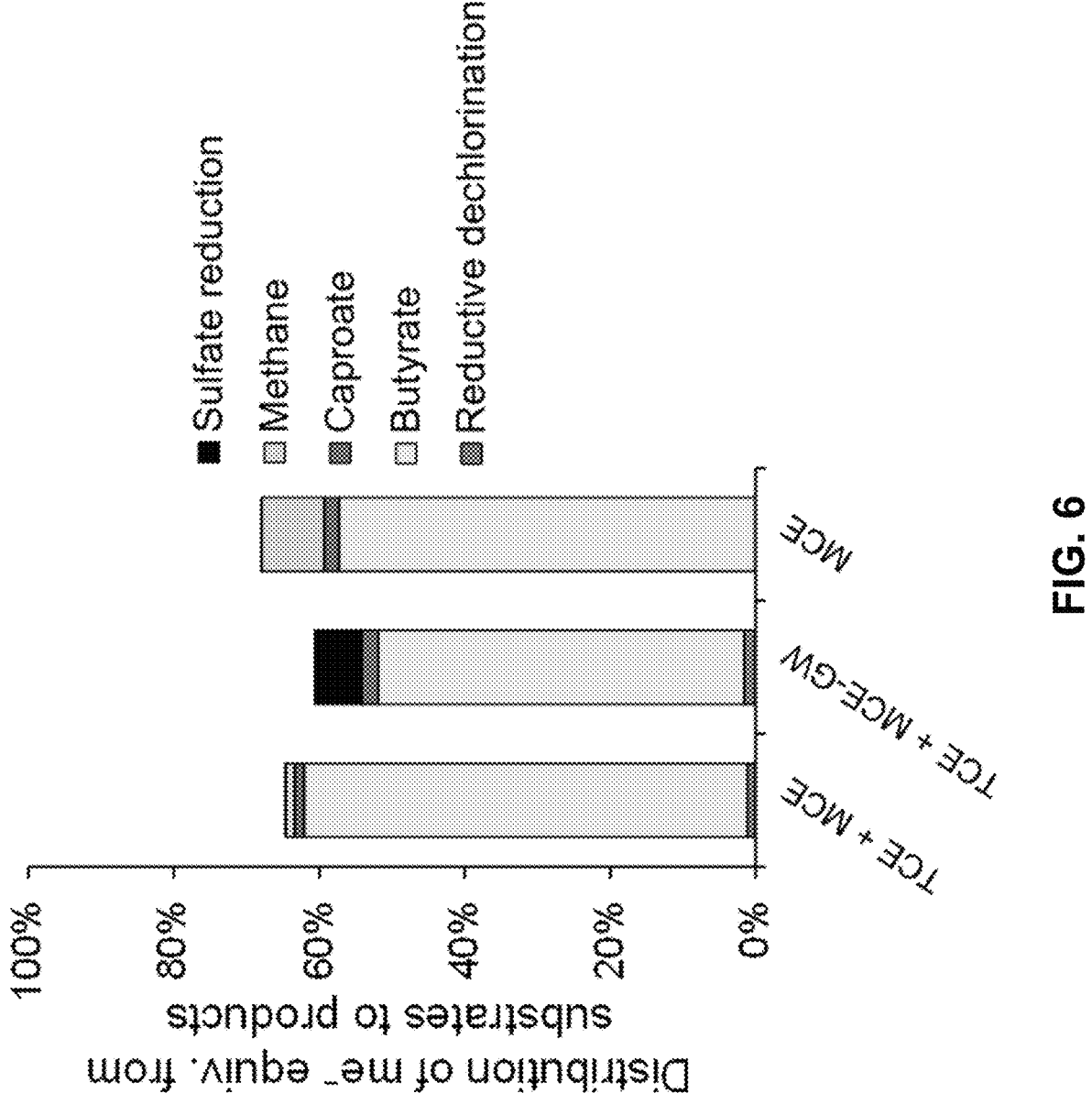
FIG. 6 is a graph of the distribution of millielectron equivalents (me⁻ equiv.) from acetate and ethanol (substrates) to end products at the end of incubation on day 115 (end of experiment) in soil microcosms. The data are averages of triplicate microcosms.

Methane was produced after 46 days of incubation in TCE+MCE microcosms (FIG. 4, A3), reaching 1.7±1.8 mmol $L^{-1}$ (FIG. 4, A3, day 115). Methane accounted for 1.2±1.4% of electrons from acetate and ethanol provided at time 0 (FIG. 6). In the microcosms with groundwater, no methane was generated during the entire 115-day incubation (FIG. 4, B3). While NaHCO$_3$ was not supplemented, HCO$_3^-$ was present in soil (2.0±0.0 mM) and groundwater (2.7±0.1 mM), suggesting inorganic carbon was not limiting in these microcosms. The pH (Table 8) was maintained within a favorable range for methanogenesis during incubation. In Rangan et al., ZARA-10 and BAC-9 were separately evaluated with aquifer materials as used herein (soil and groundwater from PGAN Superfund site). Microcosms were supplemented with TCE, organic substrates (lactate, emulsified vegetable oil, and yeast extract), iron ($Fe^0$ or $Fe^{2+}$), and phosphate buffer. In this previous study, methane was produced with both reductively-dehalogenating inocula with concentrations as high as 1.5±0.62 mmol $L^{-1}$ in BAC-9 microcosms with $Fe^0$ and lactate.

TABLE 8 pH measurements at selected timepoints during soil microcosm incubation. The data are averages with standard deviation of triplicate microcosms.

| | pH Time (days) | | | |
|---|---|---|---|---|
| Condition | 0 | 27 | 46 | 94 |
| TCE + MCE | 7.83 ± 0.04 | 7.41 ± 0.20 | 7.47 ± 0.15 | 7.09 ± 0.08 |
| TCE + MCE- GW | 7.62 ± 0.10 | 8.22 ± 0.15 | 8.09 ± 0.22 | 7.73 ± 0.06 |
| MCE | 7.81 ± 0.19 | 7.50 ± 0.15 | 7.82 ± 0.12 | 7.56 ± 0.31 |
| W/out inocula | 8.07 ± 0.05 | 8.32 ± 0.16 | 8.47 ± 0.18 | 8.63 ± 0.14 |

Figure 5:
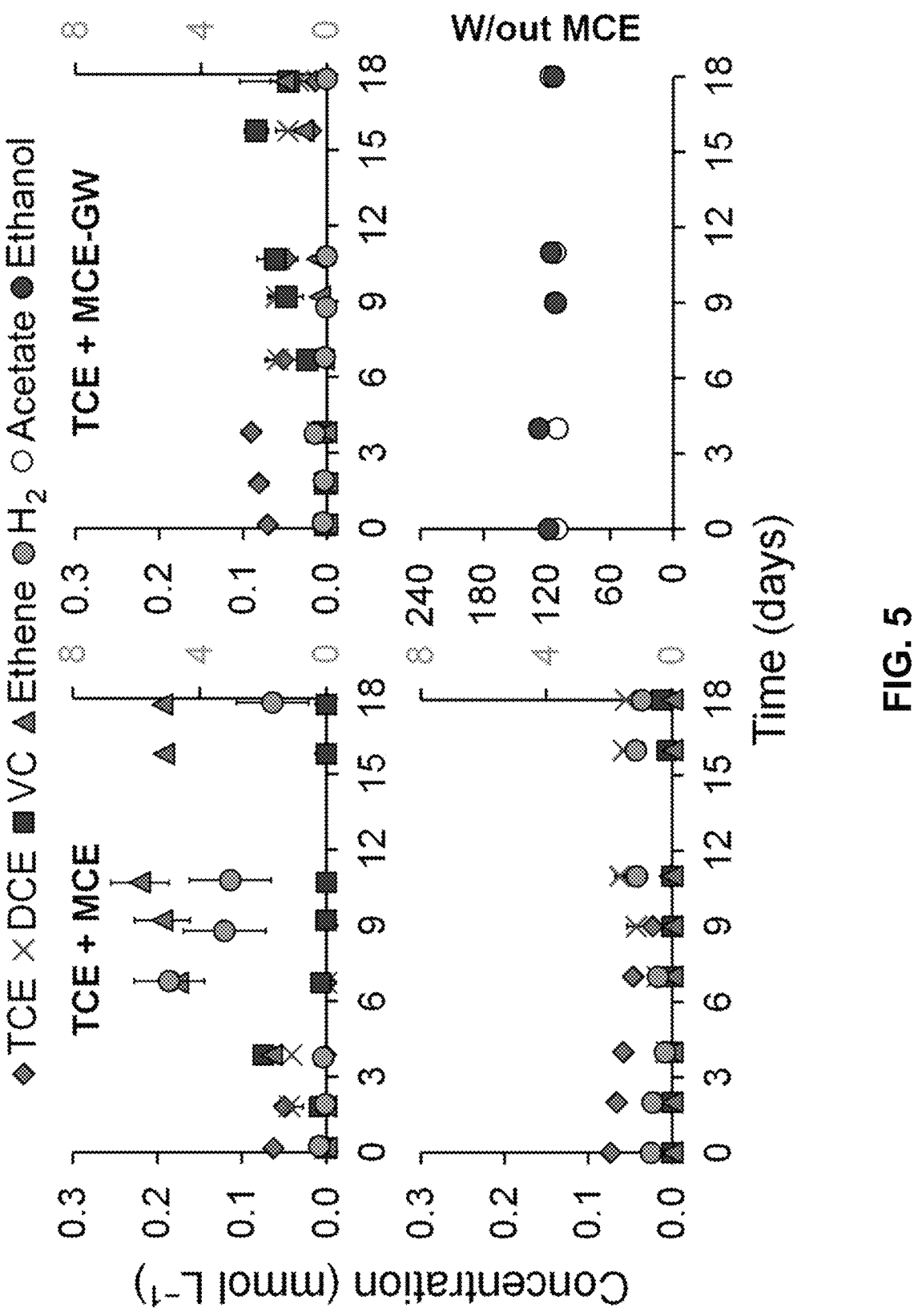
FIG. 5 is a series of graphs showing reductive dehalogenation and $H_2$ production from chain elongation in soil microcosms on days 0 through 18 (top panels) and reductive dehalogenation (bottom left) and acetate and ethanol consumption (bottom right) in the absence of chain-elongation inocula. The concentrations of acetate and ethanol are in units of mM carbon (C). Butyrate, butanol, and caproate were not detected in "W/out MCE" soil microcosms. $H_2$ is plotted on the secondary y axis. The data are averages with standard deviation of triplicate microcosms.

In the absence of chain-elongating inocula, butyrate, butanol, and caproate were not detected in microcosms during the 18-day incubation (FIG. 5, W/out MCE). While 2.5±1.2 mM ethanol was oxidized to $H_2$ and acetate, cis-DCE was the main product of reductive dehalogenation (FIG. 5, W/out MCE). Furthermore, reductive dehalogenation and microbial chain elongation were absent in microcosms without any inocula (FIGS. 4, D1 and D2). Amplification of the 16S rRNA gene of D. mccartyi did not occur in the qPCR assay (FIG. 7, W/out inocula), consistent with the absence of D. mccartyi in aquifer materials from PGAN Superfund site.

Figure 7:
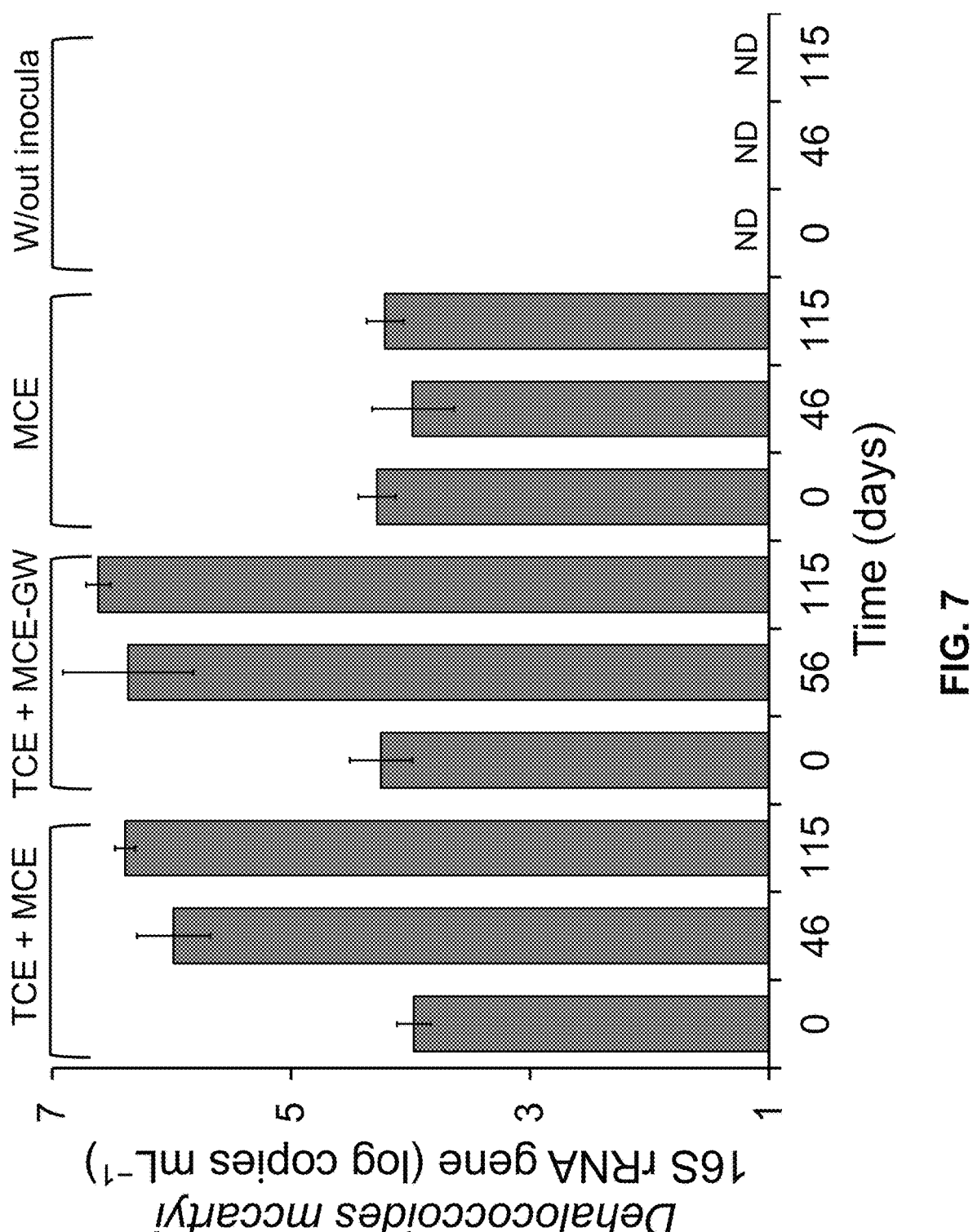
FIG. 7 depicts the quantification of *Dehalococcoides mccartyi* 16S rRNA gene abundance in soil microcosms during incubation. The data are averages of triplicate microcosms and the error bars show standard deviation of the mean. ND=not detected.
Figure 8:
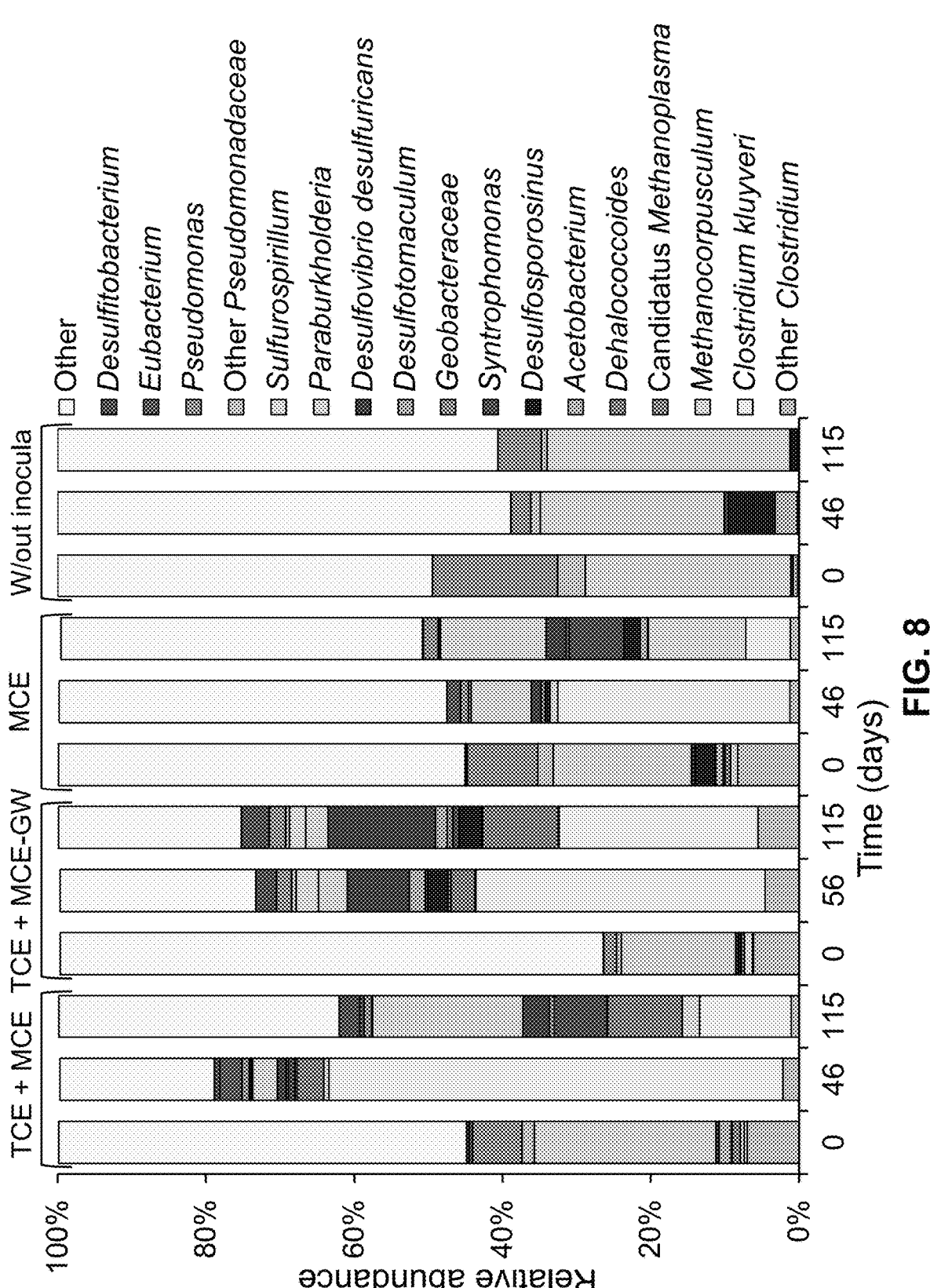
FIG. 8 depicts the microbial community composition in soil microcosms amended with acetate and ethanol for microbial chain elongation. The data are average sequences from triplicate microcosms.

Microbial Community Data Bring Additional Insights Into Syntrophic Chain Elongation, Butyrate Fermentation, and TCE Reductive Dehalogenation D. mccartyi were at an initial relative abundance of 0.10±0.15% in TCE+MCE and TCE+MCE-GW microcosms, reaching 10±6% of the total sequences at the end incubation (FIG. 8, day 115). The BLAST consensus sequence search showed D. mccartyi sequence was 100% similar to strain 195$^T$, ATCC BAA 2266. The substantial enrichment of D. mccartyi in microcosms stimulated by chain elongation was corroborated by qPCR results (FIG. 7). The abundance of 16S rRNA gene of D. mccartyi significantly increased (~ 2.4 log) over day 0 in the microcosms undergoing dehalogenation (FIG. 7, p<0.001).

C. kluyveri (sequence 100% similar to strain K1, ATCC 8527) was the most abundant in Tempe and Bozeman soil enrichment cultures used as chain-elongation inocula in this study (FIG. 3). C. kluyveri is often a prominent community member in chain elongation bioreactors and batch cultures producing medium-chain carboxylates. Not surprisingly, C. kluyveri was also the most abundant sequence in all soil microcosms undergoing chain elongation by day $^{46}/_{56}$ (31±30%-61±20% of total sequences, FIG. 8). However, C. kluyveri relative abundance was significantly lower (p≤0.029) on day 115 in TCE+MCE, TCE+MCE-GW, and MCE microcosms (FIG. 8). These data support the absence of chain elongation activity once the reductant ethanol was completely consumed (FIG. 4 A2-C2). Instead, Syntrophomonas, Desulfovibrio desulfuricans, Desulfotomaculum, and Desulfosporosinus sequences became enriched by the end of incubation in TCE+MCE and TCE+MCE-GW microcosms (FIG. 8, day 115). Syntrophomonas sp. can ferment butyrate; species of Desulfovibrio desulfuricans, Desulfotomaculum, and Desulfosporosinus can also ferment short- and medium-chain carboxylates and alcohols and/or reduce sulfate. These taxa likely played a role in $H_2$ generation from butyrate.

Figure 9:
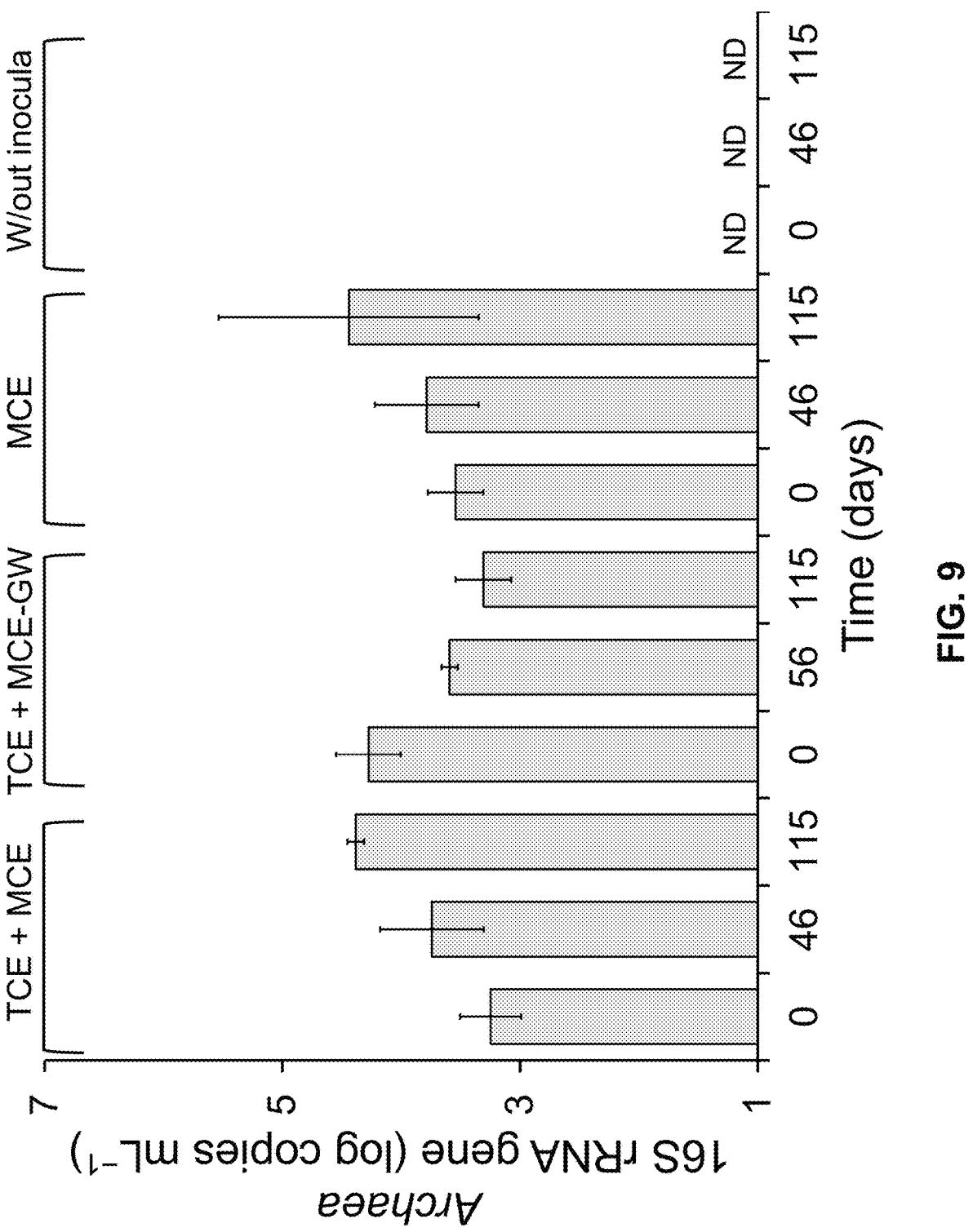
FIG. 9 depicts the quantification of *Archaea* 16S rRNA gene abundance in soil microcosms during incubation. The data are averages of triplicate microcosms and the error bars show standard deviation of the mean. ND=not detected.

The microbial community data support that methane produced in microcosms was mainly $H_2$-dependent. Methanocorpusculum (sequence 99.2% similar to the strictly hydrogenotrophic strain ZT, ATCC 43576), were enriched in TCE+MCE and MCE microcosms, reaching final relative abundances of 2.3±0.6% and 13±10%, respectively (FIG. 8, day 115). In TCE+MCE-GW microcosms, the final relative abundance of Methanocorpusculum was <0.1% (FIG. 8, day 115), while the abundance of 16S rRNA gene of Archaea significantly decreased by day 115 relative to day 0 (~1 log in FIG. 9, p≤0.029). Taxa harboring known acetoclastic methanogens were not detected (FIG. 8 and FIG. 9).

Figure 10:
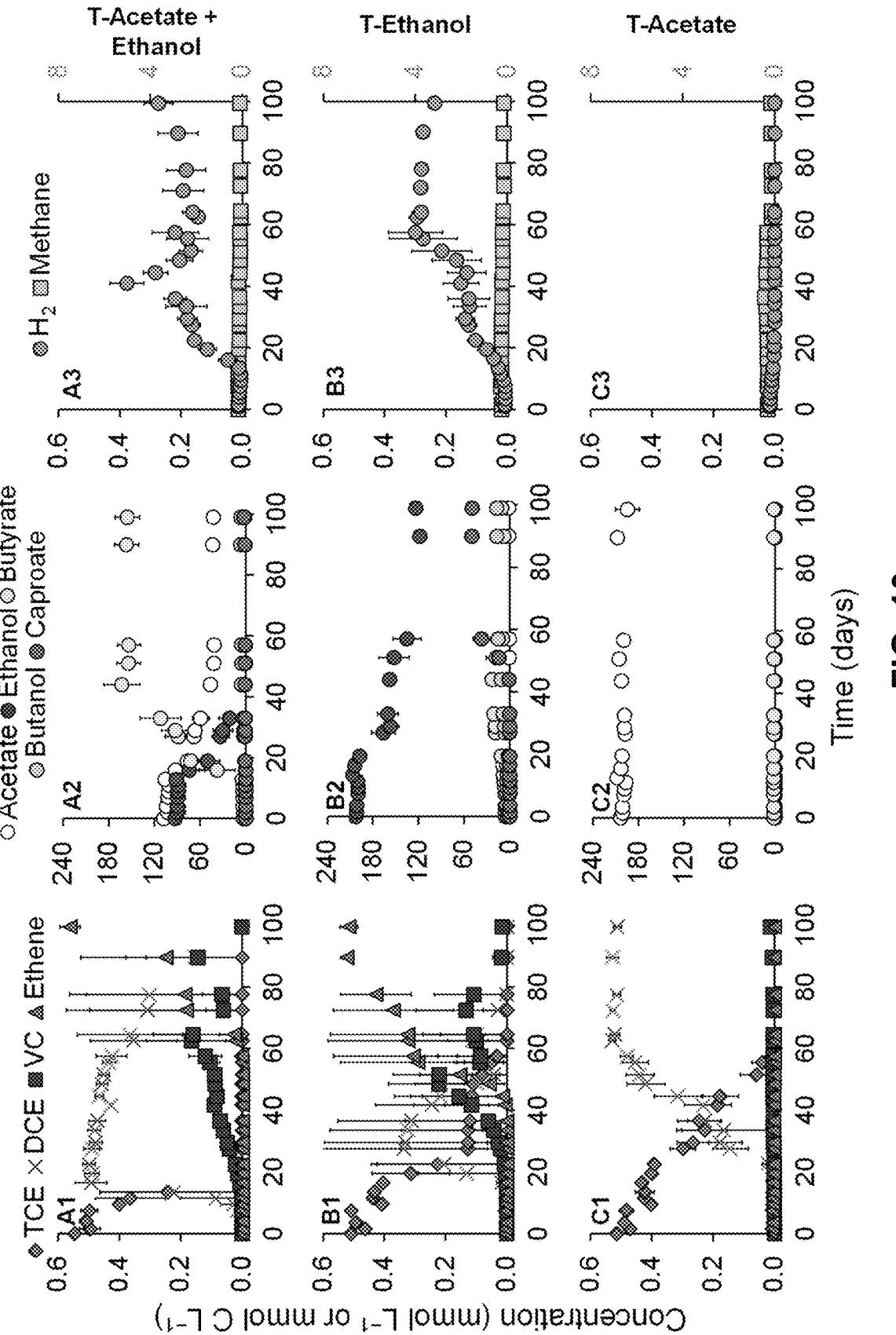
FIG. 10 is a series of graphs showing microbial chain elongation and reductive dehalogenation of TCE to ethene in transfer cultures with: acetate and ethanol (A1 to A3) and ethanol only (B1 to B3). C1 to C3 show the absence of microbial chain elongation and stalling of TCE dehalogenation at cis-DCE in cultures with acetate only. The concentrations of chain elongation substrates and products in panels A2-C2 are in units of mM carbon (C). $H_2$ is plotted on the secondary y axis in panels A3-C3. The data are averages with standard deviation of triplicate cultures.

Transfer Cultures on Ethanol With or Without Acetate Maintain Microbial Chain Elongation and TCE Reductive Dehalogenation Activities Transfer cultures were derived from supernatant of TCE+MCE soil microcosms (FIG. 10). The goal was two-fold: (i) to assess the sustainability of reductive dehalogenation in the microbial community enriched on TCE, acetate, and ethanol and (ii) to test whether the end products of chain elongation (butyrate versus caproate) affect rates or extent of TCE reductive dehalogenation. Similar to parent soil microcosms, TCE reductive dehalogenation to ethene in T-Acetate+Ethanol cultures was sustained by chain elongation with butyrate as the most abundant elongated product (FIG. 10, A1). T-Ethanol cultures showed intermediate production of acetate from ethanol oxidation (FIG. 2, Reaction 8), subsequently initiating elongation to butyrate.

However, caproate became the main elongation product by day 51 (FIG. 10, B2). The free-energy yield for butyrate and ethanol chain elongation under experimental conditions (on day 44) was −35.66 kJ $mol^{-1}$. The prevalence of caproate, a medium-chain carboxylate, was due to a higher availability of ethanol. In chain elongation, the molar ratio of acetate (electron acceptor) to ethanol (electron donor) ultimately determines the type and yield of elongation products. Higher ethanol to acetate ratios (e.g., >2:1) lead to more caproate or caprylate (C8) production rather than butyrate, although the rate of chain elongation has been documented to decrease as the product chain length increases.

Figure 11:
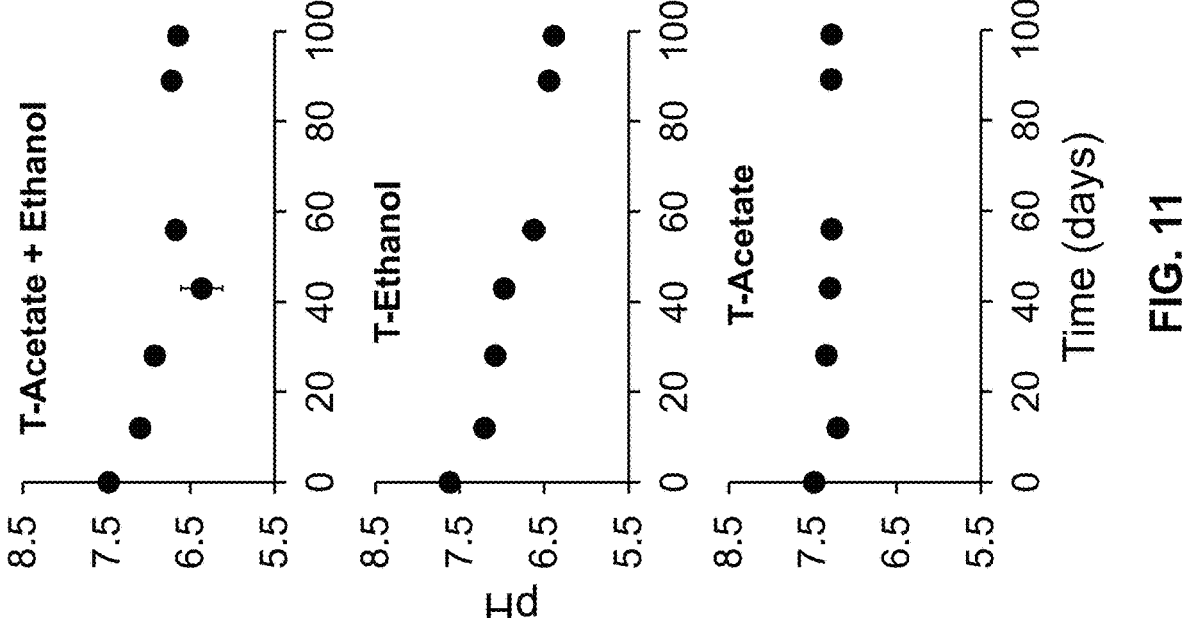
FIG. 11 is a series of plots of pH measurements during incubation in transfer cultures. The data are averages with standard deviation of triplicate cultures.

Cultures amended with ethanol only showed faster dehalogenation rates than acetate and ethanol counterparts during conversion of cis-DCE to VC and ethene (FIG. 10, A1 and B1, days 20 to 60, p<0.001). By day 62, T-Ethanol converted the added TCE concentration to 18±17% VC and 58±47% ethene, whereas the majority of TCE in T-Acetate+Ethanol was only converted to cis-DCE (67±31%) during the same incubation time. The pH was similar, reaching ~6.4 in both cultures during this period (FIG. 11). The discrepancies in dehalogenation rates under these chain-elongating conditions are possibly due to the availability of ethanol for continued $H_2$ production via elongation of butyrate to caproate, although the exact reason remains unclear. To our knowledge, no study has employed caproate as a substrate for reductive dehalogenation. Caproate can also be fermented to $H_2$ and acetate in the presence of a syntrophic $H_2$-consuming microbial partner. Methanogenesis was absent in transfer cultures undergoing chain elongation (FIGS. 10, A1 and B1) due to the absence of added $HCO_3^-$ in transfer cultures and the lack of $HCO_3^-/CO_2$ production from chain elongation.

In cultures amended with acetate only, TCE dehalogenation stalled at cis-DCE and $H_2$ was non-detectable (FIG. 10, C1). TCE to cis-DCE reductive dehalogenation in T-acetate cultures likely proceeded with acetate as electron donor. *Geobacteracaeae* performing partial dehalogenation of TCE to cis-DCE with acetate as electron donor have been previously detected in ZARA-10 culture and comprised 2.2±0.29% of the total sequences in the ZARA-10 inoculum from this study (FIG. 3). *Geobacteracaeae, Desulfitobacterium*, and *Sulfurospirillum*, containing species known to carry out PCE or TCE to cis-DCE reductive dehalogenation, were at 0.12±0.10% and 2.8±0.8% sequence abundance at the end of the incubation in TCE+MCE microcosms (FIG. 8, day 115) from which these cultures were obtained. Microbial chain elongation was absent in the acetate only cultures (FIG. 10, C2) as chain elongation requires a more reduced compound to proceed.

Implications and Outlook

This work pioneers a novel application of microbial chain elongation as a $H_2$-producing process relevant to in-situ bioremediation of chlorinated ethenes. Data herein support that microbial chain elongation could generate $H_2$ dynamics desirable for reductive dehalogenation in the subsurface: an initial boost of $H_2$ followed by sustained, low-concentration $H_2$ production via syntrophic fermentation of chain elongation products, butyrate and/or caproate. In this study, we used a chlorinated ethene as a model contaminant for reductive dehalogenation. However, the findings here conceivably extend to other *D. mccartyi* halogenated electron acceptors for which in situ biostimulation is a possible treatment option.

The experimental design from this work revealed methanogenesis was suppressed in conditions with groundwater and in transfer cultures. While these results suggest a practical advantage of chain elongation for a more efficient usage of $H_2$-precursor substrates for reductive dehalogenation, the extent to which these findings are directly applicable to in-situ bioremediation requires validation. Chain elongation of acetate and ethanol does not produce $HCO_3^-/CO_2$. Subsequent fermentation of chain elongation products (butyrate, caproate) has been reported with or without $HCO_3^-/CO_2$ formation and is dependent on environmental conditions and microbial communities present in the subsurface. Dedicated experiments on chain elongation and fermentation are necessary to resolve the effect of intrinsic production of $CO_2/HCO_3^-$ and $H_2$ from various organic substrates on methanogenesis and reductive dehalogenation. The higher dehalogenation rates observed in transfer cultures where caproate was the main elongation product prompt investigations into different ethanol to acetate ratios. Optimization of chain elongation substrate ratios and dosages may also improve the economic feasibility of this approach. Furthermore, substrates other than ethanol and acetate, such as lactate (as electron donor for chain elongation) and propionate (as electron acceptor for chain elongation), should be tested in future studies to fully evaluate the capabilities of chain elongation in a reductive dehalogenation setting.

To date, the presence and activity of chain elongating microorganisms in pristine or contaminated subsurface environments, including soils and groundwater, remains unexplored. Soil microorganisms capable of chain elongation have only been recently examined by our group in four geographically-distinct soil types. We documented that microbial chain elongation by indigenous microorganisms could be easily biostimulated in three anaerobic soils collected from ≤1.5 m below ground surface. At this point, it is unclear whether the absence of indigenous chain-elongating microorganisms from the aquifers materials used in this study (collected from ≥25 m below ground surface) is representative of typical deep subsurface environments. As it stands, the majority of chlorinated ethenes in-situ treatment efforts already involve bioaugmentation with a *D. mccartyi* culture grown on fermentable substrates. Thus, the addition of a reductively-dehalogenating and chain-elongating mixed culture could be easily incorporated into remedial designs at contaminated sites.

Example 2: On the Role of Microbial Chain Elongation Substrates and End Products in Promoting Reductive Dehalogenation of Chlorinated Solvents This invention pertains to the field of bioremediation of chlorinated solvents, such as tetrachloroethene (PCE)., trichloroethene (TCE), cis-1,2-dichloroethene (cis-DCE), and vinyl chloride (VC). In situ reductive dehalogenation via organohalide-respiring hydrogenotrophic *Dehalococcoides mccartyi* (*D. mccartyi*) is a widely used approach for remediating chlorinated ethenes from soil, sediment, and groundwater at contaminated sites. *D. mccartyi* require $H_2$ as obligate electron donor. Typically, $H_2$ requirement for *D. mccartyi* in situ is fulfilled through the addition of organic substrates, such as lactate, emulsified vegetable oil, and glucose/molasses, which require fermenting bacteria to break them down to $H_2$. However, the addition of these fermentable substrates can stimulate hydrogenotrophic microorganisms (e.g., methanogens and homoacetogens) decreasing $H_2$ availability for reductive dehalogenation and generating methane, a flammable and potent greenhouse gas. Furthermore, $H_2$ is not always a by-product of fermentation. At some contaminated sites, bioremediation is negatively impacted by losses of $H_2$ to methane, leading to stalls in reductive dehalogenation or requiring frequent addition of organic substrates to maintain reductive dehalogenation activity. Additionally, quick consumption of simple substrates, such as lactate and glucose or injection well clogging due to viscous complex substrates, such as emulsified vegetable oil and other commercial mixtures can challenge bioremediation, leading to slow rates of dehalogenation or stalls at chlorinated intermediates Microbial chain elongation is a promising alternative approach to supplying $H_2$ for reductive dehalogenation of chlorinated solvents. Microbial chain elongation, known in biotechnology for its ability to convert waste streams into valuable medium-chain carboxylates, is a metabolic process where short-chain carboxylates (C2) are converted into longer-chain carboxylates (C2-C8), while reliably producing $H_2$. Chain elongation drives reductive dehalogenation via direct $H_2$ production during elongation of acetate to butyrate or butyrate to caproate and indirectly via fermentation of elongated products, such as butyrate and caproate. Here we describe the know-how for enrichment of a mixed microbial community for the reductive dehalogenation of chlorinated solvents with microbial chain elongation as the $H_2$ producing process in a semi-batch reactor. This method can be employed to generate culture for bioaugmentation at sites undergoing reductive dehalogenation stimulated by chain elongation. This method can also be used to stimulate reductive dehalogenation in situ (e.g., in groundwater, soil/sediment) at sites containing halogenated compounds that require remediation.

Preparation of Materials

Anaerobic mineral medium was sparged with nitrogen gas to decrease the oxidation reduction potential (ORP). The medium was autoclaved to sterilize and then placed in an anaerobic chamber. The anaerobic mineral medium consisted of the following per liter: 10 mL of salt stock solution, 1 mL of trace element A, 1 mL of trace element B, and 0.25 mL of a 0.1% resazurin stock solution. The anaerobic mineral medium also consisted of 20 mM of 4-(2-hydroxy-ethyl)-1-piperazineethanesulfonic acid (HEPES) and 0.4 mM L-cysteine. After autoclaving, sodium sulfide was added to the medium through a sterile filter to a final concentration of 0.2 mM. Once cooled to room temperature, 1 mL/L vitamin mix solution and 0.5 mL/L Vitamin B12 solution were added.

Materials for inoculation to serve as sources of chain elongating and dehalogenating microorganisms were collected from various locations, such as garden soil, wetlands, and swamps. Materials for inoculation can be gathered from other environments which are anaerobic and are rich in organic carbon.

A mixed microbial community containing dehalogenating and chain elongating microorganisms was enriched in a bioreactor with a total volume of 5 L (2 L of gas headspace and 3 L of liquid and solids). The headspace of the bottle consisted of 1.8% $H_2$ in $N_2$. The liquid and solid mixture consisted of anaerobic medium, ethanol, acetate and inocula (soils) from various environments. TCE, acetate and ethanol were supplemented to the mixture as growth substrates in the following concentrations 1 mM, 15 mM and 25 mM, respectively. pH was adjusted to 7.5 using 5 N NaOH and 5 N HCL. Other concentrations of acetate and ethanol can be used for enrichment. The key is to supply ethanol at higher molar ratios than acetate, such as 1.5:1, 3:1 or 9:1 ethanol:acetate molar ratio.

Various liquid and gas measurements were taken throughout incubation to verify microbial activity. pH of the mixed culture must be maintained between 6.5-7.5. Excess pressure should be maintained in the sealed bottle. The substrates acetate and ethanol and medium must be replenished monthly to maintain chain elongation and dehalogenation activity. To replenish medium and substrates remove 1 L of slurry from the bottle and add 1 liter of fresh medium with nutrients and substrates to the same initial ratio. This semi-batch enrichment method removes the soil solids and enriches for chain elongating and reductively dehalogenating microorganisms. This process produces a mixed microbial culture containing chain elongating, reductive dehalogenating, and fermenting microorganisms that could be used for bioaugmentation at sites requiring remediation of halogenated compounds.

This invention pertains to remediation of halogenated compounds, such as chlorinated ethenes. A common method for in situ remediation of chlorinated solvents is anaerobic reductive dehalogenation via mixed cultures containing *Dehalococcoides mccartyi*. *D. mccartyi* is a strictly hydrogenotrophic microorganism that transforms chlorinated ethenes to ethene. This invention guides researchers and practitioners on how to enrich and maintain a culture performing chain elongation and reductive dehalogenation using soil/sediment to be used in bioaugmentation at sites containing halogenated compounds. This invention also guides researchers on the conditions, microorganisms, and substrate ratios required for remediate sites containing halogenated compound via addition of acetate and ethanol for chain elongation. This invention offers an alternative and possibly more cost-effective approach for addressing slow reductive dehalogenation rates or stalls at intermediate reductive dehalogenation products.

The method described here employing chain elongation and reductive dehalogenation may improve reductive chlorination at sites where dehalogenation rates are impeded by inability to form $H_2$ in situ or by microbial processes competing for $H_2$. It also improves overall volume of in situ and duration of treatment, such as where traditional substrates fail to travel in the subsurface due to their high viscosity and low solubility or are depleted too quickly to sustain remediation processes in the subsurface due to microbial utilization.

Figure 12:
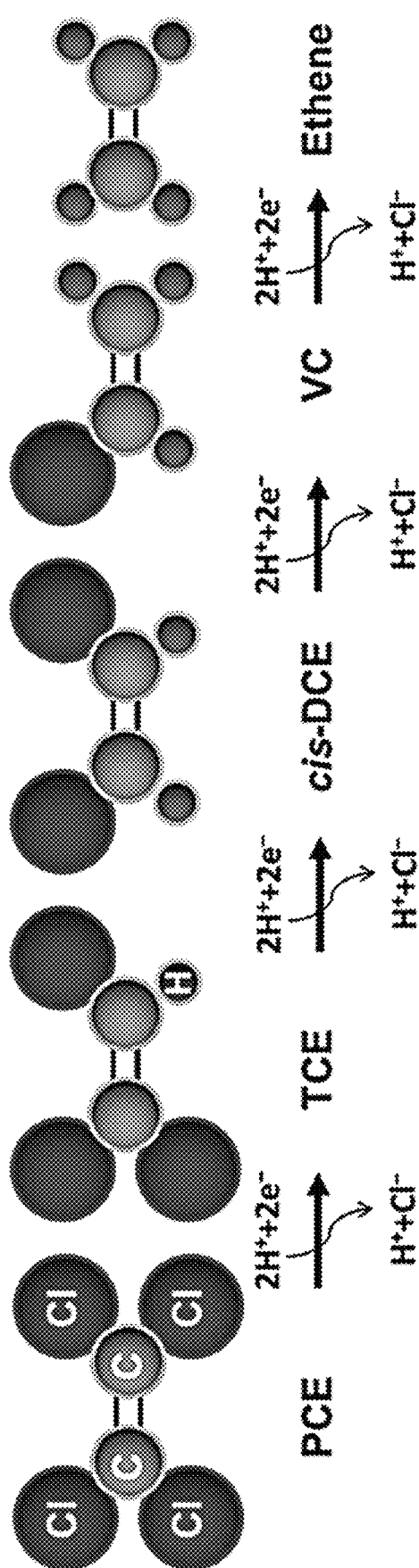
FIG. 12 is a scheme of the reductive dehalogenation of PCE by *Dehalococcoides mccartyi*.

In a microcosm study containing groundwater and soil, the role of substrate, ratio and end-products on reductive dehalogenation of cis-1,2-dichloroethene (cis-DCE, FIG. 12) are investigated for field implementation at a Superfund site in California. The objectives are as follows: 1) Determine if ethanol and acetate can be steered towards chain elongation in groundwater and soil from the site; and 2) Examine the effects of elongation substrates and/or products on reductive dehalogenation, $H_2$ production, and methanogenesis. Bioaugmentation for reductive dehalogenation employs *Dehalococcoides mccartyi* which uses $H_2$ as an electron donor, TCE as an electron acceptor, and acetate as a carbon source.

The methods are described in FIG. 13, which is a table of the various batch microcosms and their corresponding labels, and in FIG. 14, which depicts various laboratory setups.

Figure 15:
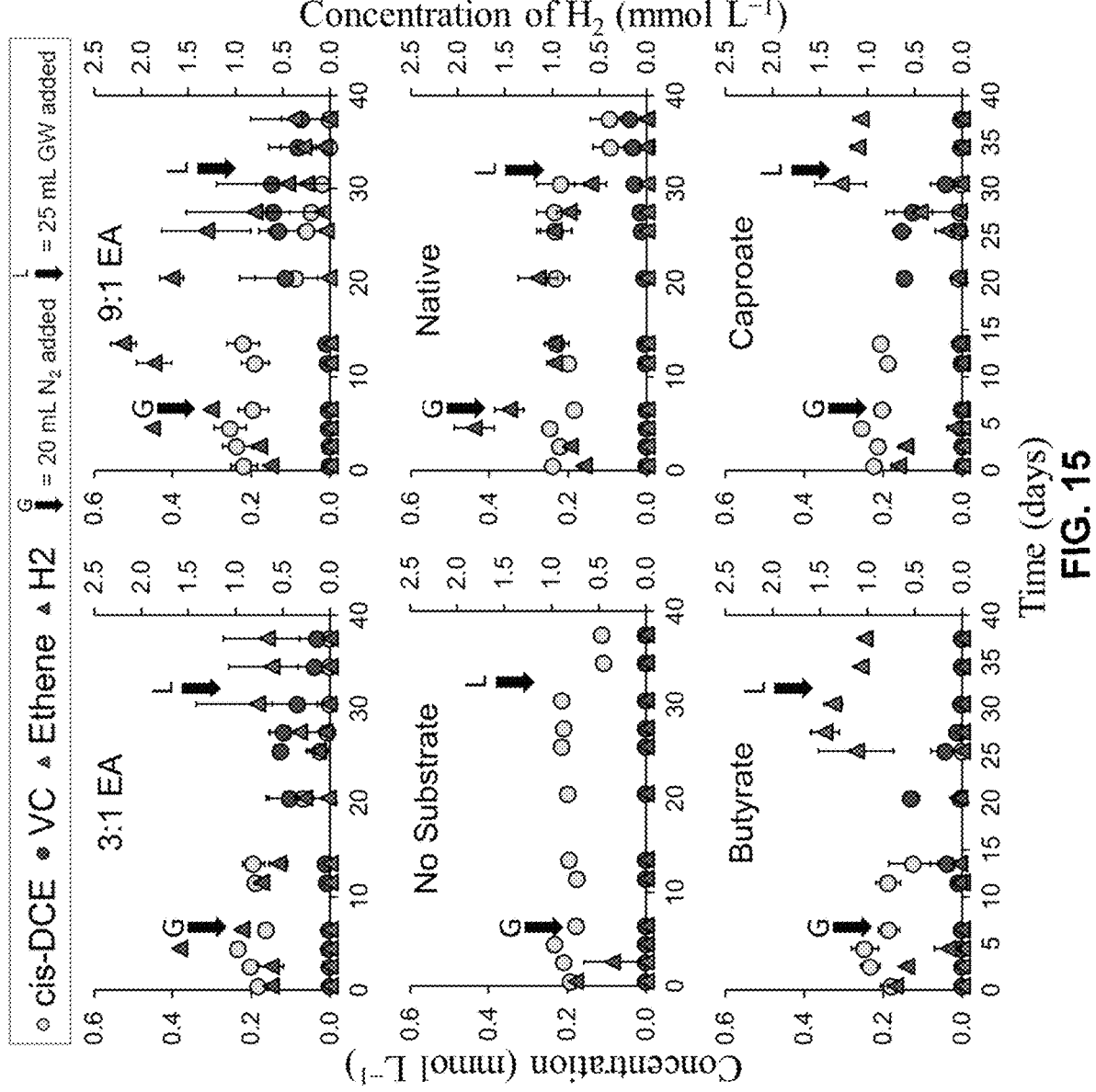
FIG. 15 is a series of graphs showing sustained reductive dehalogenation of TCE to ethene by microbial chain elongation in each of the exemplary microcosms described in FIG. 13. $H_2$ is plotted on the secondary y axis. The data are averages with standard deviation of triplicate microcosms.
Figure 16:
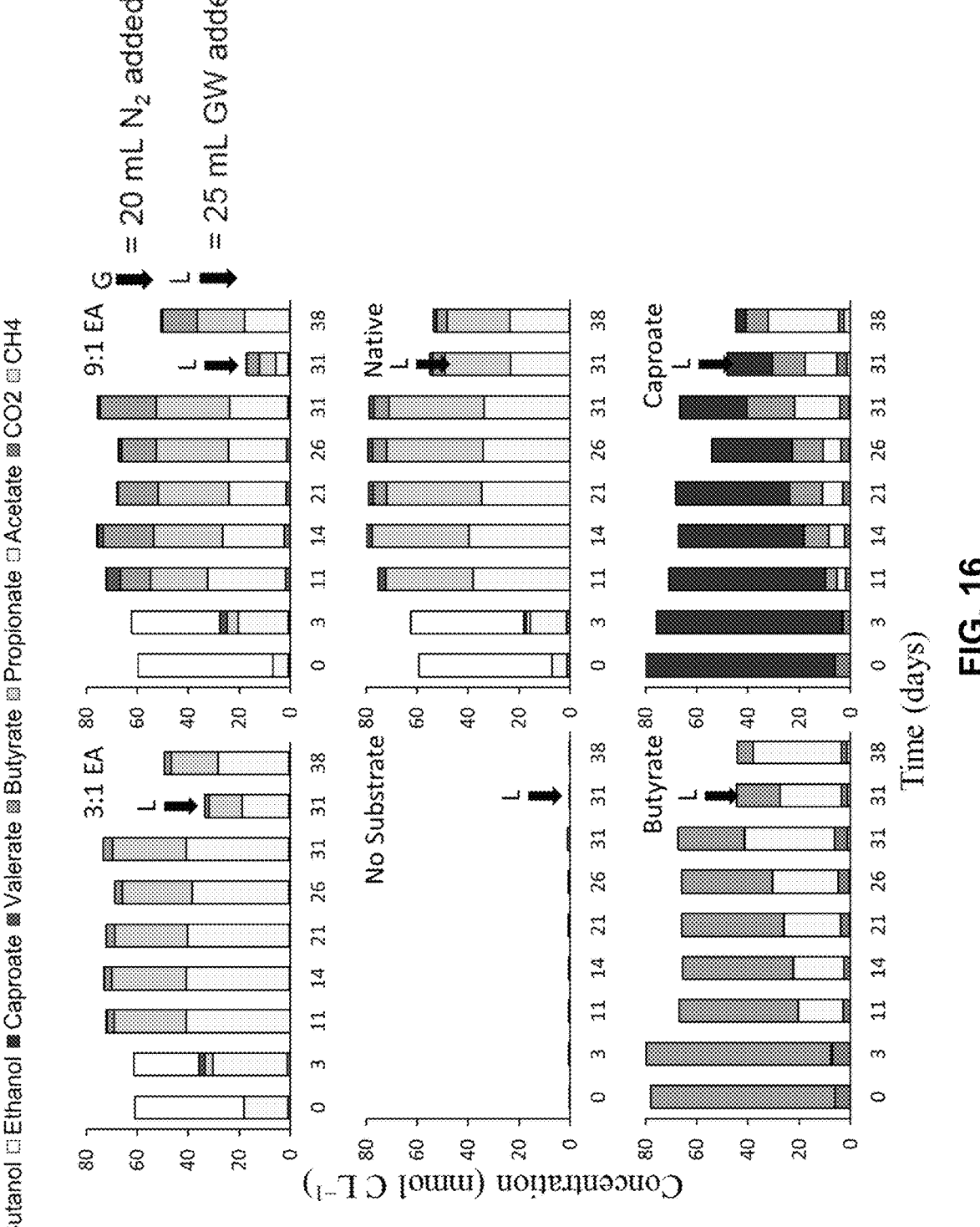
FIG. 16 is a series of graphs showing the carbon composition of experimental exemplary batch microcosms described in FIG. 13. The data are averages of triplicate microcosms.

The data presented in FIG. 15 and FIG. 16 demonstrate that bioaugmentation with a consortia containing *D. mccartyi* increased dehalogenation rates. A higher ethanol to acetate ratio (9:1) yielded more $H_2$. Butyrate was the most abundant product of MCE in acetate and ethanol microcosms (3:1 EA and 9:1 EA). Production of ethene occurred at fast rates in conditions with butyrate and caproate, products of MCE. Methane production was low overall with slightly higher production of methane in butyrate and caproate microcosms than in the acetate and ethanol counterparts.

The experiments described above demonstrate that bioaugmentation with an MCE culture yielded conversion of ethanol and acetate to butyrate. Addition of *D. mccartyi* culture significantly improves reductive dehalogenation. The 3:1 ethanol to acetate ratio yielded faster dehalogenation rates than 9:1, while suppressing methanogenesis and CO2 production.

Example 3: Lab-Scale Study Supports Treatability of Chorinated Ethenes in Groundwater and Soil from an Existing In Situ Bioremediation System Via Microbial Chain Elongation In situ bioremediation of chlorinated ethenes via reductive dechlorination is a useful technology for subsurface contamination. However, bioremediation of chlorinated ethenes is often limited by rapid substrate consumption, stimulation of $H_2$-competing processes, or bioclogging. Developing more sustainable technologies to address these constraints is of great interest in bioremediation. A treatability study exploring chain elongation with various substrate combinations is described herein to drive reductive dechlorination of cis-1,2-dichloroethene in groundwater and soil collected from a site experiencing challenges with high methanogenic activity and clogging. Microcosms studies demonstrated chain elongation of ethanol and acetate to butyrate can be stimulated in soil and steered in bioaugmented groundwater. Results from ethanol and acetate and its elongation products, butyrate and caproate, were supportive of ethanol and acetate as substrates for further assessments. Cumulatively, this study informs on the design of a field pilot study for implementation of chain elongation bioremediation via reductive dechlorination.

Anaerobic reductive dechlorination of the chlorinated ethenes tetrachloroethene (PCE), trichloroethene (TCE), cis-1,2-dichloroethene (cis-DCE), and vinyl chloride (VC) by organohalide-respiring bacteria is a common in situ remediation technology for contaminated sites. In the field, this process involves well injections of fermentable substrates and cultures containing organohalide-respiring bacteria to support reductive dechlorination. In the subsurface fermentative bacteria ferment single compound substrates (e.g., lactate and glucose) and complex substrates (e.g., emulsified vegetable oil, molasses, and commercial mixtures) generating the electron donor $H_2$ for organohalide-respring bacteria to stepwise convert the chlorinated ethenes to non-toxic ethene. To date, several bacterial species directly involved in dehalogenation have been isolated and established in mixed cultures. Among them, the most commonly used cultures are those with *Dehalococcoides mccartyi*. *D. mccartyi* solely uses $H_2$ as an electron donor to complete reductive dechlorination to ethene, making $H_2$ a crucial parameter for complete treatment at contaminated sites.

Despite wide application of fermentable substrates, these legacy contaminants can persist at contaminated sites due to various biogeochemical constraints that affect $H_2$ delivery, such as (1) rapid substrate consumption; (2) unfavorable thermodynamics (e.g., $H_2$-neutral pathways, low pH, etc.); (3) high concentrations of $H_2$ utilizing electron acceptors (e.g., bicarbonate, sulfate, etc.); (4) stimulation of $H_2$ competing microorganisms; and (5) well/pore space clogging. One such in situ bioremediation system where alternative approaches for reductive dechlorination are being sought for is a Superfund site in Bay Area, CA, USA. For over a decade, various single and complex organic substrates have been injected at this site, however the site is experiencing excessive methanogenic activity and well clogging resulting in rebounding chlorinated ethene concentrations and production of the potent greenhouse gas, methane. Developing more green and sustainable technologies to address legacy contamination at existing in situ bioremediation systems is of great interest to the field.

Microbial chain elongation reliably produces $H_2$, yields complete reductive dechlorination to ethene, and suppresses methane production, as it does not produce $CO_2/HCO_3^-$ (electron acceptor for hydrogenotrophic methanogenesis). Recently, the generation of $H_2$ generated via microbial chain elongation of 50 mM ethanol (2.3 g/L) and 50 mM acetate (3 g/L) was shown to sustain reductive dechlorination of TCE to ethene. Notably, chain elongation sustained reductive dechlorination in groundwater and soil from a Superfund site with high sulfate concentrations. Interestingly, in this study, chain elongation inhibited methanogenesis, overcame high $H_2$ competing electron acceptors (i.e., sulfate), and generated a substrate bank for long-term $H_2$ release (i.e., butyrate, butanol, and caproate). Microbial chain elongation is an anaerobic metabolic pathway that combines (or elongate) carboxylates to more reduced compounds producing longer carboxylates. Namely, *Clostridium kluyveri*, a strict chain elongator, couples ethanol oxidation (Eq. 6) and the reverse β-oxidation pathway to elongate carboxylates (Eq.

7), such as acetate with an energy-rich, reduced compound (e.g., ethanol) to generate butyrate and $H_2$ (Eq. 8).

$$CH_3CH_2OH + H_2O \rightarrow CH_3COO^- + 2H_2 + H^+ \qquad \text{(Eq. 6)}$$

$$\Delta G_r^0 = +10.50 \text{kJ mol}^-$$

$$CH_3CH_2OH + CH_3COO^- \rightarrow CH_3CH_2CH_2COO^- + H_2O \qquad \text{(Eq. 7)}$$

$$\Delta G_r^0 = -193.00 \text{kJ mol}^-$$

$$6CH_3CH_2OH + 4CH_3CH_2CH_2COO^- \rightarrow \qquad \text{(Eq. 8)}$$

$$5CH_3CH_2CH_2CH_2COO^- + 2H_2 + H^+ + 4H_2O$$

$$\Delta G_r^0 = -182.50 \text{kJ mol}^-;$$

unit in kJ 5 mol of product$^-$

Previous experiments demonstrated the proof of concept using one set of natural material. Now moving this biotechnology out of the laboratory and into the field will require lab-scale evaluations of chain elongation on existing in situ bioremediation systems. Lab-scale studies will reveal imperative knowledge and intrinsic considerations for field feasibility studies by addressing fundamental questions:

(1) Can chain elongation be stimulated with substrates in the subsurface? If not, can the natural microbiome be steered to do so?

(2) What chain elongation substrate combinations (e.g., ratio of electron donor to electron acceptor, and type of electron acceptor) and products support reductive dechlorination?

(3) Which are the key microbial players involved in chain elongation-driven reductive dechlorination?

Herein is disclosed a treatability study exploring chain elongation substrate combinations (either at 72- or 244-mM C) for reductive dechlorination of cis-DCE in groundwater and soil samples from a Bay Area Superfund site experiencing challenges with reductive dechlorination due to high methanogenic activity and clogging. Microcosms studies using ethanol and acetate demonstrated chain elongation can be stimulated in the natural soil microbiome, while groundwater microbial communities can be steered to produce butyrate with bioaugmentation. Key microorganisms in novel chain elongation substrate combinations promoted reductive dechlorination. Products of chain elongation, butyrate and caproate, were directly used by microorganisms to support reductive dechlorination. This study directly informs on the design of a field pilot study for implementation of MCE bioremediation via reductive dechlorination.

Materials and Methods

Sampling and Description of Site Materials

Site materials (groundwater and soil) were collected from the Former Advanced Micro Devices (AMD) 901/902 Thompson Place Superfund Site, Sunnyvale, CA, USA (referred to as "site" henceforth). Between 1969 and 1992, the site was used to design and fabricate semiconductor devices (USEPA). The primary contaminants at the site, TCE, cis-DCE, and VC, are attributed to leaks from former acid neutralization system tanks. Past treatment at the site has included pump and treat for approximately two decades, a full-scale in situ bioremediation for three years, and performance monitoring to assess natural attenuation in groundwater for three years. In the past decade, the in situ bioremediation system has operated periodically using molasses, sodium lactate, emulsified vegetable oil, and other commercial products as sources of electrons and carbon for reductive dechlorination.

The groundwater used in this study was extracted from three distinct site wells: DW-1, X2A, and 23-D (Table 9 and FIG. 17). DW-1 is a monitoring well used in prior bioremediation treatments and is located within the point source contamination area with the overall highest concentrations of chlorinated ethenes (primarily cis-DCE). X2A is an injection/extraction well used in prior bioremediation treatments and is located outside of the point source contaminant area. 23-D is a monitoring well located upstream and is outside of the point source contamination area. Vadose soil was collected manually with an auger downstream of the in situ bioremediation system near monitoring well 28-MW (Table 9) from 0.30-0.61 m and 2.44-2.74 m below ground surface. The groundwater is approximately at 3 m below ground surface in the area where the soil was collected.

ethanol and acetate to butyrate (Table 10). The ratio of ethanol and acetate was selected to yield butyrate as the main product of chain elongation. Five groundwater and two soil microcosm conditions were established in 120 mL microcosm bottles (Table 10). The conditions "Shallow Soil" and "Deep Soil" received 25 g of soil and were supplemented with 25 mL of reduced anaerobic mineral medium (pH 7.5) containing 10 mM potassium phosphate. 10 mM potassium phosphate (pH buffer) and 0.2 mM sulfide (reducing agent) were added to conditions containing groundwater as inoculum. Condition "GW #1+Nutrients" was supplemented with the macro- and micronutrients contained in the mineral medium. All conditions were set up in triplicate except conditions with GW #2, which were in duplicate. The microcosms were incubated on a platform shaker set at 150 rpm and 31° C. for 14 days.

TABLE 9

Description and characteristics of site groundwater and soil used in this study. The tabulated concentrations for Shallow Soil and Deep Soil samples were obtained by mixing soil and DI water at a ratio of 1:1 (w w$^{-1}$). The data are averages with standard deviation of duplicate samples. nd = not detected; bgs = below ground surface; na = not analyzed; *mg kg$^{-1}$.

| Label | Site sample info | pH | Redox potential (mV) | Total organic carbon (mg L$^{-1}$) | Cl$^-$ (mg L$^{-1}$) | NO$_3^-$ (mg L$^{-1}$) | SO$_4^{2-}$ (mg L$^{-1}$) | Total dissolved solids (mg L$^{-1}$) | Conductivity (µS cm$^{-1}$) |
|---|---|---|---|---|---|---|---|---|---|
| GW #1 | Groundwater from DW-1 monitoring well | 6.97 ± 0.01 | −35.0 ± 2.0 | 10 | 105.0 ± 0.2 | nd | 30 ± 1 | 863 ± 2 | 1928 ± 17 |
| GW #2 | Groundwater from X2A in situ bioremediation system | 6.85 ± 0.01 | 43.0 ± 2.0 | 2.7 | 90.8 ± 0.2 | nd | 325 ± 8 | 948 ± 2 | 2117 ± 15 |
| GW #3 | Groundwater from 23-D monitoring well | 7.15 ± 0.02 | −46.0 ± 2.0 | nd | 83.3 ± 0.2 | 10 ± 1 | 80 ± 3 | 331 ± 1 | 750 ± 2 |
| GW #4 | Groundwater from DW-2 monitoring well | 7.85 ± 0.02 | 22.0 ± 4.0 | 11 | 76.1 ± 0.2 | 126 ± 5 | 14 ± 1 | 917 ± 4 | 2060 ± 44 |
| Shallow Soil | Vadose soil from 0.30-0.61 m bgs near 28-MW | 8.10 ± 0.02 | na | na | 98 ± 2* | 56.4 ± 0.6* | 285 ± 0.8* | 166 ± 3 | 365 ± 15 |
| Deep Soil | Vadose soil from 2.44-2.74 m bgs near 28-MW | 8.41 ± 0.04 | na | na | 294.2 ± 1.2* | 1.4 ± 0.0* | 438 ± 2* | 244 ± 3 | 565 ± 3 |

Inocula

Microbial inocula consisted of ZARA-10 (an organohalide-respiring culture) and a MAT-1 (a chain-elongating culture). Culture ZARA-10 was grown in a continuous reactor with TCE, lactate, and methanol and it contains ethene-producing *D. mccartyi* stains, fermenters, methanogens, and other organohalide-respiring bacteria. Culture MAT-1 was enriched in a semi-batch bioreactor (3 L total volume) using anaerobic soils and chain elongation substrates ethanol and acetate. MAT-1 contains mainly members of Clostridiaceae, including species most similar to *C. kluyveri*.

Microcosm Setup to Assess Chain Elongation Activity in Site Groundwater and Soil Batch microcosms with 27 mM ethanol and 16.2 mM acetate were established to determine if microbial communities in site groundwater and soil could chain elongate

TABLE 10

Microcosms setup with 27 mM ethanol and 16.2 mM acetate to assess chain elongation potential by natural microbiome in site groundwater and soil.

| Label | Source of groundwater or soil | Volume or amount | Nutrients added |
|---|---|---|---|
| GW #1 | DW-1 well | 50 mL | No |
| GW #1 + Nutrients | DW-1 well | 50 mL | Yes[b] |
| GW #2 | X2A well | 50 mL | No |
| GW #2 + Culture | X2A well | 45 mL[a] | No |
| GW #3 | 23-D well | 50 mL | No |
| Shallow Soil | Vadose soil from ~0.5 m depth bgs | 25 g | Yes |

TABLE 10-continued

Microsms setup with 27 mM ethanol and 16.2 mM
acetate to assess chain elongation potential by
natural microbiome in site groundwater and soil.

| Label | Source of groundwater or soil | Volume or amount | Nutrients added |
|---|---|---|---|
| Deep Soil | Vadose soil from ~2.6 m depth bgs | 25 g | Yes | bgs = below ground surface
[a]5 mL of chain elongating culture MAT-1
[b]500 µL salt stock solution, 50 µL trace element A, and 50 µL trace element B added to 50 mL groundwater Testing Reductive Dechlorination of Cis-DCE at Low and High Chain Elongation Substrate Concentrations Batch microcosms were set up with various chain elongation substrate combinations at total concentrations of either 72 mM C (designated as "L-" in Table 3) or 244 mM C (designated as "H-" in Table 11). The low concentrations were selected to provide around 1 g $L^{-1}$ as total organic carbon, similar to conventional substrate concentrations added in situ. The substrate ratios and combinations were chosen to promote, either butyrate, caproate, and butanol production, similar to ratios and combinations in chain elongation studies. The microcosms were set up in triplicates to a total liquid volume of 75 mL with GW #3 (from monitoring well 23-D) and amended with 0.20 mmol $L^{-1}$ cis-DCE in 120 mL microcosm bottles (Table 11). All conditions expect "No Substrates" were amended with 0.1 mL of a 10× vitamin mix stock solution and 0.05 mL of a 2 g $L^{-1}$ vitamin $B_{12}$ stock solution. All conditions except "No Substrates" and "9:1 EtOH:Acetate+Soil" were inoculated with 3.5 mL of groundwater from well DW-1, 1 mL of ZARA-10, and 3 mL of MAT-1. Condition "9:1 EtOH: Acetate+Soil" was inoculated with 3.5 mL of well DW-1 groundwater and 4 g of shallow soil. 20 mL of $N_2$ gas on day 6 and 25 mL of GW on day 31 were added to all microcosms to avoid a vacuum in the bottles and to replenish a third of the starting liquid volume. The microcosms were incubated on a platform shaker set at 150 rpm and 31° C. for 38 days.

Eurofins (West Sacramento, CA, USA) using method SM 5310B. ORP was analyzed by Field Solutions Inc. (San Jose, CA, USA). Chloride ($Cl^-$), nitrate ($NO_3^-$), sulfate ($SO_4^-$) and phosphate ($PO_4^{3-}$) were measured using an ion chromatograph (Metrohm 930 Compact IC Flex, Riverview, FL, USA) equipped with a suppressed conductivity detector, a Metrosep A Supp 5 Guard/4.0 column (Metrohm), and a Metrosep A Supp 5-150/4.0 anion analytical column (Metrohm). The method used an eluent containing 1 mM $NaHCO_3$ and 3.2 mM $Na_2CO_3$, a flow rate of 0.7 mL min$^{-1}$, a temperature of 30° C., and a calibration and detection limit. Total dissolved solids (TDS) and conductivity were measured using an Oakton Multi-Parameter PCSTestr™ 35 probe (Vernon Hills, IL, USA). Measurements for pH, anions, TDS, and conductivity in soil were determined from a 1:1 (w w$^{-1}$) soil to water ratio.

Formate, acetate, ethanol, propionate, lactate, butyrate, butanol, valerate, caproate, hexanol, and caprylate were measured using a high-performance liquid chromatograph (HPLC, Shimadzu, Columbia, MD, USA) with an Aminex HPX-87H column (Bio-Rad Laboratories, Hercules, CA, USA) equipped with a photodiode array detector at 210 nm, and a refractive index detector. Samples were filtered through a 0.2 µm PDVF filter (MDI Membrane Technologies, Harrisburg, PA, USA) prior to analysis. The calibration range was 0.3-10 mM for carboxylates and 1-50 mM for alcohols. Detection limits of alcohols and carboxylates were 0.02-0.05 mM, respectively. Formate, lactate, hexanol, and caprylate were not detected in experiments.

Gas samples of 200 µL were taken from the headspace of microcosms and measured for hydrogen ($H_2$) and carbon dioxide ($CO_2$) using a gas chromatograph with a thermal conductivity detector (GC-TCD) (Shimadzu GC-2010, Columbia, MD, USA). The GC-TCD operated with Ar as the carrier gas, a fused silica capillary column (Carboxen 1010 PLOT column, Supelco, Bellefonte, PA, USA), and previously published instrument settings. The $CO_2$ calibration range was 0.1-5.1 mmol L$_{gas}^{-1}$ and the detection limit was 0.04 L$_{gas}^{-1}$. Methane ($CH_4$), ethene, VC, and cis-DCE were

TABLE 11

Experimental conditions tested for reductive dechlorination of cis-DCE in batch microcosms containing groundwater. The total concentration of chain elongation substrates added was either 72 mM C (labelled "L-") or 244 mM C (labelled "H-"). The data are initial concentrations (averages of triplicate microcosms with standard deviation).

| Label | Ethanol (mM) | Acetate (mM) | Butyrate (mM) | Caproate (mM) |
|---|---|---|---|---|
| L-9:1 EtOH:Acetate | 26.5 ± 0.3 | 3.1 ± 0.0 | 0 ± 0 | 0 ± 0 |
| L-9:1 EtOH:Acetate + Soil | 26.0 ± 2.2 | 2.9 ± 1.6 | 0 ± 0 | 0 ± 0 |
| L-3:1 EtOH:Acetate | 21.5 ± 0.4 | 8.5 ± 0.0 | 0 ± 0 | 0 ± 0 |
| L-7:1 EtOH:Butyrate | 26.5 ± 0.7 | 0 ± 0 | 4.2 ± 0.1 | 0 ± 0 |
| L-EtOH | 30.9 ± 0.7 | 0 ± 0 | 0 ± 0 | 0 ± 0 |
| L-Butyrate | 0 ± 0 | 0 ± 0 | 18.0 ± 0.4 | 0 ± 0 |
| L-Caproate | 0 ± 0 | 0 ± 0 | 0 ± 0 | 12.4 ± 0.3 |
| No Substrates | 0 ± 0 | 0 ± 0 | 0 ± 0 | 0 ± 0 |
| H-9:1 EtOH:Acetate | 123.2 ± 1.1 | 13.9 ± 0.6 | 0 ± 0 | 0 ± 0 |
| H-3:1 EtOH:Acetate | 101.7 ± 1.8 | 49.5 ± 1.1 | 0 ± 0 | 0 ± 0 |
| H-7:1 EtOH:Butyrate | 115.7 ± 2.1 | 0 ± 0 | 16.9 ± 0.1 | 0 ± 0 |
| H-EtOH | 137.7 ± 11.4 | 0 ± 0 | 0 ± 0 | 0 ± 0 |

Liquid and Gas Chemical Analysis pH measurements were conducted using an Orion Ross Ultra Refillable pH/ATC triode (ThermoFisher Scientific, Waltham, MA, USA), and calibrated to the manufacturer's instructions. Total organic carbon (TOC) was analyzed by measured using a GC with a flame ionized detector (FID) (Shimadzu GC-2010, Columbia, MD, USA). The GC-FID was operated with $H_2$ as the carrier gas, a Rt-QS_BOND capillary column (Restek, Bellefonte, PA, USA). The total gas volume of microcosms was measured using a frictionless syringe (Sigma-Aldrich, St. Louis, MO, USA) at each time point when gas was sampled.

DNA Extractions

Samples of 0.5 mL slurry in 2.5 mL of RNAprotect cell reagent (Qiagen, Germantown, MD, USA) were collected at the beginning and end (day 14) of the experiment from conditions "GW #2", "GW #2+Culture", and "Shallow Soil" for DNA extractions. The suspended samples were then centrifuged to create pellets. Groundwater condition pellets ("GW #2" and "GW #2+Culture") were pre-treated with an enzyme lysis buffer (containing 20 mM TrisHCl, 2 mM EDTA, 250 μg mL$^{-1}$ achromopeptidase, and 20 mg mL$^{-1}$ lysozyme). Then, DNA was extracted from pre-treated groundwater condition pellets using the Qiagen DNeasy Blood and Tissue kit (MO BIO Laboratories Inc., Carlsbad, CA, USA) following the protocol for gram-positive bacteria. DNA was extracted from soil condition pellets ("Shallow Soil") using the Qiagen DNeasy Powersoil Pro kit (MO BIO Laboratories Inc., Carlsbad, CA, USA) per the kits protocol.

Samples of 0.5 mL slurry were collected at day 11 and day 38 (end of the experiment) from microcosms conditions at total substrate concentration of 72 mM C and 244 mM C for DNA extractions. Samples for DNA extractions were also collected at the beginning of the experiment from conditions "No Substrates" and "L-9:1 EtOH:Acetate+Soil" and were used as time zero for microbial community analysis. DNA was extracted using the Qiagen DNeasy Powersoil Pro kit per the kits protocol.

Sequencing and Bioinformatics

DNA concentrations and quality were determined using a spectrophotometer (NanoDrop Technology, Rockland, DE, USA) through measured absorbance at 260 and 280 nm wavelengths prior to amplicon sequencing. An Illumina Miseq sequencer (San Diego, CA, USA) was used to conduct microbial community amplicon sequencing. The universal bacterial primers 515F and 806R for the V4 hypervariable region of the 16S rRNA gene of *Bacteria* and *Archaea* were used for sequencing. The Quantitative Insights into Microbial Ecology (QIIME 2.0 v. 2022.2) pipeline was used to process forward and reverse reads. Each sequence was truncated at 208 bps using DADA2 to maintain a quality score of 25 or better and to produce amplicon sequence variants (ASVs). A pretrained Naïve Bayes classifier referencing the SILVA database (v.138) and the q2-feature-classifier plugin were used to assign taxonomy to ASVs. Microbial community abundance was visualized using assigned taxonomy. Prior to diversity analysis, sequences were rarefied at 19172 sequences pre sample using the QIIME 2 platform. Alpha diversity was determined using Pielou's evenness index within the diversity-lib plugin for sequences from DNA samples taken at day 0 and day 11 (time when chain elongation activity was highest) from low and high concentration microcosms. Beta diversity was determined using unweighted UniFrac distances and visualized using principal coordinates analysis (PCoA) for all sequences from DNA samples taken from site material microcosms, and low and high concentration microcosms. The raw sequences obtained from DNA samples were submitted to the NCBI Sequence Read Archive and are available under the project number PRJNA915990 with accession numbers SRX18930668-SRX18930581.

Calculations

Product yields from electron donor consumed (Product$_{yield}$) were calculated for butyrate and butanol (mol:mol) of each microcosm condition using data obtained from day 0, and day 10/11 in site materials and day 21 in low and high concentration microcosms. The selected time points for yield calculation are when carboxylate and alcohol concentration appeared stable. Average and maximum rates ($\Delta C$ $\Delta t^{-1}$) of reductive dechlorination (mmol Cl$^-$ released L$^{-1}$ d$^{-1}$) were calculated for low and high concentration microcosms throughout incubation. Statistical significance of chemical and microbiological data was evaluated using a student t-test with a 95% confidence interval (p<0.05 was considered statistically significant).

Calculations and Analyses

Butyrate and butanol yield from electron donor consumed (Product$_{yield}$, in units of mol:mol) were calculated from data at the beginning of the experiment and day 10/11 in site material microcosms and day 21 in low and high concentration microcosms according to Equation 9:

$$\text{Product}_{yield} = \frac{C_{p,t2} - C_{p,t1}}{C_{e,t2} - C_{e,t1}} : \frac{C_{e,t2} - C_{e,t1}}{C_{e,t2} - C_{e,t1}} \qquad \text{(Eq. 9)}$$

where $C_p$ is the concentration of the product (i.e., butyrate or butanol), $C_e$ is the concentration of the electron donor, and $t_1$ is the start of the experiment and $t_2$ is day 10/11 in site materials and day 21 in low and high concentration microcosms. Concentrations of cis-DCE, VC, ethene, methane, and H$_2$ observed in microcosms were reported in nominal concentration in the bottle ($C_n$, in units of mmol L$^{-1}$). Concentrations of mmol L$^{-1}$ gas TCE, cis-DCE, VC, ethene, methane, and H$_2$, measured from headspace gas samples via gas chromatography, were converted to nominal concentration using Equation 10:

$$C_n = \frac{V_g \times C_g + V_1 \times \frac{C_g}{H}}{V_1} \qquad \text{(Eq. 10)}$$

where $V_g$ is the headspace volume (L), $C_g$ is the gas concentration in the headspace (mmol L$^{-1}$), $V_1$ is the liquid volume (L), $C_1$ is the aqueous concentration (mM aqueous), and H is Henry's constant (dimensionless). Values for H were obtained from Amos and Löffler[1] and Sander[2]. Average and maximum rates of reductive dechlorination ($\Delta C$ $\Delta t^{-1}$, mmol Cl$^-$ released L$^{-1}$ d$^{-1}$) were calculated between sampling events according to Equation S1. Nominal concentrations of ethenes (mmol L$^{-1}$) were converted to mmol Cl$^-$ released L$^{-1}$ d$^{-1}$ by multiplying concentrations with the number of Cl$^-$ atoms removed from each compound: VC, 1; and ethene, 2.

Figure 18:
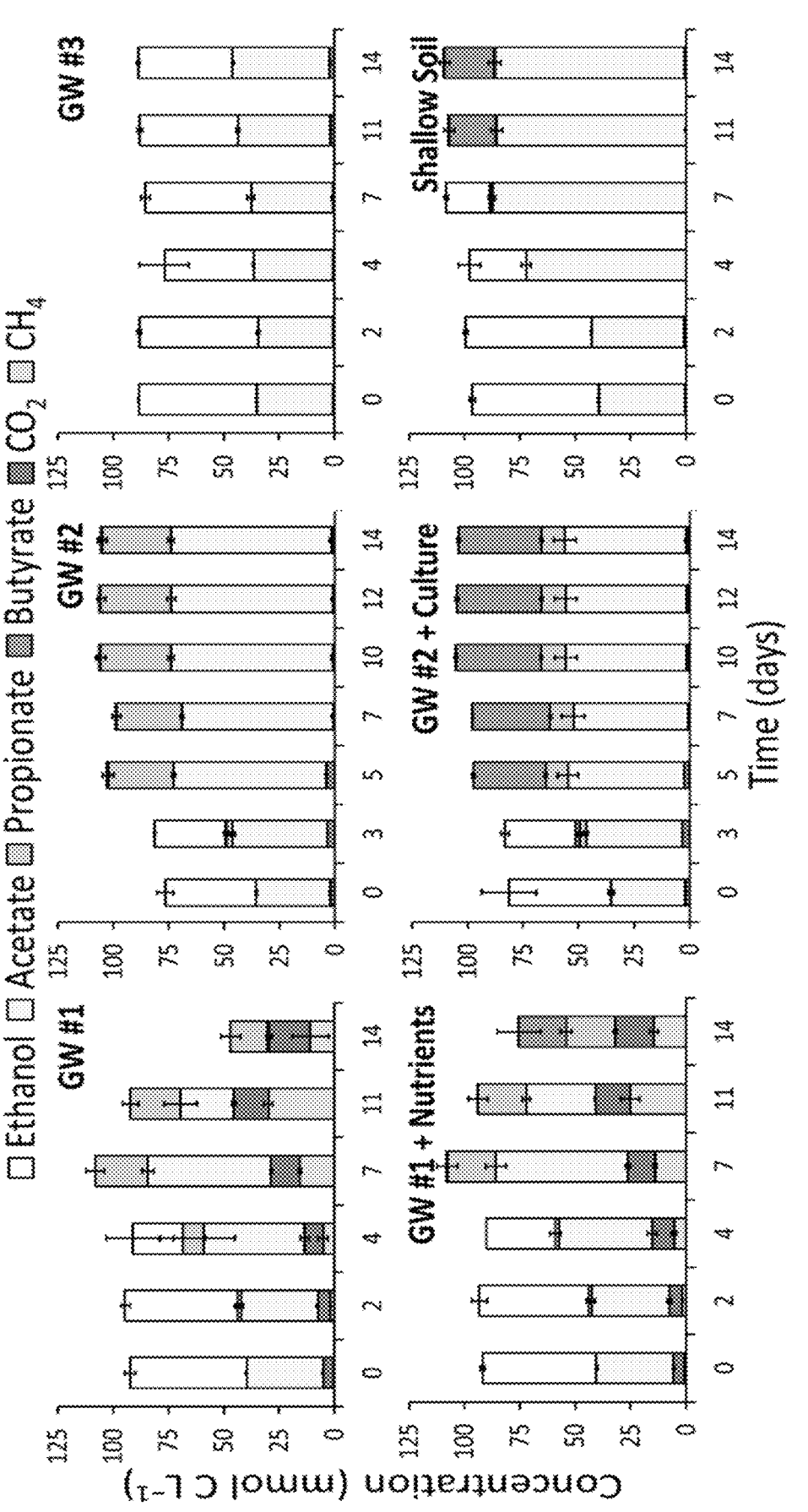
FIG. 18 is a plot of butyrate, propionate, $CH_4$ and $CO_2$ production in site materials amended with 27 mM ethanol and 16.2 mM acetate. The data are averages with standard deviations of replicate microcosms (n=2 or 3).

Results and Discussion 27 mM Ethanol and 16.2 mM Acetate Stimulate Natural Chain Elongating Microbiome in Site Soil but Not Groundwater It was first examined whether ethanol and acetate can be converted to butyrate via chain elongation by stimulating the natural microbial communities from groundwater (inside and outside of the in situ bioremediation zone) and soil. The fate of ethanol and acetate in the microcosms is shown in FIG. 18. Ethanol and acetate concentrations remained mostly unchanged during incubation in groundwater from outside the in situ bioremediation zone (GW #3, FIG. 18). The lack of microbial activity is possibly due to background conditions at the site and the wells exclusion from previous biostimulation and bioaugmentation treatments (TOC<0.5 mg L$^{-1}$, Table 9). In groundwater from the in situ bioremediation zone (GW #1 & #2, FIG. 18), significant microbial activity was observed showing complete consumption of ethanol by day 7. However, propionate instead of butyrate was the main metabolite, accounting for 34% of substrate electrons by day 5 in GW #2.

Figure 19:
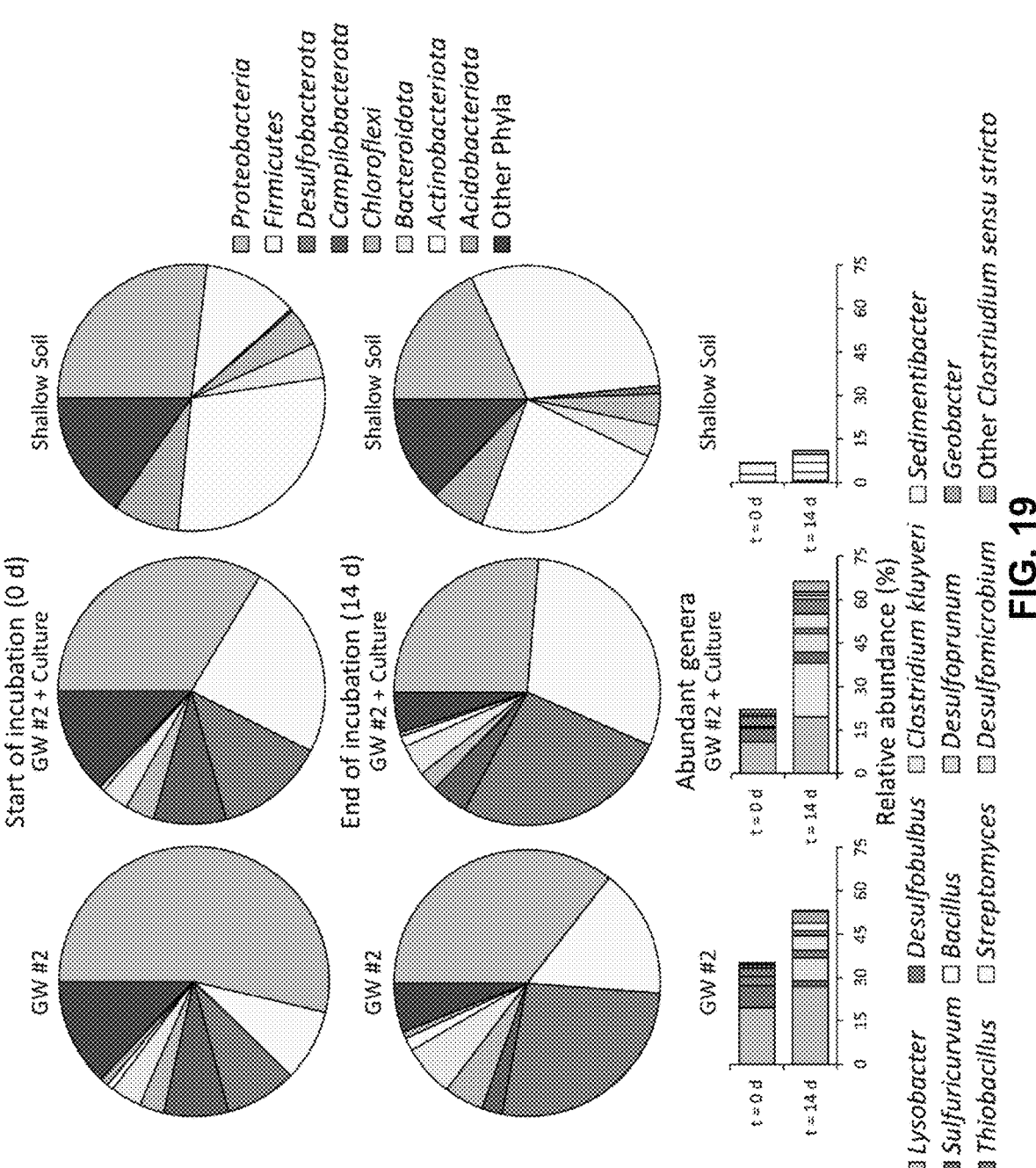
FIG. 19 is a series of charts depicting the selection of phylum Firmicutes and genera in microcosms amended with 27 mM ethanol and 16.2 mM acetate. The data are averages of sequences from replicate microcosms (n=2 or 3).

Propionate can be produced from ethanol, acetate, and $CO_2$ through the succinate pathway. Studies have reported 0.67-1 mol propionate and 0.33 mol acetate formed per mol ethanol under a $N_2/CO_2$ and $H_2/CO_2$ headspace through the succinate pathway. Propionate production has also been reported to reductively form from acetate and/or $CO_2$ ($H_2$ utilizing process), resulting in 1 mol propionate and 0.33 mol propionate, respectively. In this study, ~0.48 mol propionate, 0.89 mol acetate and <0.01 mol butyrate were produced per mol ethanol in GW #2 by day 5. Propionate and acetate in GW #1 and GW #2 were likely produced through a combination of the succinate pathway and reduction of acetate and/or $CO_2$. Microbial community analysis supported this deduction, as phylum Desulfobacterota ASVs, known to contain propionate producers was highly abundant at the end of incubation (FIG. 19). Specifically, *Desulfobulbus* ASVs, which contains *D. propionicus*, known to use the succinate pathway to convert $CO_2$, acetate, and ethanol to propionate were enriched in GW #2. *Desulfoprunum*, and *Desulfomicrobium* ASVs were also enriched in GW #2, *Desulfoprunum and Desulfomicrobium*, are genera that contain species which can use and/or produce various carboxylates (i.e., acetate, propionate, and butyrate). Sole addition of ethanol and acetate to groundwater did not promote chain elongation to butyrate and resulted in diversion of electrons to propionate. Interestingly, in groundwater with nutrients, butyrate was produced, but not through ethanol chain elongation (FIG. 18, day 14). Ethanol was consumed several days prior to butyrate production (FIG. 18, day 7). Other studies have reported concomitant production of butyrate and propionate under similar conditions, however the pathways are unknown.

Figure 17:
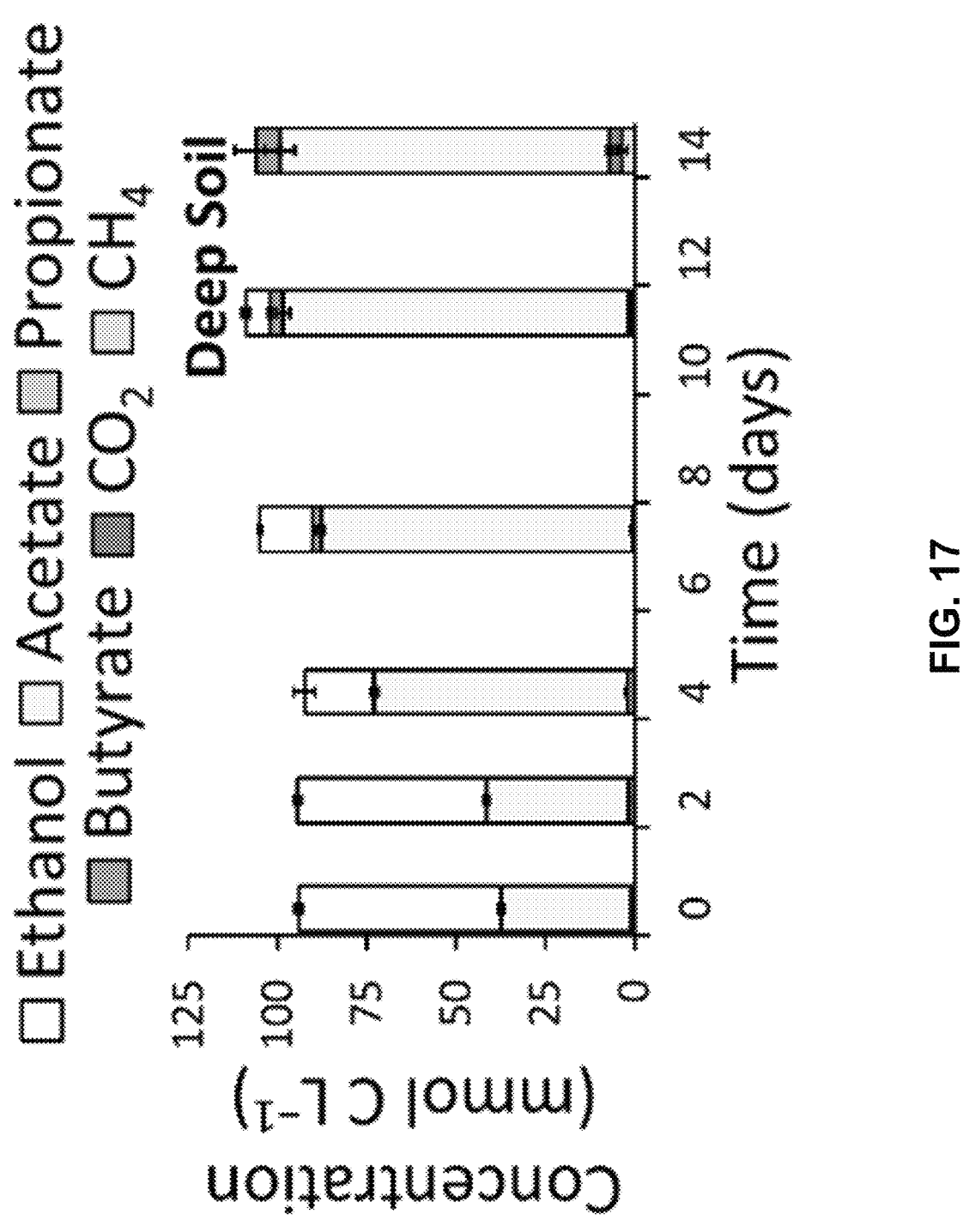
FIG. 17 is a plot of butyrate, acetate, $CH_4$, and $CO_2$ production in soil amended with 27 mM ethanol and 16.2 mM acetate. Data are averages with standard deviations of triplicate microcosms.

Unlike in groundwater, butyrate was produced via chain elongation and virtually no propionate accumulated during incubation in shallow soil and deep soil (<0.4 mM C propionate, FIG. 17 & FIG. 18). Two additional significant differences between groundwaters without bioaugmentation and soils was the significantly lower production of $CH_4$ (up to 0.04-3.39 mmol $L^{-1}$) and $CO_2$ (up to 1.23-3.42 mmol $L^{-1}$) in soils (FIGS. 17 & 18). Groundwater microcosms accumulated upwards of ~30 mmol $L^{-1}$ $CH_4$ and ~19 mmol $L^{-1}$ $CO_2$ during incubation. This difference could be due to two reasons; (1) soils house more competition for electron donors and (2) chain elongation prevented $CO_2$ production and suppressed methanogenesis. Additionally, trends in these soils ("Shallow Soil" "Deep Soil") were in line with previous observations for chain elongation in soils (Joshi, ISME J. 2021, 15, 1907-1918). The three main overlapping findings between previous studies and this study are: (1) ethanol and acetate can stimulate soil chain elongators; (2) more chain elongation activity is observed in shallow vs deep soils; and (3) phyla Firmicutes is highly enriched in soils with ethanol and acetate (2021). The latter is evident from microbial community analysis (FIG. 19). Genera ASVs commonly found in chain elongating microbiomes were also enriched in these soils (*Sedimentibacter, Bacillus*, and *Clostridium sensu stricto*). Results from this study concur with previous findings supporting that chain elongating microorganisms are commonly found in vadose soils and they can easily be biostimulated with ethanol and acetate as substrates.

Butyrate Production Steered in Groundwater Bioaugmented With a Chain-Elongating Culture Groundwater that mainly produced propionate was redirected to produce mainly butyrate when inoculated with the chain elongation culture, MAT-1 (FIG. 18, "GW #2+Culture"). Specifically, after bioaugmentation 0.37 mol butyrate was produced per mol ethanol within 5 days of incubation (FIG. 18 & Table 12 day 10). Electrons previously channeled to propionate production were directed primarily to butyrate production (~44% of the electrons). Results show inoculation with a chain elongating culture can promote showed ethanol and acetate elongation to butyrate in groundwater where native chain elongating microorganisms were not previously stimulated (FIG. 18).

TABLE 12

End-product yields from electron donor in site, and low (denoted "L-") and high (denoted "H-") concentration microcosms on day 10/11 and 21, respectively. Data are averages with standard deviations.

| | Product yield (mol:mol) | |
| --- | --- | --- |
| Label | Butyrate | Butanol |
| GW #2 | 0.01:1 | nd |
| GW #2 + Culture | 0.43:1 | 0.00:1* |
| Shallow Soil | 0.18:1 | 0.01:1* |
| Deep Soil | 0.04:1 | 0.01:1* |
| L-9:1 EtOH:Acetate | 0.22:1 | 0.00:1* |
| L-3:1 EtOH:Acetate | 0.04:1 | nd |
| L-7:1 EtOH:Butyrate | 0.42:1 | 0.07:1 |
| L-EtOH | 0.37:1 | 0.01:1* |
| L-Caproate | 0.64:1 | nd |
| H-9:1 EtOH:Acetate | 0.44:1 | 0.05:1 |
| H-3:1 EtOH:Acetate | 0.63:1 | 0.04:1 |
| H-7:1 EtOH:Butyrate | 0.28:1 | 0.23:1 |
| H-EtOH | 0.35:1 | 0.06:1 | nd = not detected;
*lower than 0.01 mol:mol.

Figure 20:
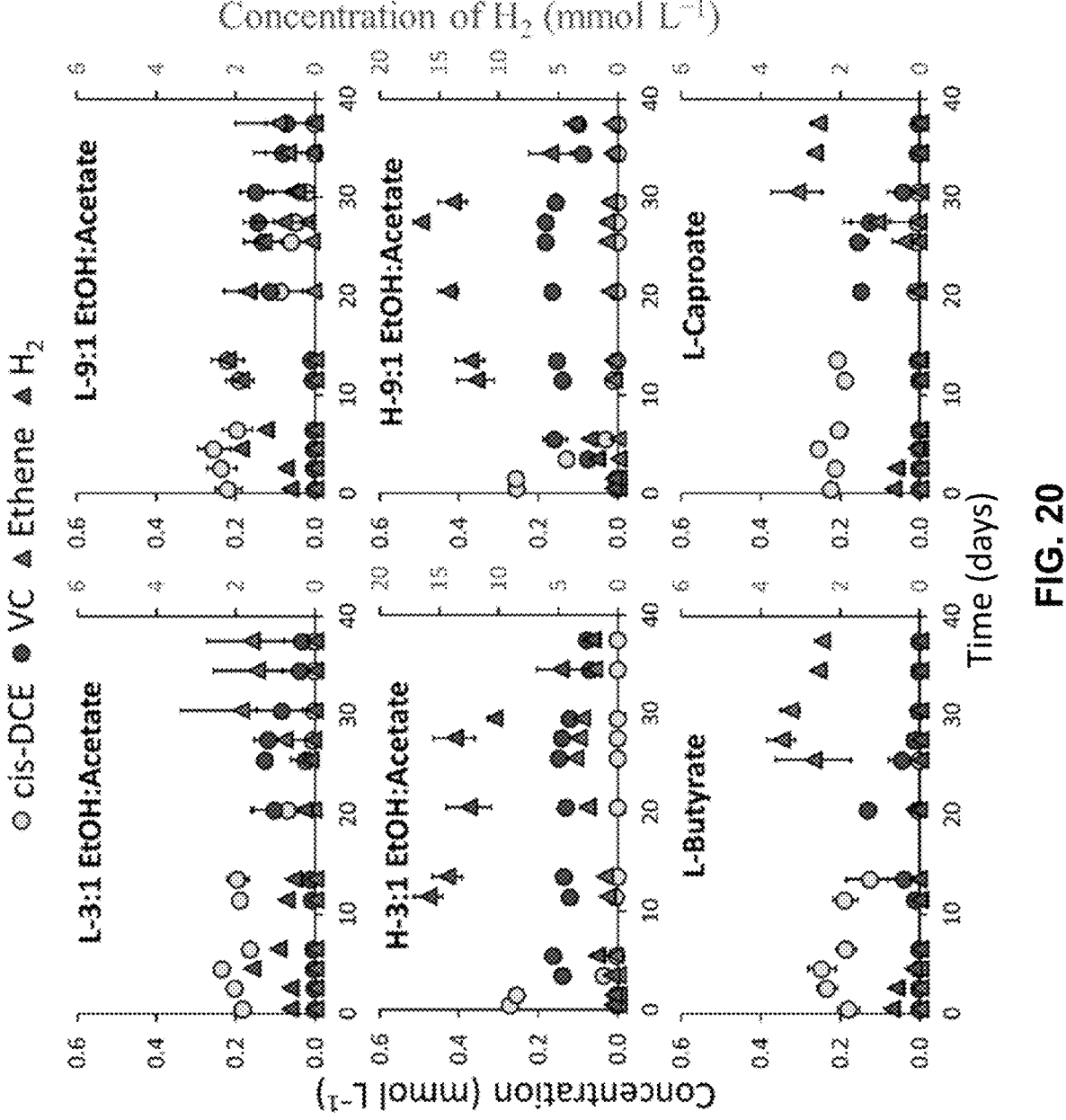
FIG. 20 is a series of charts of reductive dechlorination of cis-1,2-dichloroethene (cis-DCE) in groundwater microcosms at 72 mM C (low, denoted "L-') and 244 mM C (high, denoted "H-") total substrate concentrations. $H_2$ concentrations are plotted on the secondary y-axis. Note a larger secondary y-axis scale in the second row of panels. The data are averages with standard deviations of triplicate microcosms.
Figure 21:
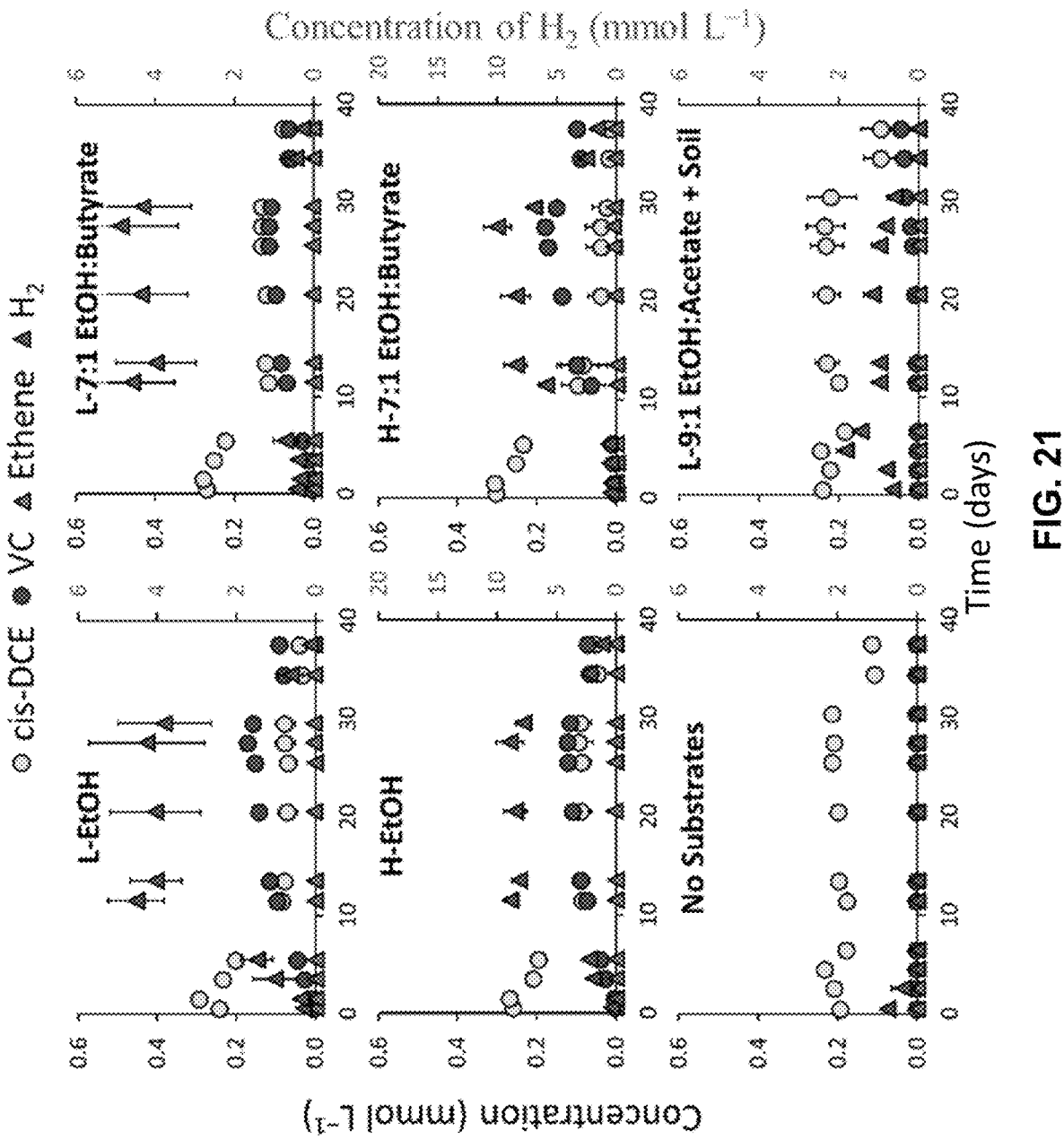
FIG. 21 is a series of charts of reductive dechlorination of cis-1,2-dichloroethene (cis-DCE) in groundwater microcosms at 72 mM C (low, denoted "L-') and 244 mM C (high, denoted "H-") total substrate concentrations. $H_2$ concentrations are plotted on the secondary y-axis. Note a larger secondary y-axis scale in the second row of panels. The data are averages with standard deviations of triplicate microcosms.

Low Substrate Concentrations Expand Chain Elongation Substrate Combinations for Reductive Dechlorination of Chlorinated Ethenes Various substrate combinations were tested at low concentrations (72 mM C) for reductive dechlorination of cis-DCE in batch microcosms (Table 11). To varying extents, $H_2$ generated from substrates was used to reduce cis-DCE to ethene (FIG. 20 and FIG. 21). Groundwater microcosms "L-EtOH", "L-7:1 EtOH:Butyrate", and "L-9:1 EtOH:Acetate+Soil" converted cis-DCE to mainly VC and low concentrations of ethene (<2.8±0.7 μmol $L^{-1}$) by the end of incubation (38 d). Groundwater amened with a 3:1 ethanol to acetate ratio, butyrate, or caproate converted a majority of cis-DCE to ethene (>0.16±0.11 mmol $L^{-1}$), and less than 0.03±0.05 mmol $L^{-1}$ VC by the end of incubation. Butyrate and caproate, the typical chain elongation products from ethanol and acetate-based elongation, yielded the highest extent of dechlorination among all low substrate combinations (<0.6±0.1 and 2.1±0.3 μmol $L^{-1}$ VC at day 38, respectively). Butyrate and caproate can also serve as substrates for chain elongation to produce caprylate provided ethanol is available as electron donor. This is the first study to consider and show the application of caproate as a substrate for reductive dechlorination (FIG. 20 and FIG. 21). Butyrate has been shown to drive reductive dechlorination of chlorinated ethenes in a few studies. Additionally, butyrate has been shown to be advantageous when compared to lactate in a pilot study with elevated levels of sulfate by preventing electron losses to sulfate reduction. Yet, butyrate is rarely used in situ to drive reductive dechlorination. In previous work on chain elongation-based reductive dechlorination, the sustained reductive dechlorination was attributed to slow-release $H_2$ from butyrate fermentation as a result of the relationship between butyrate fermenters and $H_2$-utilizing syntrophs. The data presented herein support that connection and demonstrate $H_2$ from butyrate is an excellent substrate for reductive dechlorination (FIG. 20 and FIG. 21). Extent of reductive dechlorination in microcosms amended with the chain elongation substrates ethanol and acetate and the chain elongation products butyrate and caproate are supportive of ethanol and acetate as appropriate substrates for a field feasibility study.

Figure 22:
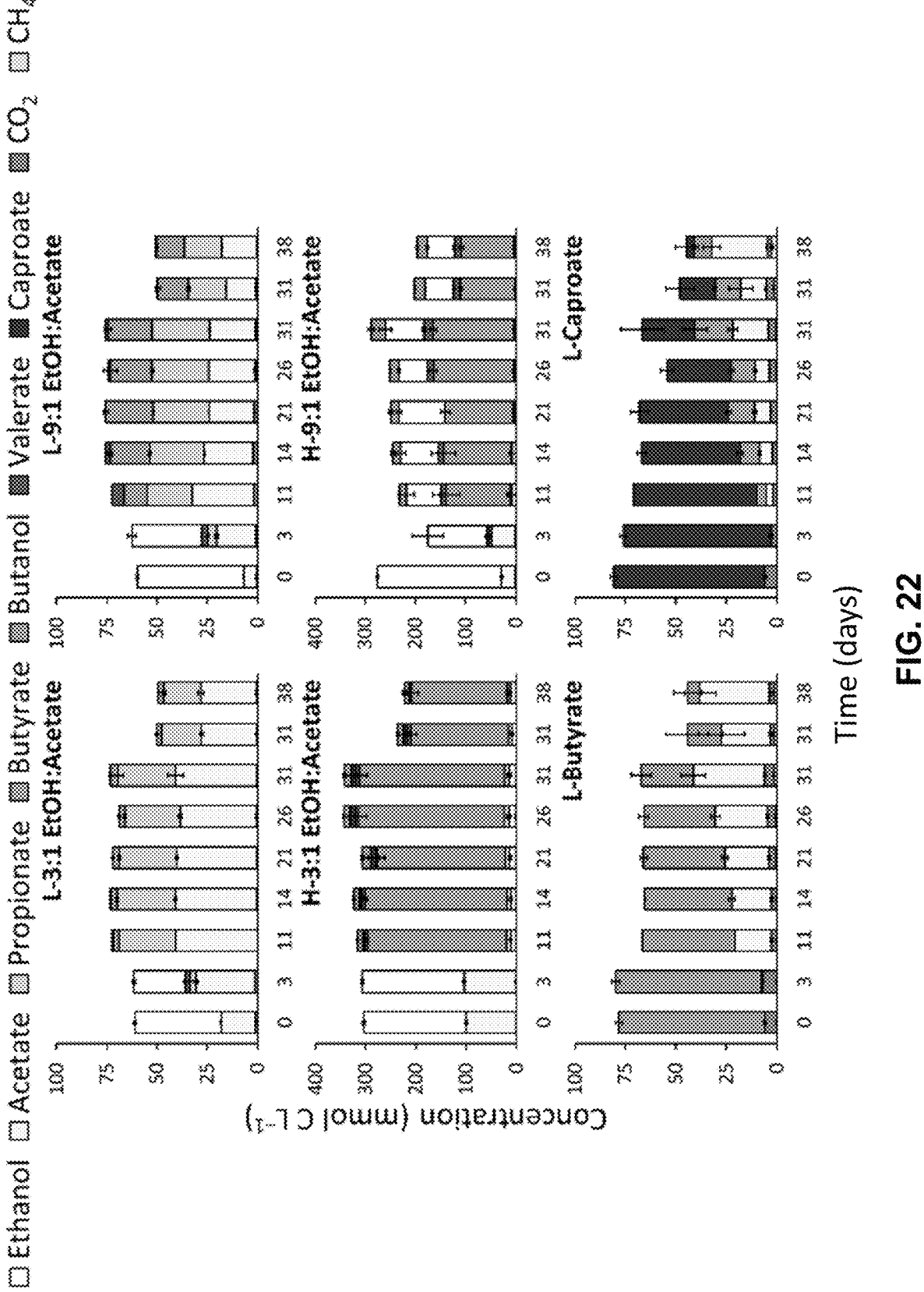
FIG. 22 is a series of plots showing the conversion of carboxylates and alcohols to end-products in groundwater microcosms at 72 mM C (low, denoted "L-") and 244 mM C (high, denoted "H-") total substrate concentrations. Note a larger y-axis scale in the second row of panels. Data are averages with standard deviations of triplicate microcosms.
Figure 23:
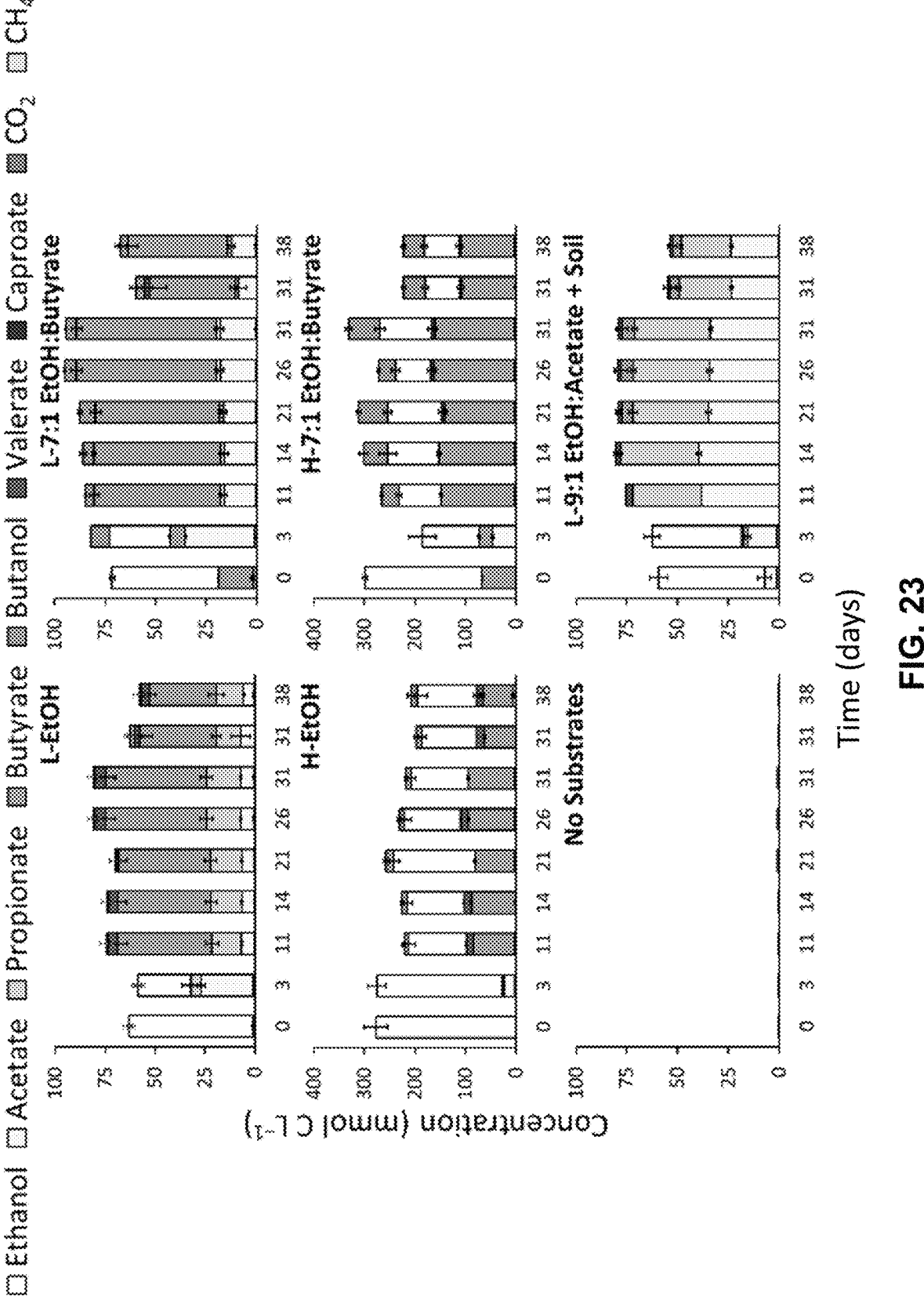
FIG. 23 is a series of plots showing the conversion of carboxylates and alcohols to end-products in groundwater microcosms at 72 mM C (low, denoted "L-") and 244 mM C (high, denoted "H-") total substrate concentrations. Note a larger y-axis scale in the second row of panels. Data are averages with standard deviations of triplicate microcosms.

Propionate Production Persists at Low Substrate Concentrations (72 mM C), but Can be Minimized With Substrate Combination Groundwater amended with low substrate concentration received a substrate dose relevant to bioremediation of chlorinated ethenes. Groundwater amended with caproate and butyrate converted substrate to butyrate, acetate, and ~1-2 mmol $L^{-1}$ $CH_4$ (FIGS. 22 and FIG. 23). Microcosms amended with ethanol only and ethanol and butyrate mainly produced butyrate and $H_2$ and less than 0.73 mmol $L^{-1}$ $CH_4$ (FIGS. 20 to 23); all indicative of preventing methane production in this groundwater. Interestingly, microcosms with both ethanol and butyrate produced butanol. Previous studies on reductive dechlorination driven by chain elongation showed transiently butanol accumulation and can potentially be oxidized to generate more $H_2$ in situ.

Low concentration microcosms contained culture or soil, yet propionate remained a dominant product in groundwater amended with ethanol and acetate. Although propionate can serve as a substrate for odd-numbered chain elongation, and is known to drive reductive dechlorination, it also promotes methanogenesis, which is an electron sink in reductive dechlorination and chain elongation. Therefore, identifying chain elongation conditions to avoid propionate production are potentially more desirable for reductive dechlorination at sites with high methanogenic activity. The ratio of electron donor to electron acceptor in chain elongation has a strong influence on the yield and distribution of products, higher ethanol to acetate ratios favor longer products and higher yields. Hence, changing the ratio is a simple method to change the thermodynamic favorability of microbial processes. In these microcosms, groundwater amended with a 9:1 ethanol to acetate ratio yielded more butyrate (0.04 mol) per ethanol consumed than those with a 3:1 ratio (0.22 mol) (FIG. 22, FIG. 23, & Table 12). Although propionate production was observed in microcosms with low concentrations, these results show increasing the ratio of ethanol to acetate can steer chain elongation to butyrate production.

Butyrate Production Prevails in High Concentration Microcosms

The effects of high concentration chain elongation substrate combinations on reductive dechlorination of cis-DCE and extent of chain elongation were evaluated in batch microcosms. All microcosms with 244 mM C reduced cis-DCE to ethene, although to a much lower extent than their lower concentration counterparts (FIG. 20 and FIG. 21). Among groundwaters amended with high concentrations those with a 3:1 ethanol to acetate ratio yielded the highest extent of dechlorination, converting approximately 50% of cis-DCE to ethene. A 3:1 ethanol to acetate ratio generated the highest yield of butyrate. Increasing the ethanol to acetate ratio from 3:1 to 9:1 did not improve dechlorination in high concentration microcosms, a similar trend was observed in low concentration microcosms. On the other hand, increasing concentrations significantly improved elongation to butyrate and $H_2$ (FIGS. 20 to 23). Virtually no propionate was produced and nearly all consumed substrate electrons went to butyrate production. Additionally, low concentration conditions that had not produced butanol production saw butanol production in high concentration counterparts. In fact, caproate production was even observed in condition "H-3:1 EtOH:Acetate". Contrary to the effect ethanol ratio had on butyrate production in low concentration microcosms, it appeared to have an inhibitory effect on butyrate production in high concentration microcosms. The chemical data suggest ratio of electron donor, type of chain elongation substrate, and substrate concentration are all important considerations when selecting a dosage for bioremediation of chlorinated ethenes.

Substrate Combination Influences Microbiome Distribution and Diversity

Figure 24:
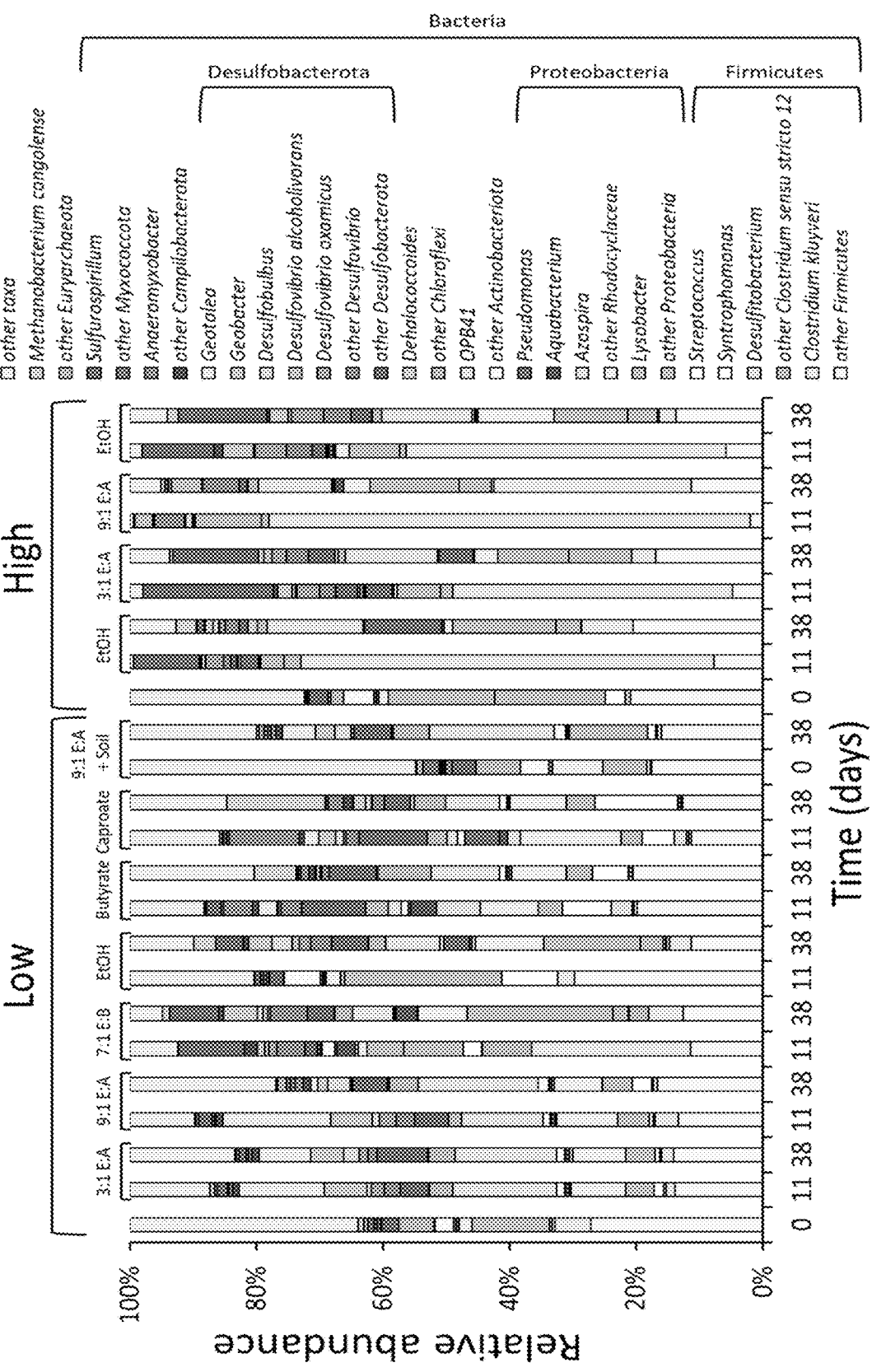
FIG. 24 is a plot showing low substrate concentrations (72 mM C) yield diverse microbial communities and high substrate concentration (244 mM C) yield Firmicutes dominant microbial communities. The data are averages of triplicate microcosms. Some substrate labels were abbreviated (i.e, E=EtOH, A=Acetate, B=Butyrate).

ASVs were obtained from microcosm samples to identify and evaluate connections between the microbiome, extent of reductive dechlorination, and $H_2$-producing processes (i.e., chain elongation of acetate, ethanol, and butyrate, and fermentation of butyrate and caproate). Microcosm microbiomes varied across substrate combinations and between high and low substrate concentrations (FIG. 24). At low concentrations, there was more diversity in the microbial community (denoted "Low" in FIG. 24). By the end of incubation, groundwater amended with caproate or butyrate saw an increase in Euryarchaeota ASVs, namely those identified as *Methanobacterium congolense*, a hydrogenotrophic bacteria (FIG. 24, "Caproate" & "Butyrate"). This supports the low methane concentrations observed in fermentation of butyrate and caproate. Similar ASVs and distribution of ASVs was found in groundwater amended with a 3:1 and a 9:1 ethanol and acetate ratio (FIG. 24, "3:1 E:A" & "3:1 E:A"). One exception was the significantly lower abundance of genera and species ASVs belonging to phylum Desulfobacterota ASVs at the end of incubation in groundwater with a 9:1 ethanol to acetate ratio. This difference offers insights into the differences in dechlorination and chain elongation between the two ethanol and acetate conditions. At high substrate concentrations ASVs identified as Firmicutes dominated the microbial community (denoted "High" in FIG. 24). Specifically, ASVs identified as *C. kluyveri* accounted for a majority (greater than 43%) of ASVs at day 11 when chain elongation appeared to occur based on chemical data (FIGS. 22 to 24).

Implications and Outlook

This treatability study advances the relevance of microbial chain elongation as a $H_2$-producing process relevant to in situ bioremediation of chlorinated ethenes. Results support microbial chain elongation can be stimulated in soil and groundwater from a site experiencing challenges with high methanogenic activity and clogging associated with traditional substrates. Data from microcosms containing soil supported chain elongating microorganisms are naturally present in shallow and deep soils. Suggesting the site soil is supportive of chain elongation. Studies on the occurrence of chain elongation in soils are limited. It was previously theorized that chain elongation may serve as a carbon storing process to delay losses of organic acids in soils. The findings described here on shallow and deep soil are supportive of that theory. This further supports the microbial communities to support chain elongation are likely already at in situ bioremediation sites. This study also confirmed bioaugmentation with a chain elongating culture can steer groundwater to produce butyrate via chain elongation. Further probing with various substrate combinations, revealed ethanol and acetate and its elongation products, butyrate and caproate, are promising substrates for further assessment—a field feasibility study. This study expanded appropriate chain elongation substrates for reductive dechlorination of chlorinated ethenes, possibly increasing the versatility of this biotechnology to the meet the special needs of bioremediation sites. The work presented here was completed using cis-DCE, however chain elongation could potentially be applied to other subsurface contaminants.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

We claim:

1. A system for remediation of halogenated compounds, comprising:
  at least one bacterial strain capable of microbial chain elongation;
  at least one bacterial strain capable of reductive dehalogenation; and
  an alcohol.

2. The system of claim 1, further comprising a carboxylate selected from the group consisting of an organic acid and an alkyl ester.

3. The system of claim 2, wherein the carboxylate comprises ethyl acetate.

4. The system of claim 2, wherein the alcohol and the carboxylate together form a solution; and wherein the molar concentration of alcohol is at least twice that of the carboxylate.

5. The system of claim 1, wherein the at least one bacterial strain capable of microbial chain elongation comprises *Clostridium kluyveri*.

6. The system of claim 1, comprising reductive dehalogenating cultures.

7. The system of chain 1, the at least one bacterial strain capable of reductive dehalogenation comprises a strain of *Dehalococcoides mccartyi*.

8. The system of claim 1, wherein the at least one bacterial strain capable of microbial chain elongation is capable of converting ethanol to hydrogen and a carboxylate or a longer-chain alcohol.

9. The system of claim 1, further comprising at least one bacterial strain capable of fermentation of chain-elongation organic compounds; wherein the at least one bacterial strain capable of fermentation of chain-elongated organic compounds is capable of converting a long-chain carboxylate or alcohol selected from the group consisting of butyrate caproate, and butanol to acetate and hydrogen.

10. The system of claim 1, wherein the at least one bacterial strain capable of reductive dehalogenation is capable of reducing at least one chloroethene selected from the group consisting of vinyl chloride, cis-1,2-dichloroethene, trichloroethene, and perchloroethene to ethene.

11. A method of remediating an environmental sample, the method comprising the steps of:
  providing a remediation composition; and
  treating an environmental sample comprising at least one chlorinated pollutant with the remediation composition;
  wherein the remediation composition comprises:
    at least one bacterial strain capable of microbial chain elongation;
    at least one bacterial strain capable of reductive dehalogenation; and
    at least one bacterial strain capable of fermentation of chain-elongation organic compounds.

12. The method of claim 11, further comprising the step of adding *Dehalococcoides mccartyi* to the remediation composition.

13. The method of claim 11, wherein the remediation composition further comprises an alcohol and a carboxylate.

14. The method of claim 11, wherein the remediation composition comprises an alcohol and a carboxylate in a ratio of about 3:1 or about 9:1.

15. The method of claim 11, wherein the chlorinated pollutant is selected from the group consisting of vinyl chloride, cis-1,2-dichloroethene, trichloroethene, and perchloroethene.

16. The method of claim 11, further comprising the step of replacing at least one chlorine atom with a hydrogen atom on the chlorinated pollutant.

17. A kit for bioremediation of chlorinated pollutants, the kit comprising a remediation composition; and
  instructions for using the remediation composition;
  wherein the remediation composition comprises:
    at least one bacterial strain capable of microbial chain elongation;
    at least one bacterial strain capable of reductive dehalogenation; and
    at least one bacterial strain capable of fermentation of chain-elongation organic compounds.

18. The kit of claim 17, wherein the remediation composition comprises microbial chain elongation strain *Clostridium kluyveri* and reductive dehalogenation strain *Dehalococcoides mccartyi*.

19. The kit of claim 17, wherein the remediation composition further comprises an alcohol.

20. The kit of claim 17, wherein the remediation composition further comprises a carboxylate.

* * * * *